(12) United States Patent
Negus et al.

(10) Patent No.: US 11,343,060 B2
(45) Date of Patent: *May 24, 2022

(54) ZERO DIVISION DUPLEXING MIMO RADIO WITH ADAPTABLE RF AND/OR BASEBAND CANCELLATION

(71) Applicant: SKYLINE PARTNERS TECHNOLOGY LLC, Boulder, CO (US)

(72) Inventors: Kevin J. Negus, Philipsburg, MT (US); James A. Proctor, Jr., Melbourne Beach, FL (US)

(73) Assignee: SKYLINE PARTNERS TECHNOLOGY LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,194

(22) Filed: Aug. 27, 2018

(65) Prior Publication Data

US 2019/0013925 A1   Jan. 10, 2019

Related U.S. Application Data

(63) Continuation of application No. 15/291,968, filed on Oct. 12, 2016, now Pat. No. 10,063,363, which is a (Continued)

(51) Int. Cl.
*H04L 5/14* (2006.01)
*H01Q 21/28* (2006.01)
(Continued)

(52) U.S. Cl.
CPC ......... *H04L 5/1423* (2013.01); *H01Q 21/062* (2013.01); *H01Q 21/24* (2013.01);
(Continued)

(58) Field of Classification Search
CPC ....... H04L 5/1423; H04L 5/1461; H04B 1/54; H04B 1/38; H04B 1/525; H04B 15/00;
(Continued)

(56) References Cited

U.S. PATENT DOCUMENTS 2,818,501 A   12/1957 Gus
3,699,444 A   10/1972 Ghose
(Continued)

FOREIGN PATENT DOCUMENTS

EP   2745539   6/2014
EP   2767102   8/2014
(Continued)

OTHER PUBLICATIONS

"AccessGate—RAN Optimization for Mobile Backhaul Systems," Product Data Sheet, Memotec, 2009, Montreal, Quebec, Canada, 2 pages.

(Continued)

*Primary Examiner* — Carolyn R Edwards
*Assistant Examiner* — Eboni N Giles
(74) *Attorney, Agent, or Firm* — Jennifer Hayes; Nixon Peabody LLP

(57) ABSTRACT

An intelligent backhaul radio is disclosed, which can operate by zero division duplexing for use in PTP or PMP topologies, providing for significant spectrum usage benefits among other benefits. Specific system architectures and structures to enable active cancellation of multiple transmit signals at multiple receivers within a MIMO radio are disclosed. Further disclosed aspects include the adaptive optimization of cancellation parameters or coefficients.

19 Claims, 24 Drawing Sheets

Related U.S. Application Data continuation of application No. 14/572,725, filed on Dec. 26, 2014, now Pat. No. 9,490,918, which is a continuation of application No. 14/108,200, filed on Dec. 16, 2013, now Pat. No. 8,948,235, which is a continuation of application No. 13/767,796, filed on Feb. 14, 2013, now Pat. No. 8,638,839, which is a continuation of application No. 13/609,156, filed on Sep. 10, 2012, now Pat. No. 8,422,540.

(60) Provisional application No. 61/662,809, filed on Jun. 21, 2012, provisional application No. 61/663,461, filed on Jun. 22, 2012.

(51) Int. Cl.

| | | |
|---|---|---|
| *H04B 1/525* | (2015.01) | |
| *H01Q 21/06* | (2006.01) | |
| *H01Q 21/24* | (2006.01) | |
| *H04B 1/38* | (2015.01) | |
| *H04B 1/54* | (2006.01) | |
| *H04B 15/00* | (2006.01) | |
| *H04W 24/02* | (2009.01) | |

(52) U.S. Cl.
CPC .............. *H01Q 21/28* (2013.01); *H04B 1/38* (2013.01); *H04B 1/525* (2013.01); *H04B 1/54* (2013.01); *H04B 15/00* (2013.01); *H04L 5/1461* (2013.01); *H04W 24/02* (2013.01)

(58) Field of Classification Search
CPC ...... H01Q 21/062; H01Q 21/24; H01Q 21/28; H04W 24/02
See application file for complete search history.

(56) References Cited

U.S. PATENT DOCUMENTS

| | | |
|---|---|---|
| 4,736,455 A | 4/1988 | Matsue et al. |
| D307,274 S | 4/1990 | Sasaki et al. |
| 4,991,165 A | 2/1991 | Cronyn |
| 5,117,236 A | 5/1992 | Chang et al. |
| D335,128 S | 4/1993 | Soren |
| D349,897 S | 8/1994 | Soren et al. |
| 5,430,769 A | 7/1995 | Patsiokas et al. |
| 5,486,836 A | 1/1996 | Kuffner et al. |
| D373,771 S | 9/1996 | Messelhi |
| 5,563,610 A | 10/1996 | Reudink |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,648,968 A | 7/1997 | Reudink |
| 5,691,978 A | 11/1997 | Kenworthy |
| 5,692,019 A | 11/1997 | Chang et al. |
| 5,745,841 A | 4/1998 | Reudink et al. |
| 5,757,318 A | 5/1998 | Reudink |
| 5,809,422 A | 9/1998 | Raleigh et al. |
| 5,812,537 A | 9/1998 | Betts et al. |
| D401,592 S | 11/1998 | Nishimura et al. |
| 5,859,854 A | 1/1999 | Reudink |
| 5,872,547 A | 2/1999 | Martek |
| 5,929,823 A | 6/1999 | Martek et al. |
| 5,969,689 A | 10/1999 | Martek et al. |
| 6,005,516 A | 12/1999 | Reudink et al. |
| RE36,591 E | 2/2000 | Hayashi et al. |
| 6,032,056 A | 2/2000 | Reudink et al. |
| 6,055,230 A | 4/2000 | Feuerstein et al. |
| 6,070,090 A | 5/2000 | Feuerstein |
| 6,094,166 A | 7/2000 | Martek et al. |
| 6,100,843 A | 8/2000 | Proctor, Jr. et al. |
| 6,172,654 B1 | 1/2001 | Martek |
| 6,198,434 B1 | 3/2001 | Martek et al. |
| 6,239,756 B1 | 5/2001 | Proctor, Jr. et al. |
| 6,253,060 B1 | 6/2001 | Komara et al. |
| 6,304,215 B1 | 10/2001 | Proctor, Jr. et al. |
| 6,310,584 B1 | 10/2001 | Reece et al. |
| 6,317,100 B1 | 11/2001 | Elson et al. |
| 6,320,540 B1 | 11/2001 | Meredith |
| 6,320,853 B1 | 11/2001 | Wong et al. |
| 6,323,823 B1 | 11/2001 | Wong et al. |
| 6,330,460 B1 | 12/2001 | Wong et al. |
| 6,347,234 B1 | 2/2002 | Scherzer |
| 6,351,237 B1 | 2/2002 | Martek et al. |
| 6,362,790 B1 | 3/2002 | Proctor, Jr. et al. |
| D455,420 S | 4/2002 | Arpe |
| 6,373,908 B2 | 4/2002 | Chan |
| 6,377,217 B1 | 4/2002 | Zhu et al. |
| 6,396,456 B1 | 5/2002 | Chiang et al. |
| 6,400,317 B2 | 6/2002 | Rouphael et al. |
| 6,404,386 B1 | 6/2002 | Proctor, Jr. et al. |
| 6,453,177 B1 | 9/2002 | Wong et al. |
| 6,462,710 B1 | 10/2002 | Carson et al. |
| 6,463,303 B1 | 10/2002 | Zhao |
| 6,473,036 B2 | 10/2002 | Proctor, Jr. |
| 6,486,828 B1 | 11/2002 | Cahn et al. |
| 6,515,616 B1 | 2/2003 | Kuplicki |
| 6,515,635 B2 | 2/2003 | Chiang et al. |
| 6,518,920 B2 | 2/2003 | Proctor, Jr. et al. |
| 6,522,897 B1 | 2/2003 | Martek et al. |
| 6,529,172 B2 | 3/2003 | Zimmerman |
| 6,583,760 B2 | 6/2003 | Martek et al. |
| 6,600,456 B2 | 7/2003 | Gothard et al. |
| 6,611,231 B2 | 8/2003 | Crilly, Jr. et al. |
| 6,754,475 B1 | 6/2004 | Harrison et al. |
| 6,792,290 B2 | 9/2004 | Proctor, Jr. et al. |
| 6,859,503 B2 | 2/2005 | Pautler et al. |
| 6,873,293 B2 | 3/2005 | Proctor, Jr. et al. |
| 6,888,504 B2 | 5/2005 | Chiang et al. |
| 6,894,653 B2 | 5/2005 | Chiang et al. |
| 6,912,195 B2 | 6/2005 | Vook et al. |
| D507,263 S | 7/2005 | Narita |
| 6,927,728 B2 | 8/2005 | Vook et al. |
| 6,933,887 B2 | 8/2005 | Regnier et al. |
| 6,967,625 B1 | 11/2005 | Honda |
| 6,970,682 B2 | 11/2005 | Crilly, Jr. et al. |
| 6,980,169 B2 | 12/2005 | Honda |
| 6,985,123 B2 | 1/2006 | Gottl |
| 6,987,819 B2 | 1/2006 | Thomas et al. |
| 6,989,797 B2 | 1/2006 | Gothard et al. |
| 6,992,621 B2 | 1/2006 | Casas et al. |
| 6,995,712 B2 | 2/2006 | Boyanov |
| 6,995,725 B1 | 2/2006 | Honda et al. |
| 7,009,559 B2 | 3/2006 | Regnier et al. |
| 7,027,837 B1 | 4/2006 | Uhlik et al. |
| 7,034,759 B2 | 4/2006 | Proctor, Jr. et al. |
| 7,062,296 B2 | 6/2006 | Brennan et al. |
| 7,099,698 B2 | 8/2006 | Tarokh et al. |
| 7,113,786 B2 | 9/2006 | Proctor, Jr. |
| 7,126,929 B2 | 10/2006 | Tumey et al. |
| D532,780 S | 11/2006 | Proctor, Jr. et al. |
| 7,133,461 B2 | 11/2006 | Thomas et al. |
| 7,139,328 B2 | 11/2006 | Thomas et al. |
| 7,171,223 B2 | 1/2007 | Herscovich et al. |
| 7,176,844 B2 | 2/2007 | Chiang et al. |
| 7,177,369 B2 | 2/2007 | Crilly, Jr. et al. |
| 7,187,904 B2 | 3/2007 | Gainey et al. |
| 7,193,562 B2 | 3/2007 | Shtrom |
| 7,200,134 B2 | 4/2007 | Proctor, Jr. et al. |
| 7,215,297 B2 | 5/2007 | Gothard et al. |
| 7,221,722 B2 | 5/2007 | Thomas et al. |
| 7,224,685 B2 | 5/2007 | Proctor, Jr. |
| 7,227,907 B2 | 6/2007 | Proctor, Jr. et al. |
| 7,230,935 B2 | 6/2007 | Proctor, Jr. et al. |
| 7,233,771 B2 | 6/2007 | Proctor, Jr. et al. |
| 7,242,722 B2 | 7/2007 | Krauss et al. |
| 7,248,645 B2 | 7/2007 | Vialle et al. |
| 7,253,783 B2 | 8/2007 | Chiang et al. |
| 7,256,750 B1 | 8/2007 | Honda |
| 7,260,141 B2 | 8/2007 | Bierly et al. |
| 7,277,731 B2 | 10/2007 | Stratis et al. |
| 7,280,082 B2 | 10/2007 | Theobold et al. |
| 7,289,481 B2 | 10/2007 | Wax et al. |

(56) References Cited

U.S. PATENT DOCUMENTS

| | | | | |
|---|---|---|---|---|
| 7,289,827 | B2 | 10/2007 | Proctor, Jr. et al. | |
| 7,292,198 | B2 | 11/2007 | Shtrom | |
| 7,292,663 | B1 | 11/2007 | Van Wechel et al. | |
| 7,308,285 | B2 | 12/2007 | Nelson, Jr. et al. | |
| D565,634 | S | 4/2008 | Ingalsbe et al. | |
| 7,358,912 | B1 | 4/2008 | Kish et al. | |
| 7,362,280 | B2 | 4/2008 | Shtrom et al. | |
| 7,394,439 | B1 | 7/2008 | Johnson et al. | |
| 7,403,501 | B2 | 7/2008 | Bordonaro et al. | |
| 7,426,175 | B2 | 9/2008 | Zhuang et al. | |
| 7,463,200 | B2 | 12/2008 | Gainey et al. | |
| 7,463,201 | B2 | 12/2008 | Chiang et al. | |
| 7,477,699 | B2 | 1/2009 | Wang et al. | |
| 7,498,996 | B2 | 3/2009 | Shtrom et al. | |
| 7,498,999 | B2 | 3/2009 | Shtrom | |
| 7,505,447 | B2 | 3/2009 | Kish et al. | |
| 7,508,842 | B2 | 3/2009 | Baum et al. | |
| 7,511,680 | B2 | 3/2009 | Shtrom et al. | |
| 7,525,486 | B2 | 4/2009 | Shtrom et al. | |
| 7,528,789 | B2 | 5/2009 | Gothard et al. | |
| 7,535,967 | B2 | 5/2009 | Krauss et al. | |
| D595,274 | S | 6/2009 | Skottke et al. | |
| D596,627 | S | 7/2009 | Cho et al. | |
| 7,561,206 | B2 | 7/2009 | Munsil et al. | |
| 7,573,805 | B2 | 8/2009 | Zhuang et al. | |
| 7,580,674 | B2 | 8/2009 | Gorsuch et al. | |
| 7,586,880 | B2 | 9/2009 | Proctor, Jr. | |
| 7,587,177 | B1 | 9/2009 | Kwong | |
| 7,592,969 | B2 | 9/2009 | Proctor, Jr | |
| 7,593,729 | B2 | 9/2009 | Barak et al. | |
| 7,599,290 | B2 | 10/2009 | Dos Remedios et al. | |
| D604,724 | S | 11/2009 | Vorreiter et al. | |
| 7,616,554 | B2 | 11/2009 | Asai et al. | |
| 7,620,370 | B2 | 11/2009 | Barak et al. | |
| 7,639,106 | B2 | 12/2009 | Shtrom | |
| 7,646,343 | B2 | 1/2010 | Shtrom et al. | |
| 7,652,632 | B2 | 1/2010 | Shtrom | |
| 7,669,232 | B2 | 2/2010 | Jou et al. | |
| 7,675,474 | B2 | 3/2010 | Shtrom et al. | |
| 7,696,946 | B2 | 4/2010 | Shtrom | |
| 7,706,249 | B2 | 4/2010 | Akita et al. | |
| 7,729,431 | B2 | 6/2010 | Gebara et al. | |
| 7,733,285 | B2 | 6/2010 | Gainey et al. | |
| D619,571 | S | 7/2010 | Lee | |
| 7,751,307 | B2 | 7/2010 | Muck et al. | |
| 7,756,519 | B2 | 7/2010 | Barak et al. | |
| D622,256 | S | 8/2010 | Lockenwitz | |
| 7,787,408 | B2 | 8/2010 | Proctor, Jr. et al. | |
| 7,787,436 | B2 | 8/2010 | Kish et al. | |
| 7,788,703 | B2 | 8/2010 | Jou et al. | |
| 7,817,641 | B1 | 10/2010 | Khandani | |
| 7,848,241 | B2 | 12/2010 | Natarajan et al. | |
| 7,864,119 | B2 | 1/2011 | Shtrom et al. | |
| 7,877,113 | B2 | 1/2011 | Kish et al. | |
| 7,880,683 | B2 | 2/2011 | Shtrom et al. | |
| 7,889,793 | B2 | 2/2011 | Han et al. | |
| 7,893,882 | B2 | 2/2011 | Shtrom | |
| 7,893,889 | B2 | 2/2011 | Proctor, Jr. et al. | |
| 7,894,779 | B2 * | 2/2011 | Meiyappan | H04B 1/1036 455/83 |
| 7,899,497 | B2 | 3/2011 | Kish et al. | |
| 7,907,513 | B2 | 3/2011 | Proctor, Jr. et al. | |
| 7,907,891 | B2 | 3/2011 | Proctor, Jr. et al. | |
| 7,911,985 | B2 | 3/2011 | Proctor, Jr. et al. | |
| 7,912,419 | B2 | 3/2011 | Lee et al. | |
| 7,929,921 | B2 | 4/2011 | Love et al. | |
| 7,933,628 | B2 | 4/2011 | Kish et al. | |
| 7,948,942 | B2 | 5/2011 | Zhang et al. | |
| 7,965,252 | B2 | 6/2011 | Shtrom et al. | |
| 7,978,144 | B2 | 7/2011 | Tanabe et al. | |
| D643,025 | S | 8/2011 | Podduturi | |
| 7,990,904 | B2 | 8/2011 | Proctor, Jr. et al. | |
| 8,023,885 | B2 | 9/2011 | Proctor, Jr. et al. | |
| 8,027,642 | B2 | 9/2011 | Proctor, Jr. et al. | |
| 8,059,727 | B2 | 11/2011 | Proctor, Jr. et al. | |
| 8,060,009 | B2 | 11/2011 | Gainey et al. | |
| 8,068,068 | B2 | 11/2011 | Kish et al. | |
| 8,078,100 | B2 | 12/2011 | Proctor, Jr. et al. | |
| 8,078,109 | B1 | 12/2011 | Mulcay | |
| 8,085,206 | B2 | 12/2011 | Shtrom | |
| 8,089,913 | B2 | 1/2012 | Proctor, Jr. et al. | |
| 8,089,949 | B2 | 1/2012 | Kish | |
| 8,095,067 | B2 | 1/2012 | Gainey et al. | |
| 8,111,645 | B2 | 2/2012 | Proctor, Jr. et al. | |
| 8,116,239 | B2 | 2/2012 | Proctor, Jr. et al. | |
| 8,116,264 | B2 | 2/2012 | Lim et al. | |
| 8,116,578 | B2 | 2/2012 | Han et al. | |
| 8,121,535 | B2 | 2/2012 | Proctor, Jr. et al. | |
| 8,122,134 | B2 | 2/2012 | Proctor, Jr. et al. | |
| 8,125,975 | B2 | 2/2012 | Kish et al. | |
| 8,130,847 | B2 | 3/2012 | Vook et al. | |
| 8,150,470 | B2 | 4/2012 | Kish et al. | |
| 8,175,535 | B2 * | 5/2012 | Mu | H04B 1/525 455/67.11 |
| 8,238,318 | B1 * | 8/2012 | Negus | H04L 27/01 370/338 |
| 8,300,590 | B1 * | 10/2012 | Negus | H04L 5/14 370/329 |
| 8,311,023 | B1 * | 11/2012 | Negus | H04L 25/03019 370/338 |
| 8,385,305 | B1 | 2/2013 | Negus et al. | |
| 8,422,540 | B1 * | 4/2013 | Negus | H01Q 21/062 375/219 |
| 8,467,363 | B2 | 6/2013 | Lea et al. | |
| 8,502,733 | B1 | 8/2013 | Negus et al. | |
| 8,638,839 | B2 * | 1/2014 | Negus | H01Q 21/062 375/219 |
| D704,174 | S | 5/2014 | Negus et al. | |
| 8,761,100 | B2 | 6/2014 | Negus et al. | |
| 8,811,365 | B2 | 8/2014 | Negus | |
| 8,824,442 | B2 | 9/2014 | Lea et al. | |
| 8,872,715 | B2 | 10/2014 | Lea et al. | |
| 8,928,542 | B2 | 1/2015 | Lea et al. | |
| 8,948,235 | B2 * | 2/2015 | Negus | H04B 1/38 375/219 |
| 9,178,558 | B2 | 11/2015 | Lea et al. | |
| 9,374,822 | B2 | 6/2016 | Negus | |
| 10,063,363 | B2 * | 8/2018 | Negus | H04B 1/54 |
| 2001/0030939 | A1 | 10/2001 | Vijayan et al. | |
| 2001/0035844 | A1 | 11/2001 | Reece et al. | |
| 2001/0050927 | A1 | 12/2001 | Johnson | |
| 2002/0048062 | A1 | 4/2002 | Sakamoto | |
| 2002/0060993 | A1 | 5/2002 | Dent | |
| 2002/0064141 | A1 | 5/2002 | Sakakura | |
| 2004/0006573 | A1 | 1/2004 | Takashi | |
| 2004/0151238 | A1 * | 8/2004 | Masenten | H04B 1/525 375/219 |
| 2004/0165650 | A1 | 8/2004 | Miyazaki et al. | |
| 2005/0026616 | A1 | 2/2005 | Cavalli et al. | |
| 2005/0075078 | A1 | 4/2005 | Makinen et al. | |
| 2005/0084003 | A1 | 4/2005 | Duron et al. | |
| 2005/0219140 | A1 | 10/2005 | Browne et al. | |
| 2006/0056365 | A1 | 3/2006 | Das et al. | |
| 2006/0079290 | A1 | 4/2006 | Seto et al. | |
| 2006/0098616 | A1 | 5/2006 | Kish et al. | |
| 2006/0109067 | A1 | 5/2006 | Shtrom | |
| 2006/0141929 | A1 | 6/2006 | Lockie et al. | |
| 2006/0164271 | A1 | 7/2006 | Hirt et al. | |
| 2006/0192720 | A1 | 8/2006 | Shtrom | |
| 2006/0209746 | A1 | 9/2006 | Asai et al. | |
| 2006/0253526 | A1 | 11/2006 | Welch et al. | |
| 2006/0273952 | A1 * | 12/2006 | Krikorian | G01S 7/352 342/198 |
| 2007/0026807 | A1 | 2/2007 | Kish | |
| 2007/0097899 | A1 | 5/2007 | Larsson et al. | |
| 2007/0146225 | A1 | 6/2007 | Boss et al. | |
| 2007/0155431 | A1 | 7/2007 | Munzner et al. | |
| 2007/0243878 | A1 | 10/2007 | Taira et al. | |
| 2007/0264935 | A1 | 11/2007 | Mohebbi | |
| 2008/0014948 | A1 | 1/2008 | Scheinert | |
| 2008/0080364 | A1 | 4/2008 | Barak et al. | |
| 2008/0090575 | A1 * | 4/2008 | Barak | H04W 28/18 455/444 |

(56) References Cited

U.S. PATENT DOCUMENTS

| | | |
|---|---|---|
| 2008/0129640 A1 | 6/2008 | Shtrom et al. |
| 2008/0136736 A1 | 6/2008 | Proctor et al. |
| 2008/0159212 A1 | 7/2008 | Zhang et al. |
| 2008/0181282 A1 | 7/2008 | Wala et al. |
| 2008/0225758 A1 | 9/2008 | Proctor et al. |
| 2008/0225775 A1 | 9/2008 | Proctor et al. |
| 2008/0225929 A1 | 9/2008 | Proctor et al. |
| 2008/0225930 A1 | 9/2008 | Proctor et al. |
| 2008/0225931 A1 | 9/2008 | Proctor et al. |
| 2008/0232241 A1 | 9/2008 | Proctor et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2008/0311848 A1 | 12/2008 | Proctor, Jr. et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0135745 A1 | 5/2009 | Gainey et al. |
| 2009/0143017 A1 | 6/2009 | Barak et al. |
| 2009/0252134 A1 | 10/2009 | Schlicht et al. |
| 2009/0274130 A1 | 11/2009 | Boch |
| 2009/0290526 A1 | 11/2009 | Gainey et al. |
| 2009/0304055 A1 | 12/2009 | Nino et al. |
| 2009/0312022 A1 | 12/2009 | Viorel et al. |
| 2009/0323582 A1 | 12/2009 | Proctor, Jr. et al. |
| 2009/0323621 A1 | 12/2009 | Touboul et al. |
| 2010/0002620 A1 | 1/2010 | Proctor, Jr. et al. |
| 2010/0009694 A1 | 1/2010 | Fischer |
| 2010/0033396 A1 | 2/2010 | Tanabe et al. |
| 2010/0046439 A1 | 2/2010 | Chen et al. |
| 2010/0056205 A1 | 3/2010 | Fuss |
| 2010/0080151 A1 | 4/2010 | Proctor, Jr. et al. |
| 2010/0157970 A1 | 6/2010 | Gotman et al. |
| 2010/0165910 A1 | 7/2010 | Mathews et al. |
| 2010/0261423 A1 | 10/2010 | Stanforth et al. |
| 2010/0272006 A1 | 10/2010 | Bertrand et al. |
| 2010/0284445 A1 | 11/2010 | Barriac et al. |
| 2010/0284447 A1 | 11/2010 | Gore et al. |
| 2010/0285733 A1 | 11/2010 | Gore et al. |
| 2010/0285735 A1 | 11/2010 | Gore et al. |
| 2010/0285736 A1 | 11/2010 | Gore et al. |
| 2010/0291865 A1 | 11/2010 | Gore et al. |
| 2010/0309048 A1 | 12/2010 | Polisetty et al. |
| 2011/0044279 A1 | 2/2011 | Johansson et al. |
| 2011/0070855 A1 | 3/2011 | Mariotti |
| 2011/0075754 A1 | 3/2011 | Smith |
| 2011/0235514 A1 | 3/2011 | Huang et al. |
| 2011/0085525 A1 | 4/2011 | Patini |
| 2011/0103292 A1 | 5/2011 | Pasad et al. |
| 2011/0164186 A1 | 7/2011 | Sadek |
| 2011/0170473 A1 | 7/2011 | Proctor, Jr. et al. |
| 2011/0182174 A1 | 7/2011 | Pi et al. |
| 2011/0206155 A1 | 8/2011 | Fujimura et al. |
| 2011/0299617 A1 | 12/2011 | Maddah-Ali et al. |
| 2012/0007790 A1 | 1/2012 | Shtrom et al. |
| 2012/0015603 A1 | 1/2012 | Proctor, Jr. et al. |
| 2012/0015608 A1 | 1/2012 | Proctor, Jr. et al. |
| 2012/0039259 A1 | 2/2012 | Kish et al. |
| 2012/0058777 A1 | 3/2012 | Nguyen et al. |
| 2012/0063379 A1 | 3/2012 | Kish |
| 2012/0063472 A1 | 3/2012 | Le Pallec et al. |
| 2012/0068904 A1 | 3/2012 | Shtrom |
| 2012/0094705 A1 | 4/2012 | Kish et al. |
| 2012/0108284 A1 | 5/2012 | Patel et al. |
| 2012/0115412 A1 | 5/2012 | Gainey et al. |
| 2012/0122477 A1 | 5/2012 | Sadek et al. |
| 2012/0184222 A1 | 7/2012 | Seok |
| 2012/0201153 A1 | 8/2012 | Bharadia et al. |
| 2012/0201173 A1 | 8/2012 | Jain et al. |
| 2013/0044028 A1 | 2/2013 | Lea et al. |
| 2013/0089041 A1 | 4/2013 | Negus et al. |
| 2013/0089042 A1 | 4/2013 | Negus et al. |
| 2013/0089083 A1 | 4/2013 | Negus et al. |
| 2013/0100897 A1 | 4/2013 | Negus |
| 2013/0272217 A1 | 10/2013 | Negus et al. |
| 2013/0273974 A1 | 10/2013 | Lea et al. |
| 2013/0288593 A1 | 10/2013 | Norin et al. |
| 2013/0293419 A1 | 11/2013 | Negus et al. |
| 2013/0343440 A1 | 12/2013 | Negus et al. |
| 2014/0106688 A1 | 4/2014 | Negus et al. |
| 2014/0120966 A1 | 5/2014 | Fischer et al. |
| 2014/0184455 A1 | 7/2014 | Lea et al. |
| 2014/0329562 A1 | 11/2014 | Proctor, Jr. et al. |
| 2015/0016561 A1 | 1/2015 | Negus et al. |
| 2015/0049720 A1 | 2/2015 | Negus et al. |
| 2015/0084826 A1 | 3/2015 | Lea et al. |
| 2015/0103745 A1 | 4/2015 | Negus et al. |
| 2015/0156777 A1 | 6/2015 | Negus et al. |
| 2015/0200709 A1 | 7/2015 | Negus et al. |
| 2015/0223082 A1 | 8/2015 | Negus et al. |
| 2015/0223250 A1 | 8/2015 | Negus |
| 2015/0230105 A1 | 8/2015 | Negus et al. |
| 2015/0372738 A1 | 12/2015 | Negus et al. |
| 2016/0013831 A1 | 1/2016 | Lea et al. |
| 2016/0248467 A1 | 8/2016 | Lea et al. |
| 2017/0054545 A1 | 2/2017 | Negus |

FOREIGN PATENT DOCUMENTS

| | | |
|---|---|---|
| EP | 2839693 | 2/2015 |
| EP | 2843863 A1 | 3/2015 |
| WO | WO 2007/146685 | 12/2007 |
| WO | WO 2008/007375 A2 | 1/2008 |
| WO | WO 2009/027408 | 3/2009 |
| WO | WO 2011/030960 A1 | 3/2011 |
| WO | WO 2011/080299 A3 | 7/2011 |
| WO | WO 2013/025413 A1 | 2/2013 |
| WO | WO 2013/055947 A1 | 4/2013 |
| WO | WO 2013/158237 A2 | 10/2013 |
| WO | WO 2014/040083 A2 | 3/2014 |

OTHER PUBLICATIONS

"Advances in Backhaul Synchronization—Maximizing ROI," Application Brief, Symmetricom Inc., 2008, 6 pages.

"Carrier Ethernet Services Overview," Presentation, MEF, Aug. 2008, 32 pages.

"Clock Distribution and Synchronization over Ethernet: IEEE1588v2 and SyncE," Presentation, VITESSE, Sep. 2009, 9 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

"DAN2400-PTP—Open SoC Platform for Sub-6GHz Wireless Point-to-Point Systems," DesignArt Networks, Jul. 2008, 2 pages.

"Doubling Capacity in Wireless Channels," Provigent Inc., 2008, 3 pages.

"Evolving Microwave Mobile Backhaul for Next-Generation Networks," White Paper, NEC Corp., Feb. 2008, 4 pages.

"GainSpan GS1011M Low Power Wi-Fi® Module Family," Product Brief—Preliminary, GainSpan Corp., 2009, 2 pages.

"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.

"IEEE 1588v2 (Precision Time Protocol) Testing," Application Note, IXIA, Dec. 2009.

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.

"MGA-21108—Broadband Fully Integrated Matched Low-Noise Amplifier MMIC," Data Sheet, Avago Technologies, Aug. 2009, 21 pages.

"MGA-22003—2.3-2.7 GHz 3×3mm WiMAX/WiBro and WiFi Linear Amplifier Module," Data Sheet, Avago Technologies, Mar. 2010, 15 pages.

"MGA-23003—3.3-3.8 GHz 3×3mm WiMAX Power Amplifier," Data Sheet, Avago Technologies, Mar. 2010, 16 pages.

(56) References Cited

OTHER PUBLICATIONS

"MGA-25203—5.1-5.9GHz 3×3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.
"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e—2005 and IEEE Std 802.16-2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203-PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz—2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"Unified Mobile Backhaul," DesignArt Networks, Jan. 26, 2011, 8 pages.
"Using OAM for Efficient and Cost-Effective Ethernet Backhaul Network Management," Application Note 229, EXFO Inc., Quebec City, Canada, 2010, 4 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Choi, J. II et al., "Achieving Single Channel, Full Duplex Wireless Communication," MobiCom'10, Sep. 20-24, 2010, 12 pages.
Choi, J, II et al., "Full-Duplex Wireless Design," Stanford University, 4 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Cuypers, G. et al., "Improved Frequency Domain Equalizers for Zero-Padded Single-Carrier Block Transmission," Feb. 3, 2011, 14 pages.
Duarte, M. et al., "Full-Duplex Wireless Communications Using Off-The-Shelf Radios: Feasibility and First Results," Conference Record of the Forty Fourth Asilomar Conference on Signals, Systems and Computers (ASILOMAR), Nov. 7-10, 2010, pp. 1558-1562.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hallwachs, J., "Unleashing the Mobile Broadband Radio: Next-generation SoC Platforms Drive "Distributed Multi-gigabit RF Networks,"" DesignArt Networks, 2010, 12 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Hong, S. et al., "Picasso: Flexible RF and Spectrum Slicing," SIGCOMM'12, Aug. 13-17, 2012, 16 pages.
Jain, M. et al., "Practical, Real-time, Full Duplex Wireless," MobiCom'11, Sep. 19-23, 2011, 12 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.

(56) References Cited

OTHER PUBLICATIONS

Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron, Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Ravindran, S., "Stanford Researchers Develop Wireless Technology for Faster, More Efficient Communication Networks," Stanford University News, Feb. 14, 2011, 3 pages.
Ruth-Rice, D., "Double Wireless Capacity With 'Full-Duplex,'" Futurity.org, Sep. 7, 2011, 4 pages.
Sahai, A. et al., "Pushing the Limits of Full-duplex: Design and Real-time Implementation," Department of Electrical and Computer Engineering Rice University, Technical Report TREE1104, Jul. 4, 2011, 12 pages.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
Partial European Search Report in European Patent Application No. 12839752.8, dated Jun. 16, 2015.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/USO13/48782, dated Jul. 29, 2013.
International Search Report and Written Opinion for PCT Application No. PCT/US2013/059095 dated Dec. 12, 2013.
Extended European Search Report in European Patent Application No. 12824072.8, dated Jul. 15, 2015.
Extended European Search Report in European Patent Application No. 14177662.5, dated Feb. 3, 2015.

* cited by examiner

Mathematical representation of depicted signals at transmitter

Transmitter Antenna Radiated Signals $$X_1(t) = G_{Tx1} \times Tx_1(t-\tau_{Tx1}) + N_{Tx1}(t) + X_{IMTx1}(t) \qquad (19\text{-}1)$$

$$X_2(t) = G_{Tx2} \times Tx_2(t-\tau_{Tx2}) + N_{Tx2}(t) + X_{IMTx2}(t) \qquad (19\text{-}2)$$

$G_{Txm}$ = complex transfer function from digital baseband to antenna m
$\tau_{Txm}$ = delay from digital baseband to antenna m
$N_{Txm}(t)$ = transmitter noise at antenna m
$X_{IMTxm}(t)$ = intermodulation products of $Tx_m$ at antenna m

Transmitter Sampled RF Signals into L1

$$Xs_1(t) = G_{S1} \times [\, X_1(t-\tau_{s1}) + \Sigma_{i=0,\infty} \{X_2(t-\tau_{tx2,1,i}-\tau_{s1}) \times LOtx_{2,1,i}\} + I_{tx1}(t-\tau_{s1})\,] + N_{S1}(t) \qquad (19\text{-}3)$$

$$Xs_2(t) = G_{S2} \times [\, X_2(t-\tau_{s2}) + \Sigma_{i=0,\infty} \{X_1(t-\tau_{tx1,2,i}-\tau_{s2}) \times LOtx_{1,2,i}\} + I_{tx2}(t-\tau_{s2})\,] + N_{S2}(t) \qquad (19\text{-}4)$$

$G_{Sm}$ = complex transfer function from antenna m to L1 input m
$\tau_{sm}$ = delay from antenna m to L1 input m
$\tau_{txm1,m2,i}$ = $i^{th}$ propagation path delay from Tx antennas m1 to m $LOtx_{m1,m2,i}$ = $i^{th}$ propagation path complex transfer function from Tx antennas m1 to m2
$I_{txm}(t)$ = uncoordinated interference received at Tx antenna m
$N_{Sm}(t)$ = equivalent noise of L1 input m

Fig. 19

Mathematical representation of depicted signals at receiver

Receiver Antenna Signals (for q=1 to 8)

$$Y_q(t) = Y_{Rxq}(t) + \sum_{m=1,2}\{ \sum_{i=0,\infty}\{X_m(t-\tau_{m,q,i}) \times LO_{m,q,i} \} \} + N_{Rxq}(t) + I_{Rxq}(t) \qquad (20\text{-}1)$$

$Y_{Rxq}(t)$ = received signal from other end of link at Rx antenna q
$\tau_{m,q,i}$ = $i^{th}$ propagation path delay from Tx antenna m to Rx antenna q
$LO_{m,q,i}$ = $i^{th}$ propagation path complex transfer function from Tx antenna m to Rx antenna q
$I_{Rxq}(t)$ = interference received at Rx antenna q
$N_{Rxq}(t)$ = equivalent input noise of Rx antenna q front-end Receive Chain RF Input Signals (for n=1 to 4)

$$Z_n(t) = \sum_{q=1,8}\{ G_{Rxq,n} \times Y_q(t-\tau_{Rxq,n}) + X_{IMq,n}(t) \} + N_{DCn}(t) + C1_n(t) \qquad (20\text{-}2)$$

$G_{Rxq,n}$ = complex transfer function from Rx antenna q to Rx downconverter chain n
$\tau_{Rxq,n}$ = delay from Rx antenna q to Rx downconverter chain n
$N_{DCn}(t)$ = equivalent input noise of Rx downconverter chain n
$X_{IMq,n}(t)$ = intermods of signals input to Rx antenna q at input to Rx downconverter chain n and $C1_n(t)$ = output of L1 at Rx downconverter chain input n, wherein $$C1_n(t) = \sum_{m=1,2}\{ \sum_{d=0,D1}\{ W1_{m,n,d} \times G1_{m,d} \times Xs_m(t-\tau_d) \} + X_{IMC1m,n}(t) \} \qquad (20\text{-}3)$$

Fig. 20

Mathematical representation of depicted signals at Rx chain input

Receive Chain RF Input Signals (for n=1 to 4)

$$Z_n(t) = ( \Sigma_{q=1,8}\{ G_{Rxq,n} \times Y_{Rxq}(t-\tau_{Rxq,n}) \} ) \quad \text{(21-01) (desired Rx chain signal)}$$

$$+ ( \Sigma_{q=1,8}\{ G_{Rxq,n} \times [N_{Rxq}(t-\tau_{Rxq,n}) + I_{Rxq}(t-\tau_{Rxq,n})] \} + N_{DCn}(t) ) \quad \text{(21-02) (Rx chain input noise floor)}$$

$$+ ( \Sigma_{q=1,8}\{ G_{Rxq,n} \times \Sigma_{m=1,2}\{ \Sigma_{i=0,\infty} \{X_m(t-\tau_{m,q,i}-\tau_{Rxq,n}) \times LO_{m,q,i} \}\}\} ) \quad \text{(21-03) (undesired Tx leakage)}$$

$$+ ( C1_n(t) ) \quad \text{(21-04) (L1 output signal)}$$

$$+ ( \Sigma_{q=1,8}\{ X_{IMq,n}(t) \} ) \quad \text{(21-05) (undesired Rx intermods)}$$

Mathematical representation of depicted signals at Rx chain input

Receive Chain RF Input Signals (for n=1 to 4)

$Z_n(t) = (\Sigma_{q=1,8}\{ G_{Rxq,n} \times Y_{Rxq}(t-\tau_{Rxq,n}) \})$  (22-01)(desired Rx chain signal)

$+ (\Sigma_{q=1,8}\{ G_{Rxq,n} \times [N_{Rxq}(t-\tau_{Rxq,n}) + I_{Rxq}(t-\tau_{Rxq,n})] \} + N_{DCn}(t))$  (22-02)(Rx chain input noise floor)

$+ (\Sigma_{q=1,8}\{ G_{Rxq,n} \times \Sigma_{m=1,2}\{ G_{Txm} \times \Sigma_{i=0,\infty}[Tx_m(t-\tau_{Txm}-\tau_{m,q,i}-\tau_{Rxq,n}) \times LO_{m,q,i}]\}\})$  (22-03)(undesired Tx signal)

$+ (\Sigma_{q=1,8}\{ G_{Rxq,n} \times \Sigma_{m=1,2}\{ \Sigma_{i=0,\infty}\{N_{Txm}(t-\tau_{m,q,i}-\tau_{Rxq,n}) \times LO_{m,q,i}\}\}\})$  (22-04)(undesired Tx noise)

$+ (\Sigma_{q=1,8}\{ G_{Rxq,n} \times \Sigma_{m=1,2}\{ \Sigma_{i=0,\infty}\{X_{IMTxm}(t-\tau_{m,q,i}-\tau_{Rxq,n}) \times LO_{m,q,i}\}\}\})$  (22-05)(undesired Tx intermods)

$+ (\Sigma_{m=1,2}\{ \Sigma_{d=0,D1}\{ W1_{m,n,d} \times G1_{m,d} \times G_{Sm} \times [X_m(t-\tau_{sm}-\tau_d)$
$+ \Sigma_{i=0,\infty}\{X_{(3-m)}(t-\tau_{tx(3-m),m,i}-\tau_{sm}-\tau_d) \times LOtx_{(3-m),m,i}\}]\})$  (22-06)(L1 cancellation signal)

$+ (\Sigma_{m=1,2}\{ \Sigma_{d=0,D1}\{ W1_{m,n,d} \times G1_{m,d} \times [G_{Sm} \times I_{txm}(t-\tau_{sm}-\tau_d) + N_{Sm}(t-\tau_d)]\}\})$  (22-07)(L1 noise and interference)

$+ (\Sigma_{m=1,2}\{ X_{IMC1m,n}(t) \})$  (22-08)(undesired L1 intermods)

$+ (\Sigma_{q=1,8}\{ X_{IMq,n}(t) \})$  (22-09)(undesired Rx intermods)

Mathematical representation of depicted signals at Rx chain input

Receive Chain RF Input Signals (for n=1 to 4)

$Z_n(t) = (\sum_{q=1,8}\{ G_{Rxq,n} \times Y_{Rxq}(t-\tau_{Rxq,n}) \})$ $+ (\sum_{q=1,8}\{ G_{Rxq,n} \times [N_{Rxq}(t-\tau_{Rxq,n}) + I_{Rxq}(t-\tau_{Rxq,n})] \} + N_{DCn}(t))$ (23-01)(desired Rx chain signal)

(23-02)(Rx chain input noise floor)

$+ (\sum_{q=1,8}\{ G_{Rxq,n} \times \sum_{m=1,2}\{ G_{Txm} \times \sum_{i=0,\infty}\{Tx_m(t-\tau_{Txm}-\tau_{m,q,i}-\tau_{Rxq,n}) \times LO_{m,q,i} \}\}\}$
$+ \sum_{m=1,2}\{ \sum_{d=0,D1}\{ W1_{m,n,d} \times G1_{m,d} \times G_{Sm} \times [ G_{Txm} \times Tx_m(t-\tau_{Txm}-\tau_{sm}-\tau_d)$
$\times G_{Tx(3-m)} \times \sum_{i=0,\infty}\{ Tx_{(3-m)}(t-\tau_{Txm}-\tau_{tx(3-m),m,i}-\tau_{sm}-\tau_d) \times LOtx_{(3-m),m,i} \}]\}\})$ (23-03)(residual Tx signal)

$+ (\sum_{q=1,8}\{ G_{Rxq,n} \times \sum_{m=1,2}\{ \sum_{i=0,\infty}\{N_{Txm}(t-\tau_{m,q,i}-\tau_{Rxq,n}) \times LO_{m,q,i} \}\}\}$
$+ \sum_{m=1,2}\{ \sum_{d=0,D1}\{ W1_{m,n,d} \times G1_{m,d} \times G_{Sm} \times [N_{Txm}(t-\tau_{sm}-\tau_d)$
$+ \sum_{i=0,\infty}\{N_{Tx(3-m)}(t-\tau_{tx(3-m),m,i}-\tau_{sm}-\tau_d) \times LOtx_{(3-m),m,i} \}]\}\})$ (23-04)(residual Tx noise)

$+ (\sum_{q=1,8}\{ G_{Rxq,n} \times \sum_{m=1,2}\{ \sum_{i=0,\infty}\{X_{IMTxm}(t-\tau_{m,q,i}-\tau_{Rxq,n}) \times LO_{m,q,i} \}\}\}$
$+ \sum_{m=1,2}\{ \sum_{d=0,D1}\{ W1_{m,n,d} \times G1_{m,d} \times G_{Sm} \times [X_{IMTxm}(t-\tau_{sm}-\tau_d)$
$+ \sum_{i=0,\infty}\{X_{IMTx(3-m)}(t-\tau_{tx(3-m),m,i}-\tau_{sm}-\tau_d) \times LOtx_{(3-m),m,i} \}]\}\})$ (23-05)(residual Tx intermods)

$+ (\sum_{m=1,2}\{ \sum_{d=0,D1}\{ W1_{m,n,d} \times G1_{m,d} \times [ G_{Sm} \times I_{txm}(t-\tau_{sm}-\tau_d) + N_{sm}(t-\tau_d) ]\}\})$ (23-06)(L1 noise and interference)

$+ (\sum_{m=1,2}\{ X_{IMC1m,n}(t) \})$ (23-07)(undesired L1 intermods)

$+ (\sum_{q=1,8}\{ X_{IMq,n}(t) \})$ (23-08)(undesired Rx intermods)

Fig. 23

Mathematical representation of depicted signals at Rx chain input

Receive Chain Digital Output Signals (for n=1 to 4)

$Rx_n(t) = G_{DCn} \times Z_n(t-\tau_{DCn}) + C3D_n(t)$  (24-01)

$G_{DCn}$ = complex transfer function from receive chain input to output
$\tau_{DCn}$ = delay from receive chain input to output and $C3D_n(t)$ = output of L3 at Rx downconverter chain output n, wherein $C3D_n(t) = \sum_{m=1,2} \{ \sum_{d3=0,D3} \{ W3_{m,n,d3} \times Tx_m(t-\tau_{d3}) \} \}$  (24-02)

Receive Chain Digital Output Signals (for n=1 to 4)

$Rx_n(t) \approx ( G_{DCn} \times \sum_{q=1,8} \{ G_{Rxq,n} \times Y_{Rxq}(t-\tau_{Rxq,n}-\tau_{DCn}) \} )$  (24-11) (desired Rx chain signal)

$+ ( G_{DCn} \times [ \sum_{q=1,8} G_{Rxq,n} \times [ N_{Rxq}(t-\tau_{Rxq,n}-\tau_{DCn}) + I_{Rxq}(t-\tau_{Rxq,n}-\tau_{DCn}) ] \}$
$+ N_{DCn}(t-\tau_{DCn}) + \sum_{m=1,2} \{ \sum_{d=0,D1} \{ W1_{m,n,d} \times G1_{m,d} \times G_{Sm} \times I_{txm}(t-\tau_{sm}-\tau_d-\tau_{DCn}) \} \} ] )$  (24-12) (Rx chain noise floor)

$+ ( G_{DCn} \times [ \sum_{q=1,8} \{ G_{Rxq,n} \times \sum_{m=1,2} \{ G_{Txm} \times \sum_{i=0,\infty} \{ Tx_m(t-\tau_{Txm}-\tau_{m,q,i}-\tau_{Rxq,n}-\tau_{DCn}) \times LO_{m,q,i} \} \} \}$
$+ \sum_{m=1,2} \{ \sum_{d=0,D1} \{ W1_{m,n,d} \times G1_{m,d} \times G_{Sm} \times [ G_{Txm} \times Tx_m(t-\tau_{Txm}-\tau_{sm}-\tau_d-\tau_{DCn})$
$+ G_{Tx(3-m)} \times \sum_{i=0,\infty} \{ Tx_{(3-m)}(t-\tau_{Txm}-\tau_{tx(3-m),m,i}-\tau_{sm}-\tau_d-\tau_{DCn}) \times LOtx_{(3-m),m,i} \} ] \} \} ]$
$+ \sum_{m=1,2} \{ \sum_{d3=0,D3} \{ W3_{m,n,d3} \times Tx_m(t-\tau_{d3}) \} \} )$  (24-13) (residual Tx signal)

ZERO DIVISION DUPLEXING MIMO RADIO WITH ADAPTABLE RF AND/OR BASEBAND CANCELLATION

PRIORITY

The present application is a continuation application of U.S. patent application Ser. No. 15/291,968 filed Oct. 12, 2016, currently pending, which is a continuation application of U.S. patent application Ser. No. 14/572,725 filed Dec. 16, 2014, (now U.S. Pat. No. 9,490,918 issued Nov. 8, 2016) which is a continuation application of U.S. patent application Ser. No. 14/108,200, filed on Dec. 16, 2013, (now U.S. Pat. No. 8,948,235 issued Feb. 3, 2015) which is a continuation application of U.S. patent application Ser. No. 13/767,796, filed on Feb. 14, 2013, (now U.S. Pat. No. 8,638,839 issued Jan. 28, 2014) which is a continuation application of U.S. patent application Ser. No. 13/609,156, filed on Sep. 10, 2012 (now U.S. Pat. No. 8,422,540 issued Apr. 16, 2013) which claims priority to Provisional Application Ser. No. 61/662,809, filed on Jun. 21, 2012, and Provisional Application Ser. No. 61/663,461, filed on Jun. 22, 2012, the entireties of which are hereby incorporated by reference.

BACKGROUND

1. Field

The present disclosure relates generally to data networking and in particular to a backhaul radio for connecting remote edge access networks to core networks with advantageous spectrum usage.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104*a* has either an nT1 copper interface or an optical fiber interface 124 to connect the BTS 104*a* to the Base Station Controller (BSC) 128. The BSC 128 either is part of or communicates with the core network of the cellular network operator. The BTS on the left 104*b* is identical to the BTS on the right 104*a* in FIG. 1 except that the BTS on the left 104*b* has no local wireline nT1 (or optical fiber equivalent) so the nT1 interface is instead connected to a conventional PTP microwave radio 132 with unobstructed LOS to the tower on the right 112*a*. The nT1 interfaces for both BTSs 104*a*, 104*b* can then be backhauled to the BSC 128 as shown in FIG. 1.

The conventional PTP radio on a whole is completely unsuitable for obstructed LOS or PMP operation. To overcome, these and other deficiencies of the prior art, one or more of the inventors has disclosed multiple exemplary embodiments of an "Intelligent Backhaul Radio" (or "IBR") in U.S. patent application Ser. No. 13/212,036, now U.S. Pat. No. 8,238,318, and Ser. No. 13/536,927, which share a common assignee to this invention and are hereby incorporated by reference in their entirety into this invention.

Both conventional PTP radios and IBRs can be operated using time division duplexing (or "TDD"). FIG. 2 depicts a generic digital radio, not necessarily a conventional PTP radio or an IBR, in a TDD configuration. With TDD, only one of the radios amongst the two peers depicted in FIG. 2 transmits at any given point in time according to a time schedule known to both radios. This enables both TDD radios to transmit and receive at the same frequency or within the same finite frequency band. Thus, relative to FIG. 2, each radio transmits and receives at a single nominal carrier frequency $f_1$, but when one radio in any given link (of which only one link is depicted in FIG. 2) is transmitting, then the other radio is receiving wherein neither radio transmits and receives at the same point in time.

Both conventional PTP radios and IBRs can be operated using frequency division duplexing (or "FDD"). FIG. 3 depicts a generic digital radio, not necessarily a conventional PTP radio or an IBR, in a conventional FDD configuration. With conventional FDD, each of the radios amongst the two peers depicted in FIG. 3 transmits at separate frequencies, $f_1$ and $f_2$, known to both radios but chosen such that frequency-selective filters within the transmitters and the receivers of each radio can sufficiently reject unwanted transmit noise and signal leakage within each receiver. In FDD, both radios amongst the two peers depicted in FIG. 3 can transmit and receive simultaneously.

There are well-known advantages and disadvantages for each of TDD or FDD operation for both the generic radios of FIGS. 2 and 3, or for IBRs or conventional PTP radios. Many advantages of TDD are related to disadvantages of FDD, or vice versa.

For example, in TDD antenna resources are easily shared between transmit and receive, which is a distinct advantage for TDD. Conversely, in FDD antenna resources are not easily shared and either separate antennas for transmit and receive or a frequency duplexer is required to support conventional FDD radio operation. For example, in utilizing TDD, the isolation of the receiver from the intentional or unintentional signals of the transmitter is straightforward since transmission occurs only when reception does not occur, and vice versa. Conversely, in utilizing FDD, the transmitter signals (both intentional and unintentional) must be highly isolated from the receiver channel, which is a disadvantage for FDD such that conventional FDD radios have required multiple additional filters relative to TDD as well as separate antennas or frequency duplexers. For example in TDD, spectrum access is very flexible as any portion of the radio spectrum that supports the desired channel bandwidth can theoretically be used and the duty cycle between transmit and receive can be varied easily, which is another distinct advantage for TDD. Conversely, in FDD spectrum access channels for transmit and receive need to be paired at frequency separations compatible with the isolation requirements for conventional FDD radio operation.

However, even conventional FDD radios have significant advantages over TDD despite the disadvantages described above. For example in FDD, with separate antennas between transmit and receive, the losses between either the power amplifier and the transmit antenna or the receive antenna and the low noise amplifier are lower than that of a TDD radio with a transmit/receive switch, which is an advantage for such an FDD radio. As another example in FDD, very high PHY and MAC efficiency can be obtained in a backhaul radio with simultaneously achieving very low latency in transmission and reception without any significant buffering at the network interface, which is a distinct advantage for FDD. Conversely, in TDD a trade-off is required between PHY and MAC efficiency on one hand and minimizing latency and buffering on the other hand. For example, in FDD all of the "non-antenna" resources, such as the entire transmit path and the entire receive path are utilized at all times. Conversely, in TDD much or all of the transmit path may be idle when receiving and vice versa for the receive path when transmitting, which significantly underutilizes the resources within a TDD radio. For example, in FDD a low latency feedback channel to each transmitter is available because a peer FDD radio does not need to wait until such transmitter stops transmitting to send feedback information that may enhance the link performance. Conversely, in TDD no feedback can occur until the transmitter stops and the radio goes to receive mode and thus feedback latency must also be traded off against overall efficiency.

Recently, it has been proposed that certain types of radio systems that operate within a single channel or band may transmit and receive simultaneously without all of the isolation circuitry and frequency separation of conventional FDD systems by adding a cancellation capability as shown conceptually in FIG. 4. In such an exemplary configuration, which is referred to herein as "Zero Division Duplexing" (or "ZDD"), each radio in a particular link transmits and receives at single nominal carrier frequency $f_1$ as is allowable for TDD, but can transmit and receive simultaneously as is allowable for FDD Such a ZDD radio has many of the advantages of FDD, such as for example only, low latency and high efficiency, as well as many of the advantages of TDD, such as for example only, flexible spectrum access. Furthermore, a ZDD radio in theory can have at least twice the single-link spectral efficiency of either an FDD or TDD radio by utilizing the same frequency channel simultaneously in both directions of a link. In some configurations, ZDD operation may be at two channels about a nominal frequency $f_1$ such that no conventional isolation filtering at RF is possible in which case the above referenced advantages still apply except for the spectral efficiency improvement. As shown in FIG. 4, exemplary ZDD radios have attempted to cancel unwanted transmitter leakage primarily by inverting the phase of an attenuated copy of the transmit signal and summing it at the receiver to substantially cancel the transmit signal leakage at the receiver antenna.

However, known techniques for implementing ZDD radios are completely inadequate for an IBR, or many other high performance antenna array based radio systems, to operate in any ZDD mode whether "co-channel" or "co-band".

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed invention are directed to backhaul radios utilizing zero division duplexing (ZDD) that are compact, light and low power for street level mounting, operate at 100 Mb/s or higher at ranges of 300 m or longer in obstructed LOS conditions with low latencies of 5 ms or less, can support PTP and PMP topologies, use radio spectrum resources efficiently and do not require precise physical antenna alignment. Radios with such exemplary capabilities as described by multiple various embodiments are referred to herein by the term "Intelligent Backhaul Radio" (IBR).

According to aspects of the invention, an intelligent backhaul radio is disclosed that includes a plurality of transmit RF chains to convert from a plurality of transmit chain input signals to a plurality of respective RF transmit chain signals; a plurality of adaptable RF transversal filter sets to convert a plurality of signals respectively derived from the plurality of RF transmit chain signals to a plurality of RF transmit leakage cancellation signals, wherein each adaptable RF transversal filter set is comprised of a plurality of adaptable RF transversal filters, each for filtering a respective one of said plurality of signals respectively derived from the plurality of RF transmit chain signals to provide a respective adaptable RF transversal filtered signal, and a combiner for combining the plurality of adaptable RF transversal filtered signals within the filter set to produce one of said RF transmit leakage cancellation signals; a plurality of RF cancellation combiners for respectively combining one of said plurality of RF transmit leakage cancellation signals with one of said plurality of RF receive signals to provide a plurality of RF receive chain input signals, and a plurality of receive RF chains to convert from said plurality of RF receive chain input signals to a plurality of respective receive chain output signals; a cancellation controller, for adapting each of said plurality of adaptable RF transversal filters of one or more of said plurality of adaptable RF transversal filter sets, wherein the cancellation controller utilizes a plurality of RF transmit leakage metrics respectively derived from each of said receive RF chains associated with each of said one or more adaptable RF transversal filters sets being adapted by said cancellation controller; one or more demodulator cores, wherein each demodulator core demodulates one or more receive symbol streams to produce a respective receive data interface stream; a frequency selective receive path channel multiplexer, interposed between the one or more demodulator cores and the plurality of receive RF chains, to produce the one or more receive symbol streams provided to the one or more demodulator cores from the plurality of receive chain output signals; an antenna array that includes a plurality of directive gain antenna elements; and one or more selectable RF connections that selectively couple certain of the plurality of directive gain antenna elements to certain of the plurality of receive RF chains, wherein the number of directive gain antenna elements that can be selectively coupled to receive RF chains exceeds the number of receive RF chains that can accept receive RF signals from the one or more selectable RF connections; and a radio resource controller, wherein the radio resource controller sets or causes to be set the specific selective couplings between the certain of the plurality of directive gain antenna elements and the certain of the plurality of receive RF chains.

According to other aspects of the invention an intelligent backhaul radio is disclosed that includes a plurality of transmit RF chains to convert from a plurality of transmit chain input signals to a plurality of respective RF transmit chain signals; a plurality of adaptable RF transversal filter sets to convert a plurality of signals respectively derived from the plurality of RF transmit chain signals to a plurality of RF transmit leakage cancellation signals, wherein each adaptable RF transversal filter set is comprised of a plurality of adaptable RF transversal filters, each for filtering a respective one of said plurality of signals respectively derived from the plurality of RF transmit chain signals to provide a respective adaptable RF transversal filtered signal, and a combiner for combining the plurality of adaptable RF transversal filtered signals within the filter set to produce one of said RF transmit leakage cancellation signals; a plurality of RF cancellation combiners for respectively combining one of said plurality of RF transmit leakage cancellation signals with one of said plurality of RF receive signals to provide a plurality of RF receive chain input signals, and a plurality of receive RF chains to convert from said plurality of RF receive chain input signals to a plurality of respective receive chain output signals; a plurality of receive baseband cancellation combiners for combining a plurality of baseband transmit leakage cancellation signals with a respective one of said plurality of receive chain output signals to provide a plurality of baseband cancelled receive signals; a plurality of adaptable baseband transversal filter sets to receive a plurality of signals respectively derived from the plurality of transmit chain input signals and provide a plurality of baseband transmit leakage cancellation signals respectively to each of the plurality of receive baseband cancellation combiners, wherein each adaptable baseband transversal filter set is comprised of a plurality of adaptable baseband transversal filters, each for filtering a respective one of said plurality of signals respectively derived from the plurality of transmit chain input signals to provide a respective adaptable baseband transversal filtered signal, and a combiner for combining the plurality of the adaptable baseband transversal filtered signals of the filter set s to provide one of said baseband transmit leakage cancellation signals to one of said respective receive baseband cancellation combiners, a cancellation controller, for adapting each of said plurality of adaptable RF transversal filters of one or more of said plurality of adaptable RF transversal filter sets, wherein the cancellation controller utilizes a plurality of RF transmit leakage metrics respectively derived from each of said receive RF chains associated with each of said one or more adaptable RF transversal filters sets being adapted by said cancellation controller; and wherein said cancellation controller is additionally for adapting each of said plurality of adaptable baseband transversal filters of one or more of said plurality of adaptable baseband transversal filter sets, wherein the cancellation controller utilizes a plurality baseband cancellation adaptation input signals derived directly or indirectly from each of said receive RF chains or from said baseband combiners associated with each of said one or more adaptable baseband transversal filter sets being adapted by said cancellation controller; one or more demodulator cores, wherein each demodulator core demodulates one or more receive symbol streams to produce a respective receive data interface stream; a frequency selective receive path channel multiplexer, interposed between the one or more demodulator cores and the plurality of receive baseband cancellation combiners, to produce the one or more receive symbol streams provided to the one or more demodulator cores from the plurality of baseband cancelled receive signals; an antenna array that includes a plurality of directive gain antenna elements; and one or more selectable RF connections that selectively couple certain of the plurality of directive gain antenna elements to certain of the plurality of receive RF chains, wherein the number of directive gain antenna elements that can be selectively coupled to receive RF chains exceeds the number of receive RF chains that can accept receive RF signals from the one or more selectable RF connections; and a radio resource controller, wherein the radio resource controller sets or causes to be set the specific selective couplings between the certain of the plurality of directive gain antenna elements and the certain of the plurality of receive RF chains.

In some embodiments, the transmit leakage metric is an RSSI measurement.

In some embodiments, the transmit leakage metric is further derived from said receive chain output signal, wherein the derivation of said RF transmit leakage metric comprises a correlation with one or more signals related to one or more of said transit chain input signals.

In some embodiments, the adapting by said cancellation controller of each of the plurality of adaptable RF transversal filters of one or more of said plurality of adaptable RF transversal filter sets utilizes an iterative adaptation algorithm so as to minimize or otherwise optimize said wherein said RF transmit leakage metrics.

In some embodiments, the baseband cancellation adaptation input signals are respectively derived said baseband cancelled receive signals.

In some embodiments, the baseband cancellation adaptation input signals are respectively derived utilizing a correlation with one or more signals related to one or more of said transit chain input signals, and wherein said adapting by said cancellation controller of each of the plurality of adaptable baseband transversal filters of one or more of said plurality of adaptable baseband transversal filter sets utilizes an iterative adaptation algorithm so as to minimize any remaining transmit leakage signal from the baseband cancelled receive signals.

In some embodiments, the baseband cancellation adaptation input signals comprise signals related said transit chain input signals, and further comprise one or more of said receive chain output signals, and wherein said adapting by said cancellation controller of each of the plurality of adaptable baseband transversal filters of one or more of said plurality of adaptable baseband transversal filter sets utilizes a closed form calculation utilizing said baseband cancellation adaptation input signals.

In some embodiments, the closed form calculation involves a least squares or MMSE calculations.

In some embodiments, the combiner of one or more of said adaptable RF transversal filter sets is integral to one or more of said RF cancellation combiners.

The In some embodiments, the combiner of one or more of said adaptable baseband transversal filter sets is integral to one or more of said receive baseband cancellation combiners.

According to an aspect of the invention, an intelligent backhaul radio is disclosed that includes a plurality of transmit RF chains to convert from a plurality of transmit chain input signals to a plurality of respective RF transmit chain signals; a plurality of transmit RF reference receive chains respectively coupled, directly or indirectly, to the output of said plurality of transmit RF chains, to convert a plurality of signals respectively derived from said respective RF transmit chain signals to respective baseband sampled RF transmit reference signals; a plurality of receive baseband cancellation combiners for combining a plurality of baseband sampled RF transmit leakage cancellation signals with a respective one of a plurality of receive chain output signals to provide a plurality of baseband cancelled receive signals; a plurality of first adaptable baseband transversal filter sets to receive the plurality of baseband sampled RF transmit reference signals and provide a plurality of baseband sampled RF transmit leakage cancellation signals respectively to each of the plurality of respective receive baseband cancellation combiners, wherein each first adaptable baseband transversal filter set is comprised of a plurality of first adaptable baseband transversal filters, each for filtering a respective one of said plurality of baseband sampled RF transmit reference signals to provide a respective first baseband filtered signal, and a combiner for combining the plurality of respective first baseband filtered signals within the filter set to provide one of said plurality of baseband sampled RF transmit leakage cancellation signals to one of said respective receive baseband cancellation combiners; a plurality of RF cancellation combiners for respectively combining one of a plurality of up-converted baseband transmit leakage cancellation signals with one of said plurality of RF receive signals to provide a plurality of RF receive chain input signals, and a plurality of receive RF chains to convert from a plurality of said RF receive chain input signals to a plurality of said respective receive chain output signals; a plurality of cancellation up-converter chains, each to receive a respective one of said plurality of baseband transmit leakage cancellation signals and respectively provide one of said plurality of the up-converted baseband transmit leakage cancellation signals to a respective one of said plurality of RF cancellation combiners; a plurality of second adaptable baseband transversal filter sets to receive a plurality of signals respectively derived from the plurality of transmit chain input signals and provide the plurality of baseband transmit leakage cancellation signals respectively to each of the plurality of respective cancellation up-converter chains, wherein each second adaptable baseband transversal filter set is comprised of a plurality of second adaptable baseband transversal filters, each for filtering a respective one of said plurality of signals respectively derived from the plurality of transmit chain input signals to provide a respective second baseband filtered signal, and a combiner for combining the plurality of the second baseband filtered signals of the filter set to provide one of said plurality of baseband transmit leakage cancellation signals to one of said respective cancellation up-converter chains, a cancellation controller, for adapting each of said plurality of second adaptable baseband transversal filters of one or more of said plurality of second adaptable baseband transversal filter sets, wherein the adaptation controller utilizes a second transmit leakage metric derived, directly or indirectly, from each of said receive RF chains, or said receive baseband cancellation combiners associated with each of said one or more second adaptable transversal filter sets being adapted by said adaptation controller, wherein said cancellation controller is additionally for adapting each of said plurality of said first adaptable baseband transversal filters of one or more of said plurality of first adaptable baseband transversal filter sets, wherein the adaptation controller utilizes a plurality of baseband cancellation adaptation input signals derived directly or indirectly from each of said receive RF chains, or receive baseband cancellation combiners associated with each of said one or more first adaptable baseband transversal filter sets being adapted by said adaptation controller.

In some embodiments, the second RF transmit leakage metric is an RSSI measurement.

In some embodiments, the second RF transmit leakage metric is further derived from said receive chain output signal, wherein the derivation of said first or said second RF transmit leakage metric comprises a correlation with one or more signals related to one or more of said transit chain input signals.

In some embodiments, the adapting by said cancellation controller of each of the plurality of first or second adaptable RF transversal filters of one or more of said plurality of first or second adaptable RF transversal filter sets utilizes an iterative adaptation algorithm so as to minimize or otherwise optimize said RF transmit leakage metrics.

In some embodiments, the baseband cancellation adaptation input signals are respectively derived said baseband cancelled receive signals.

In some embodiments, the baseband cancellation adaptation input signals are respectively derived utilizing a correlation with one or more signals related to one or more of said transit chain input signals, and wherein said adapting by said cancellation controller of each of the plurality of second adaptable baseband transversal filters of one or more of said plurality of second adaptable baseband transversal filter sets utilizes an iterative adaptation algorithm so as to minimize any remaining transmit leakage signal from the baseband cancelled receive signals.

In some embodiments, the baseband cancellation adaptation input signals comprise signals related said transit chain input signals, and further comprise one or more of said receive chain output signals, and wherein said adapting by said cancellation controller of each of the plurality of second adaptable baseband transversal filters of one or more of said second plurality of adaptable baseband transversal filter sets utilizes a closed form calculation utilizing said baseband cancellation adaptation input signals.

In some embodiments, the closed form calculation involves a least squares or MMSE calculations.

In some embodiments, the combiner of one or more of said second adaptable baseband transversal filter sets is integral to one or more of said RF cancellation combiners In some embodiments, the combiner of one or more of said first adaptable baseband transversal filter sets is integral to one or more of said baseband cancellation combiners.

In some embodiments, the coupling of the transmit RF reference receive chains, directly or indirectly, to the output of said plurality of transmit RF chains includes the coupling to and from one or more of the following: a power amplifier, one more frequency selective RF components, an RF switch fabric, an RF Front-end, a Front-end Transmission Unit, a low pass filter, a band pass filter, a notch filter, a high pass filter, an equalizing filter, a duplexing filter, one or more radio frequency switch or switches, an RF coupler, an RF divider, a Wilkinson divider or combiner, a splitter, a summer, a combiner, a BALUN, an RF circulator, an RF isolator, a transmission line, a micro-strip line, an RF front end module, an antenna, a directive gain element, an antenna including the coupling of received signals from other antennas, an antenna including signals reflected from a transmit antenna as a result of imperfect impedance matching, a component including a "Enable" input that causes substantially all active circuitry to power down, a component including a "Enable" input that causes a substantial reduction in RF energy.

In some embodiments, multiple nested or successive RF cancellation processes are utilized to increase the cancellation prior to any intermediate frequency, analog or baseband cancellation processes.

In some embodiments, multiple nested or successive Intermediate frequency cancellation processes are utilized to increase the cancellation prior to any analog or baseband cancellation processes.

In some embodiments, multiple nested or successive analog baseband cancellation processes are utilized to increase the cancellation prior to any baseband cancellation processes.

In some embodiments, multiple nested or successive digital baseband cancellation processes are utilized to increase the cancellation.

In some embodiments, crest factor reduction techniques are utilized with the transmitter to reduce non-linear distortion.

In some embodiments, a frequency selective transmit equalizer is utilized so as to increase an isolation aspect between the transmit antenna array and the receive antenna array, or associated elements or coupling ports; selected or collectively.

In some embodiments, the optimization of a frequency selective transmit equalizer includes metrics associated with a target receiving intelligent backhaul radio and the isolation aspects of the receive antenna array of the current intelligent backhaul radio relative to the transmit antenna array associated with the transmit equalizer.

In some embodiments, the frequency selective transmit equalizer utilizes transmit beam forming.

In some embodiments, adaptive transmitter beam forming is utilized so as to reduce requirements of cancellation, in on aspect including a reduced time delay of the received RF coupling paths required to be canceled by an RF cancellation process, or the amplitude of signals related to transmitter to receiver coupling within a given delay spread.

In some embodiments, more antennas than receive chains are present and the selection of the receive antennas is based upon a combination of a metric associated with the desired receive signals and a metric associated with the isolation between the selected receive antenna elements from the transmit antenna array associated with the same intelligent backhaul radio.

In some embodiments, more antennas than receive chains are present and the selection of the receive antennas is based upon a combination of a metric associated with the capacity of the received signal from a separate transmitting intelligent backhaul radio, and the impact to the resulting capacity at the current intelligent backhaul radio as a result of interference from transmitted signals from the same intelligent backhaul radio.

In some embodiments, the impact to the capacity at the current intelligent backhaul radio is based upon the ability to cancel the transmitter leakage from the received signal.

In some embodiments, the impact to the capacity at the current intelligent backhaul radio is based upon the potential for the receive chains receivers to be saturated by transmitter leakage at one or more of the low noise amplifier, a RF selection switch, and an analog to digital coverer maximum input level.

In some embodiments, the impact to the capacity at the current intelligent backhaul radio is based upon the ability to cancel the transmitter leakage from the received signal at RF.

In some embodiments, the impact to the capacity at the current intelligent backhaul radio is based upon the ability to cancel the transmitter leakage from the received signal at an intermediate frequency.

In some embodiments, the impact to the capacity at the current intelligent backhaul radio is based upon the ability to cancel the transmitter leakage from the received signal at analog baseband.

In some embodiments, the impact to the capacity at the current intelligent backhaul radio is based upon the ability to cancel the transmitter leakage from the received signal at digital baseband.

In some embodiments, the impact to the capacity at the current intelligent backhaul radio is based upon the ability to cancel the transmitter leakage from the received signal, including an un-cancelable transmitter noise.

In some embodiments, the impact to the capacity at the current intelligent backhaul radio is based upon the ability to cancel the transmitter noise associated with transmitter signal leakage from the received signal.

In some embodiments, the impact to the capacity at the current intelligent backhaul radio is based upon the ability to cancel the transmitter leakage from the received signal, and the ability to utilize a frequency selective transmit equalizer to satisfy a transmit capacity to a target intelligent backhaul radio.

In some embodiments, the impact to the capacity at the current intelligent backhaul radio is based upon the ability to cancel the transmitter leakage from the received signal, and the ability to utilize a transmit automatic gain control to satisfy a transmit capacity to a target intelligent backhaul radio.

In some embodiments, the impact to the capacity at the current intelligent backhaul radio is based upon the ability to cancel the transmitter leakage from the received signal, and the ability to utilize a transmit automatic gain control and a frequency selective transmit equalizer to satisfy a transmit capacity to a target intelligent backhaul radio.

In some embodiments, a transmitter associated with the intelligent backhaul controller having an automatic gain control wherein the adjustment of the automatic gain control is based at least in part upon the remaining transmitter leakage signal level following a transmitter leakage cancellation process in one or more of the receivers.

In some embodiments, a transmitter associated with the intelligent backhaul controller having an automatic gain control wherein the adjustment of the automatic gain control is based at least in part upon the remaining transmitter leakage noise level following a transmitter leakage cancellation process in one or more of the receivers.

In some embodiments, a transmitter associated with the intelligent backhaul controller having an automatic gain control wherein the adjustment of the automatic gain control is based at least in part upon the remaining transmitter leakage signal level or noise level following a transmitter leakage cancellation process in one or more of the receivers taking into account a pre-determined level causing non-linear distortion effects in one or more receiver components.

In some embodiments, the non-linear distortion is an analog to digital converter maximum receive level, or dynamic range.

In some embodiments, the non-linear distortion is maximum receive level, or dynamic range associated with a desired receiver sensitivity.

In some embodiments, weights for use with an RF cancellation are stored during an initial factory calibration.

In some embodiments, weights for use with an RF cancellation are stored during an initial factory calibration, wherein more antennas then receive chains are present and the weights are stored according to an index associated with specific antenna selections.

In some embodiments, weights for use with an RF cancellation are stored following optimization of the performance of the cancellation process.

In some embodiments, weights for use with an RF cancellation are stored following optimization of the performance of the cancellation process, wherein more antennas then receive chains are present and the weights are stored according to an index associated with specific antenna selections.

In some embodiments, more antennas then receive chains are present, and weights are stored according to an index associated with specific antenna selections.

In some embodiments, weights for use with an RF cancellation are stored following the decision to change the selection of an antenna where an index associated with the current antenna selection is utilized in the weight storage.

In some embodiments, weights for use with an RF cancellation are retrieved following the decision to change the selection of an antenna, where an index associated with the specific antenna selection is utilized in the weight retrieval.

In some embodiments, more antennas then receive chains are present, and the weights are stored and retrieved according to an index associated with specific antenna selections.

In some embodiments, storing and retrieval of weights associated with one or more cancellation processes is performed based upon an event.

In some embodiments, storing and retrieval of weights for one or more cancellation processes is performed based upon a reselection of antennas.

In some embodiments, only digital baseband cancellation of transmitter leakage signal is performed.

In some embodiments, the adaptation of the weights associated with a subsequent cancellation step is performed while the weights associated with a preceding transmitter cancellation step are held constant.

In some embodiments, the adaptation or calculation of the weights associated with a transmitter cancellation step is performed during a specific time period coordinated by the radio resource controller.

In some embodiments, the radio resource controller of the current intelligent backhaul radio coordinates one or more properties of the specific time period with a respective intelligent backhaul radio having signal received by the current intelligent backhaul radio.

In some embodiments, the one or more properties of the specific time period include the time or duration of the specific time period.

In some embodiments, the one or more properties of the specific time period include the transmitted or received signal power levels of signals received by the current intelligent backhaul radio during the specific time period.

a. In some embodiments, the one or more properties of the specific time period include the transmitted wave forms received by the current intelligent backhaul radio during the specific time period.

In some embodiments, the intelligent backhaul radio utilizes common up converting local oscillator signals.

In some embodiments, the intelligent backhaul radio utilizes common down converting local oscillator signals.

In some embodiments, the intelligent backhaul radio utilizes common down converting local oscillator signals and analog to digital sampling timing signals.

In some embodiments, the intelligent backhaul radio includes receivers performing zero division duplexing cancellation of the transmitter signals and performing spatial multiplexing among the set of receivers, and utilizes common down converting local oscillator signals.

In some embodiments, the intelligent backhaul radio includes receivers performing zero division duplexing cancellation of the transmitter signals and performing spatial multiplexing among the set of receivers, and performs an RF cancellation and a digital baseband cancellation process.

In some embodiments, the RF cancellation processing includes two cancellation steps comprising a first RF cancellation followed by a second RF cancellation.

In some embodiments, both RF cancellations are based upon signals derived form a sample RF transmitter signals.

In some embodiments, one RF cancellation is based upon signals derived from sampled RF transmitter signals and the other RF cancellation is based upon up converted digital cancellation signals derived from digital baseband transmitter signals.

In some embodiments, the digital baseband cancellation process utilizes cancellation signals sampled from the intelligent backhaul radio transmitters at RF.

In some embodiments, the digital baseband process comprises a plurality of cancellation steps a first cancellation step utilizing cancellation signals sampled from the intelligent backhaul radio transmitters at RF and a second cancellation process utilizing cancellation signals derived from digital baseband transmitter signals.

In some embodiments, the digital baseband process utilizes cancellation signals sampled from the intelligent backhaul radio transmitters at digital baseband.

In some embodiments, at least one transmitter non-linearity is simulated at digital baseband utilizing digital baseband transmitter input signals, and utilized in a digital baseband cancellation process.

In some embodiments, the simulation of a transmitter non-linearity at digital baseband utilizes a received signal to estimate parameters of the non-linearity.

In some embodiments, the simulation of a transmitter non-linearity at digital baseband utilizes a metric following the cancellation process to estimate parameters of the non-linearity.

In some embodiments, the cancellation of a simulated transmitter non-linearity at digital baseband involves the removal of the digital baseband transmitter signal from the output of the non-linearity estimation process and the application of a digital filter estimating a channel response between the transmitter to receiver, prior to the step of performing a cancellation of the estimated non-linearity distortion from a receiver signal.

In some embodiments, a plurality of the receiver chain input signals, receive antenna signals, RF transmit reference signals, or signals input to a RF canceller combiner are combined in a predetermined gain, delay, or phase relationship so as to be separable in digital baseband.

In some embodiments, a plurality of the receiver chain input signals, receive antenna signals, RF transmit reference signals, or signals input to a RF canceller combiner are combined in a predetermined gain, delay, or phase relationship so as to be separable in digital baseband where in the signals derived from the RF transmitter reference signals are separated and utilized in a cancellation process.

In some embodiments, each individual cancellation process includes one, multiple, or all of the components or steps associated with foregoing cancellation steps, processes or blocks.

Aspects of the current invention also include combinations and permutations of the foregoing embodiments.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 19 is a diagram of the mathematical representation of depicted signals at a ZDD enabled IBR transmitter according to one embodiment of the invention.

FIG. 20 is a diagram of the mathematical representation of depicted signals at a ZDD enabled IBR receiver according to one embodiment of the invention.

FIG. 21 is a diagram of the mathematical representation of depicted signals at a ZDD enabled IBR receive chain input according to one embodiment of the invention.

FIG. 22 is a diagram of a further mathematical representation of depicted signals at a ZDD enabled IBR receive chain input according to one embodiment of the invention.

FIG. 23 is a diagram of a further detailed mathematical representation of depicted signals at a ZDD enabled IBR receive chain input according to one embodiment of the invention.

FIG. 24 is a diagram of the mathematical representation of depicted signals at a ZDD enabled IBR receive chain digital output according to one embodiment of the invention.

DETAILED DESCRIPTION

Figure 1:
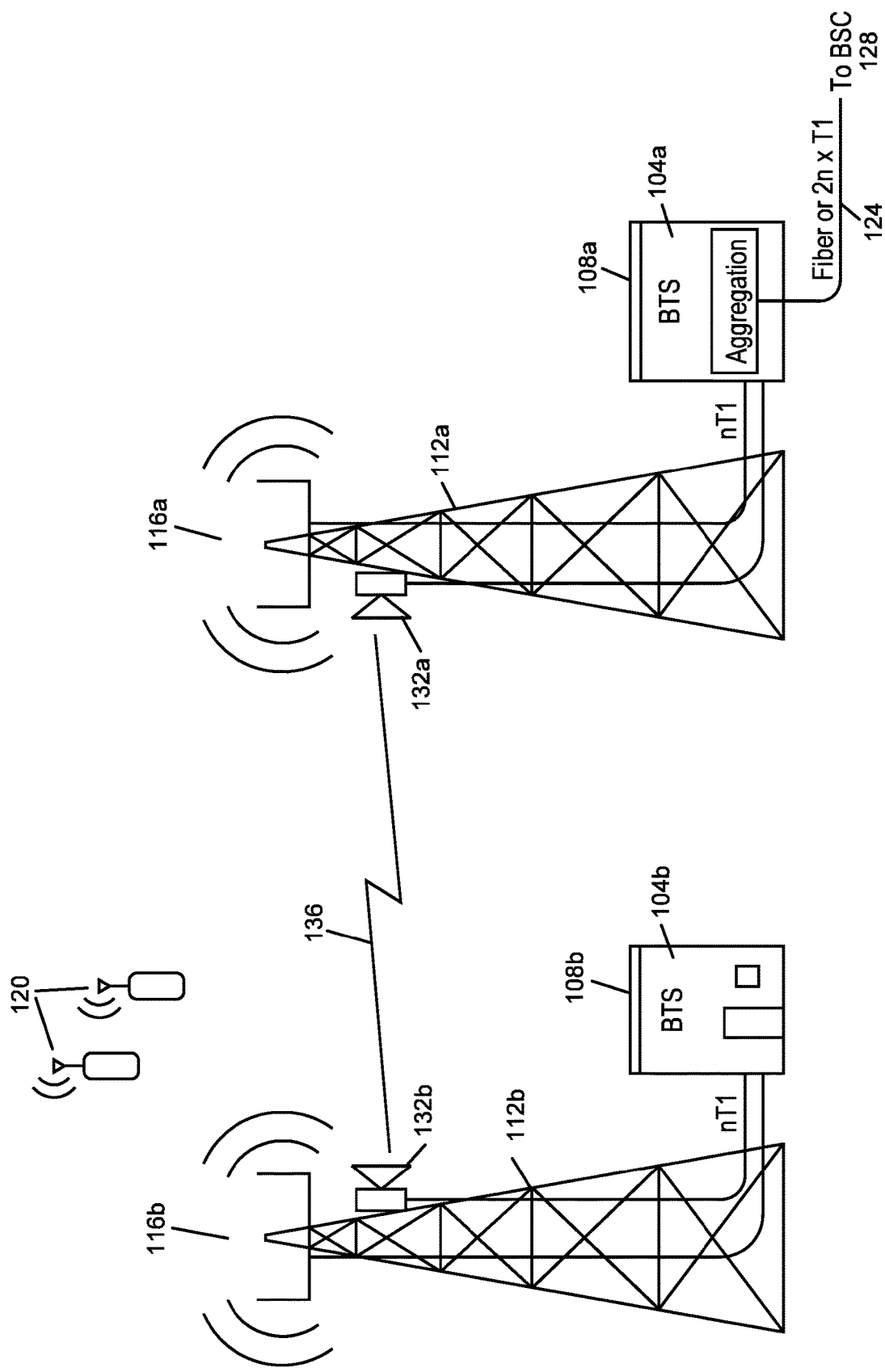
FIG. 1 is an illustration of conventional point to point (PTP) radios deployed for cellular base station backhaul with unobstructed line of sight (LOS).
Figure 2:
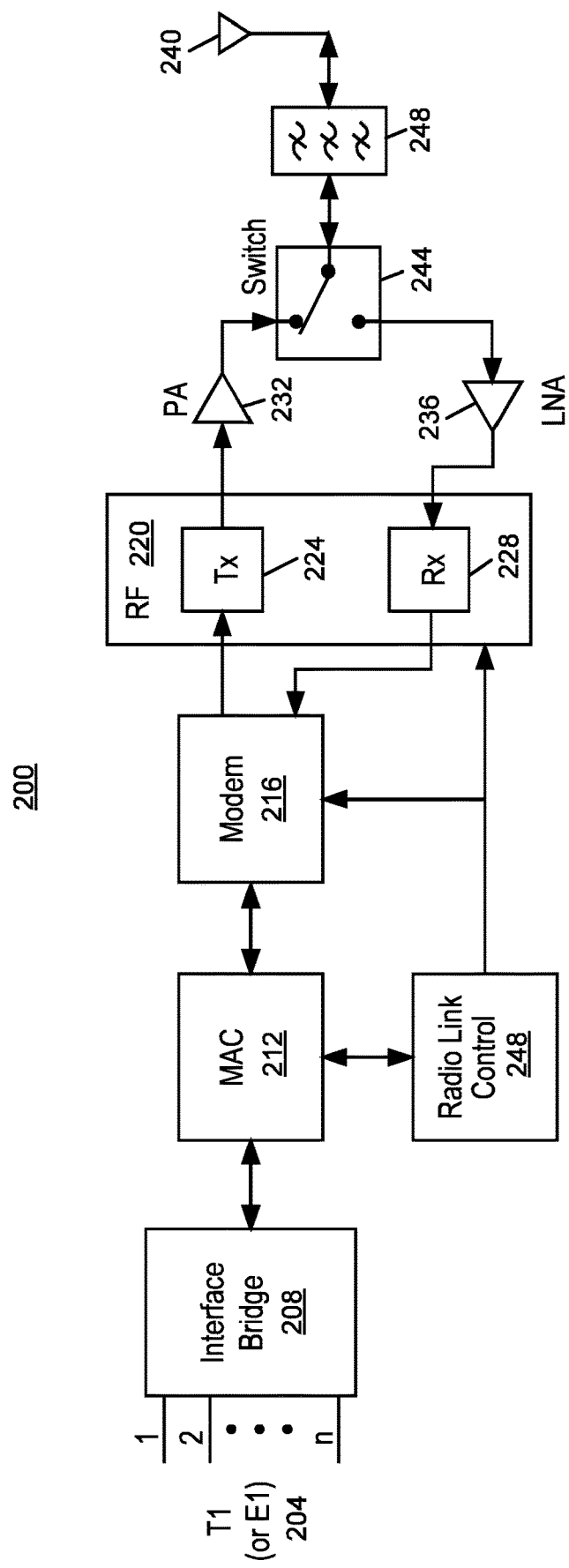
FIG. 2 is an illustration of a generic TDD radio.
Figure 3:
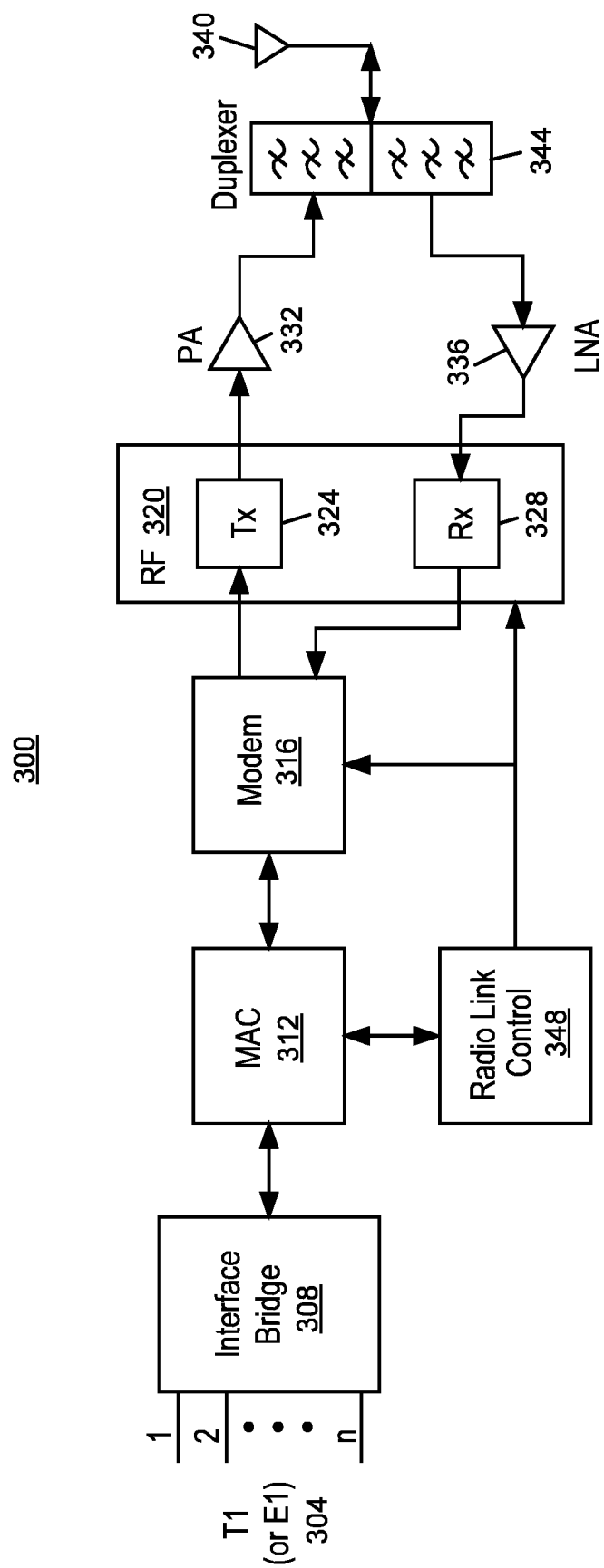
FIG. 3 is an illustration of a generic FDD radio.
Figure 4:
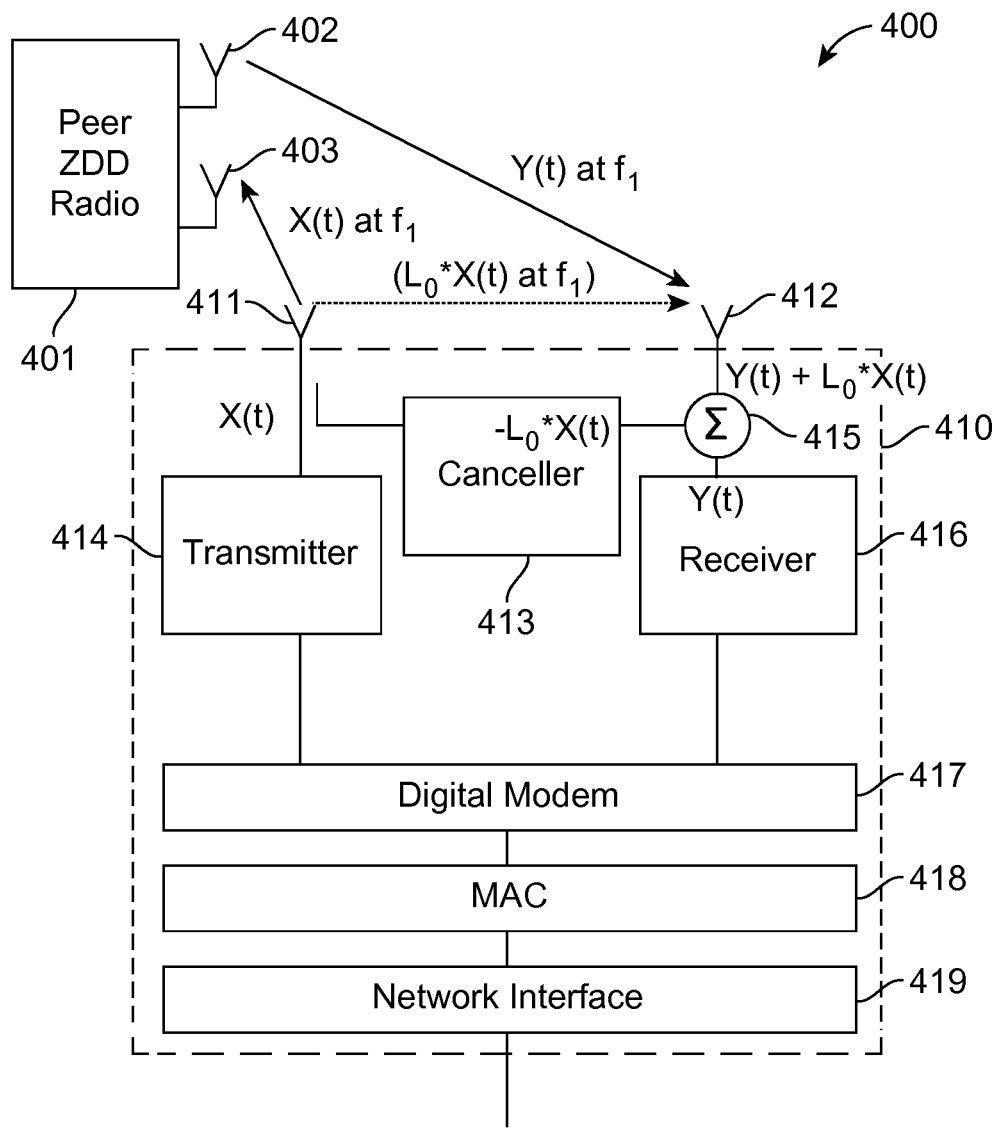
FIG. 4 is an illustration of a generic ZDD radio.
Figure 5:
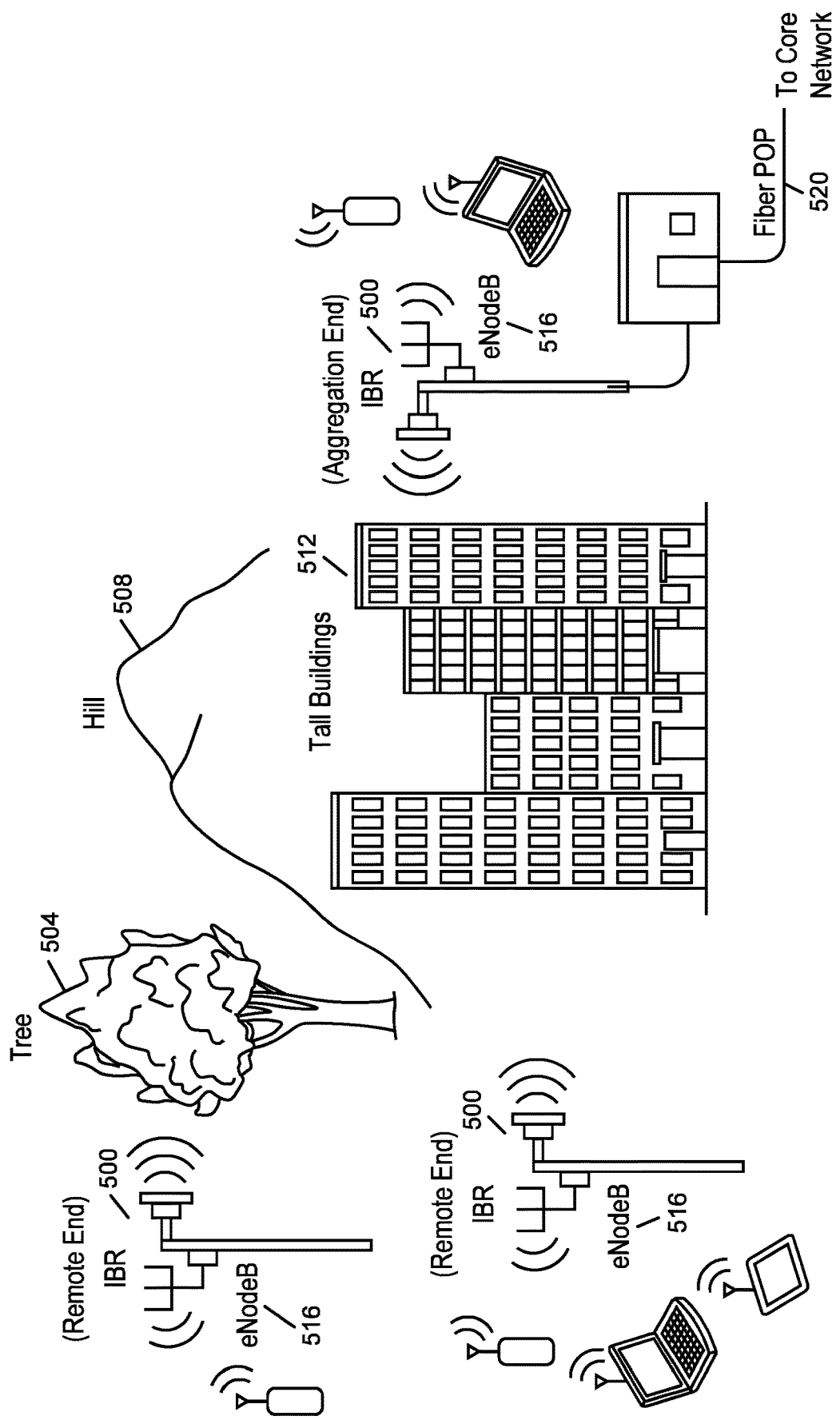
FIG. 5 is an illustration of intelligent backhaul radios (IBRs) deployed for cellular base station backhaul with obstructed LOS according to one embodiment of the invention.

FIG. 5 illustrates deployment of intelligent backhaul radios (IBRs) in accordance with an embodiment of the invention. As shown in FIG. 5, the IBRs 500 are deployable at street level with obstructions such as trees 504, hills 508, buildings 512, etc. between them. The IBRs 500 are also deployable in configurations that include point to multipoint (PMP), as shown in FIG. 5, as well as point to point (PTP). In other words, each IBR 500 may communicate with more than one other IBR 500.

For 3G and especially for 4$^{th}$ Generation (4G), cellular network infrastructure is more commonly deployed using "microcells" or "picocells." In this cellular network infrastructure, compact base stations (eNodeBs) 516 are situated outdoors at street level. When such eNodeBs 516 are unable to connect locally to optical fiber or a copper wireline of sufficient data bandwidth, then a wireless connection to a fiber "point of presence" (POP) requires obstructed LOS capabilities, as described herein.

For example, as shown in FIG. 5, the IBRs 500 include an Aggregation End IBR (AE-IBR) and Remote End IBRs (RE-IBRs). The eNodeB 516 of the AE-IBR is typically connected locally to the core network via a fiber POP 520. The RE-IBRs and their associated eNodeBs 516 are typically not connected to the core network via a wireline connection; instead, the RE-IBRs are wirelessly connected to the core network via the AE-IBR. As shown in FIG. 5, the wireless connection between the IBRs include obstructions (i.e., there may be an obstructed LOS connection between the RE-IBRs and the AE-IBR).

Figure 6:
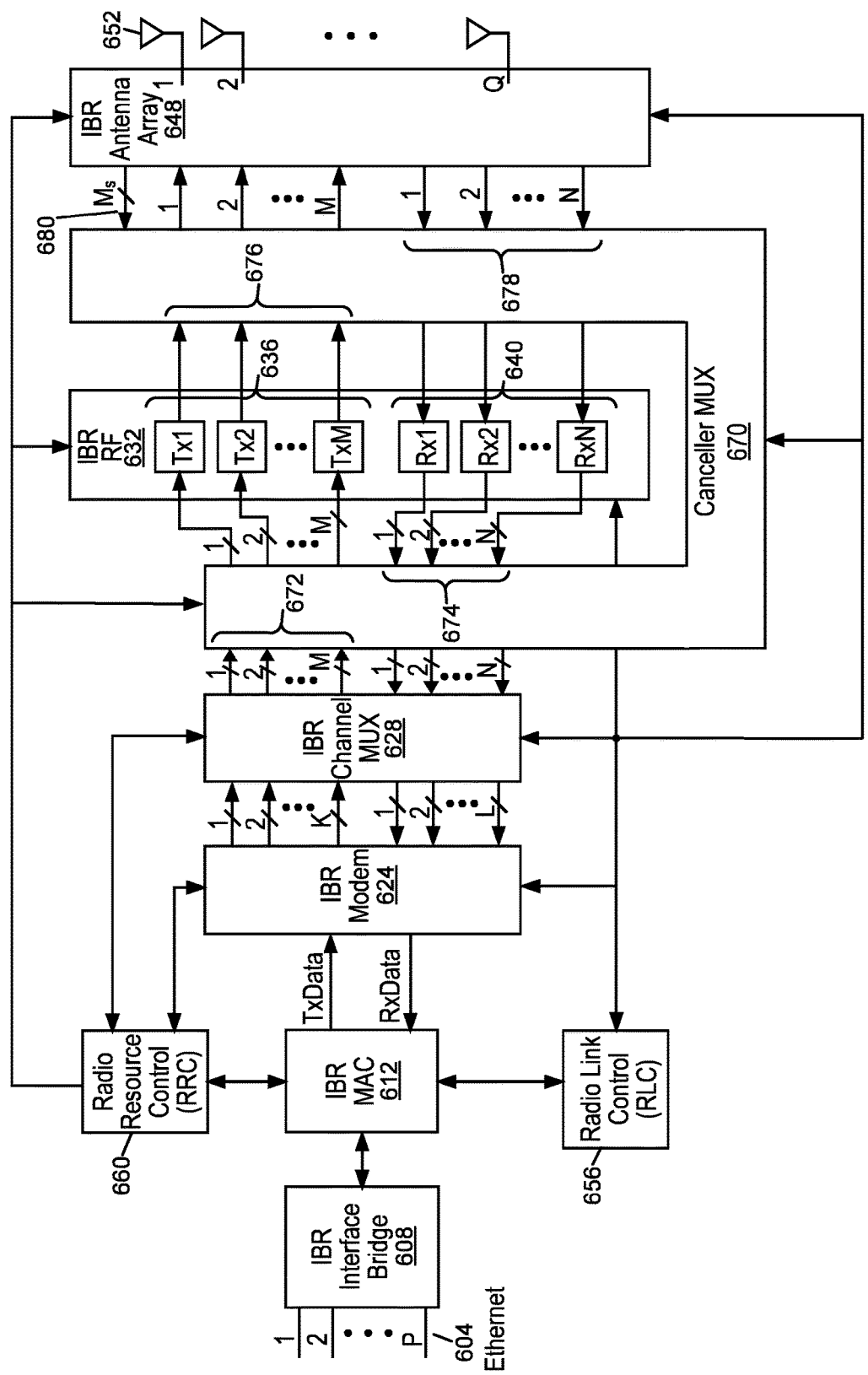
FIG. 6 is a block diagram of an IBR according to one embodiment of the invention.
Figure 7:
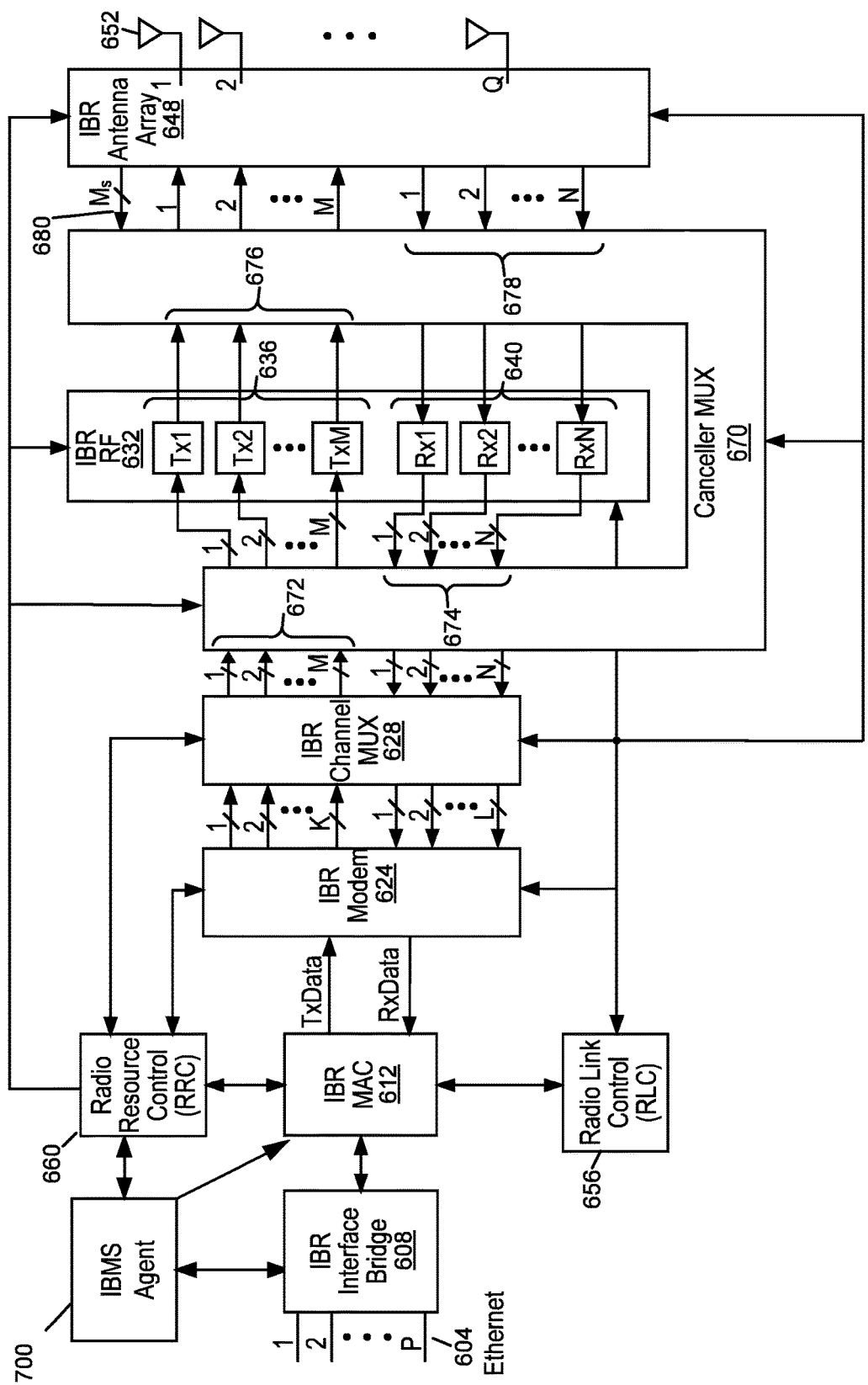
FIG. 7 is a block diagram of an IBR according to one embodiment of the invention.

FIGS. 6 and 7 illustrate exemplary embodiments of the IBRs 500 shown in FIG. 5. In FIGS. 6 and 7, the IBRs 500 include interfaces 604, interface bridge 608, MAC 612, modem 624, channel MUX 628, RF 632, which includes Tx1 ... TxM 636 and Rx1 ... RxN 640, antenna array 648 (includes multiple antennas 652), a Radio Link Controller (RLC) 656, a Radio Resource Controller (RRC) 660 and a ZDD Canceller 670. The IBR may optionally include an IBMS agent 700 as shown in FIG. 7. It will be appreciated that the components and elements of the IBRs may vary from that illustrated in FIGS. 6 and 7. Multiple exemplary embodiments of the components and elements of the IBRs of FIGS. 6 and 7, except for ZDD Canceller 670, are disclosed in U.S. patent application Ser. No. 13/212,036, now U.S. Pat. No. 8,238,318, and Ser. No. 13/536,927 and incorporated herein.

As described in greater detail in U.S. patent application Ser. No. 13/212,036, now U.S. Pat. No. 8,238,318, and Ser. No. 13/536,927 and incorporated herein, modem 624 of FIGS. 6 and 7 produces K transmit symbol streams wherein each of the K transmit symbol streams comprises a sequence of blocks of modulated symbols. In a PTP configuration, the K transmit symbol streams would be destined to a peer receiver at the other IBR in the link. In a PMP configuration at the AE-IBR, one or more of the K transmit symbol streams, as designated by the AE-IBR, would be destined to the receiver in each one of the RE-IBRs. Also, in a PMP configuration at the RE-IBR, the K transmit symbol streams would be destined to the receiver in the AE-IBR. Additionally as described in greater detail in U.S. patent application Ser. No. 13/212,036, now U.S. Pat. No. 8,238,318, and Ser. No. 13/536,927 and incorporated herein, channel MUX 628 of FIGS. 6 and 7 generates M transmit chain input signals, wherein M≥K, and each of the M transmit chain input signals may be generated with contribution from one or more (or all) of the K transmit symbol streams.

As described in greater detail in U.S. patent application Ser. No. 13/212,036, now U.S. Pat. No. 8,238,318, and Ser. No. 13/536,927 and incorporated herein, each of the M transmit chain input signals is converted to a transmit RF signal by respective ones of Tx1 ... TxM 636 in FIGS. 6 and 7. In a PTP configuration, the M transmit RF signals would be directed via elements of the antenna array 648 as set by the RRC 660 to a peer receiver at the other IBR in the link. In a PMP configuration at the AE-IBR, one or more of the M transmit RF signals, as designated by the AE-IBR, would be directed via elements of the antenna array 648 as set by the RRC 660 to the receiver in each one of the RE-IBRs. Also, in a PMP configuration at the RE-IBR, the M transmit RF signals would be directed via elements of the antenna array 648 as set by the RRC 660 to the receiver in the AE-IBR. In an embodiment of the IBR Antenna Array (648), $M_s$ RF Transmit Reference Signals (680) are passed from the IBR Antenna Array (648) to the Canceller MUX (670) for use in cancellation processing and in some embodiments calibration operations. In some embodiments $M_s$ will be equal to the number of Transmit Antenna Elements $Q_T$ in a one to one relationship. Additionally, in some embodiments $M_s$ will be equal to the number of RF transmit signals M in a one to one relationship. In embodiments where $Q_T$ is greater than M, the number of $M_s$ RF Transmit Reference Signals may be equal to M, in which case the RF switch fabric (812) within the antenna array (648) may be utilized to select $M_s$ RF transmit reference signals (680) of the $Q_T$ available Transmit Antenna Reference Signals (805). In such embodiments, in which $M_s$ is equal to the number of RF Transmit Signals M, and in which the number of Transmit Antenna Elements (652) $Q_T$ is greater than the number of RF Transmit Signals M, the selection of the specific $M_s$ RF Transmit Reference Signals will be made by the RRC (660), and in correspondence with the selection of the Antenna Elements (652) utilized for the transmission of the RF Transmit Signals and further may utilize the same selection control signaling or alternative selection control signaling.

In alternative embodiments, the $M_s$ RF Transmit Reference Signals (680) may be obtained directly from the $M_s$ RF Transmit Signals within Cancellation MUX 670, rather than from the Antenna Array 648. In various embodiments, the $M_s$ RF Transmit Reference Signals (680) may be utilized in analog or digital cancellation processing as will be described in further detail in relation to subsequent figures.

The receive signal processing path in FIGS. 6 and 7 of exemplary IBRs, except for the processes and structures associated with the Cancellation MUX 670, conceptually reverses the operations performed in one or more peer IBR transmitters providing signals to a particular IBR receiver. As described in greater detail in U.S. patent application Ser. No. 13/212,036, now U.S. Pat. No. 8,238,318, and Ser. No. 13/536,927 and incorporated herein, N receive RF signals are provided by various elements of the antenna array 648 as set by the RRC 660 and then converted to N receive chain output signals by respective ones of Rx1 . . . RxN 640 in FIGS. 6 and 7. Additionally as described in greater detail in U.S. patent application Ser. No. 13/212,036, now U.S. Pat. No. 8,238,318, and Ser. No. 13/536,927 and incorporated herein, channel MUX 628 of FIGS. 6 and 7 generates L receive symbol streams, wherein N≥L, and each of the L receive symbol streams may be generated with contribution from one or more (or all) of the N receive chain output signals. As described in greater detail in U.S. patent application Ser. No. 13/212,036, now U.S. Pat. No. 8,238,318, and Ser. No. 13/536,927 and incorporated herein, modem 624 of FIGS. 6 and 7 demodulates one or more (or all) of the L receive symbol streams.

Figure 8:
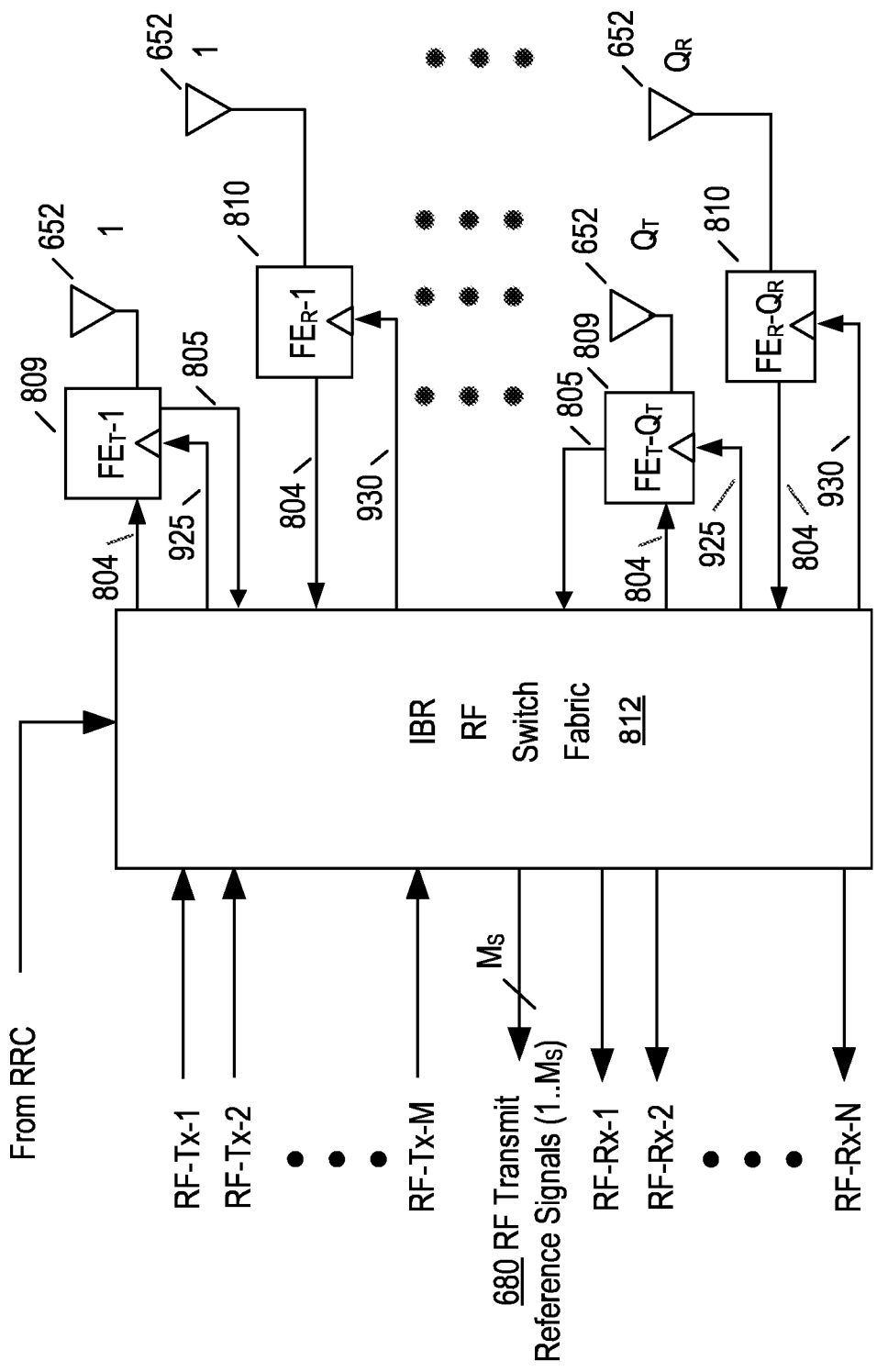
FIG. 8 is a block diagram of an IBR antenna array according to one embodiment of the invention.

FIG. 8 illustrates an exemplary embodiment of an IBR Antenna Array 648 with dedicated transmission and reception antennas. FIG. 8 illustrates an antenna array having $Q_R+Q_T$ directive gain antennas 652 (i.e., where the number of antennas is greater than 1). In FIG. 8, the IBR Antenna Array 648 includes an IBR RF Switch Fabric 812, RF interconnections 804, a set of Front-ends 809 and 810 and the directive gain antennas 652. The RF interconnections 804 can be, for example, circuit board traces and/or coaxial cables. The RF interconnections 804 connect the IBR RF Switch Fabric 812 and the set of Front-end Transmission Units 809 and the set of Front-end Reception Units 810. Each Front-end Transmission Unit 809 is associated with an individual directive gain antenna 652, numbered consecutively from 1 to $Q_T$. Additionally, the IBR RF Switch Fabric 812 is further coupled to receive RF Transmit Reference Signals 805 from each Front-end Transmission unit, in specific embodiments, to allow for the selection $M_s$ of the $Q_T$ RF Transmit Antenna Signals, as previously described, to be provided to the Cancellation Mux 670 as RF Transmit Reference Signals (1 . . . $M_s$) 680. Each Front-end Reception Unit 810 is associated with an individual directive gain antenna 652, numbered consecutively from 1 to $Q_R$. The present embodiment may be used, for example, with the antenna array embodiments of FIGS. 11 and 12, or those depicted in U.S. patent application Ser. No. 13/212,036, now U.S. Pat. No. 8,238,318, and Ser. No. 13/536,927 and incorporated herein. Exemplary embodiments of the IBR RF Switch Fabric 812 are also described in detail in U.S. patent application Ser. No. 13/212,036, now U.S. Pat. No. 8,238, 318, and Ser. No. 13/536,927 and incorporated herein. For example, in some embodiments the IBR RF Switch Fabric 812 provides the capability to connect any of the M transmit RF signals to any of the $Q_T$ Front-end Transmission Units 809 with associated individual directive gain antenna 652, or to connect any of the N receive RF signals to any of the $Q_R$ Front-end Reception Units 810 with associated individual directive gain antenna 652.

In an alternative embodiment, the IBR RF Switch fabric 812 may be bypassed for the transmission signals when the number of dedicated transmission antennas and associated Front-end Transmission Units ($Q_T$) is equal to the number of transmit RF signals (e.g. $Q_T$=M), resulting in directly coupling the transmit RF signals from respective Tx1 . . . TxM 636 to respective Front-end Transmission Units 809. In an associated embodiment, the IBR RF switch fabric 812 may be bypassed for the selection of the RF Transmit Reference Signals (680) coupled to the Cancellation MUX (670), by directly connecting the RF Transmit Reference Signals (1 . . . $Q_T$) (805) directly to the RF Transmit Reference Signals (1 . . . $M_s$) (680), when M=$Q_T$. In an additional alternative embodiment, the IBR RF Switch fabric 812 may also be bypassed for the reception signals when the number of dedicated reception antennas and associated Front-end Reception Units ($Q_R$) is equal to the number of receive RF signals (e.g. $Q_R$=N), resulting in directly coupling the receive RF signals for respective Rx1 . . . RxN 640 to respective Front-end Reception Units 810. Alternatively, the IBR RF Switch fabric 812 may also comprise circuitry to combine signals from two or more Front-end Reception Units or to provide signals to two or more Front-end Transmission Units as described in greater detail in U.S. patent application Ser. No. 13/212,036, now U.S. Pat. No. 8,238,318, and Ser. No. 13/536,927 and incorporated herein.

Figure 9A:
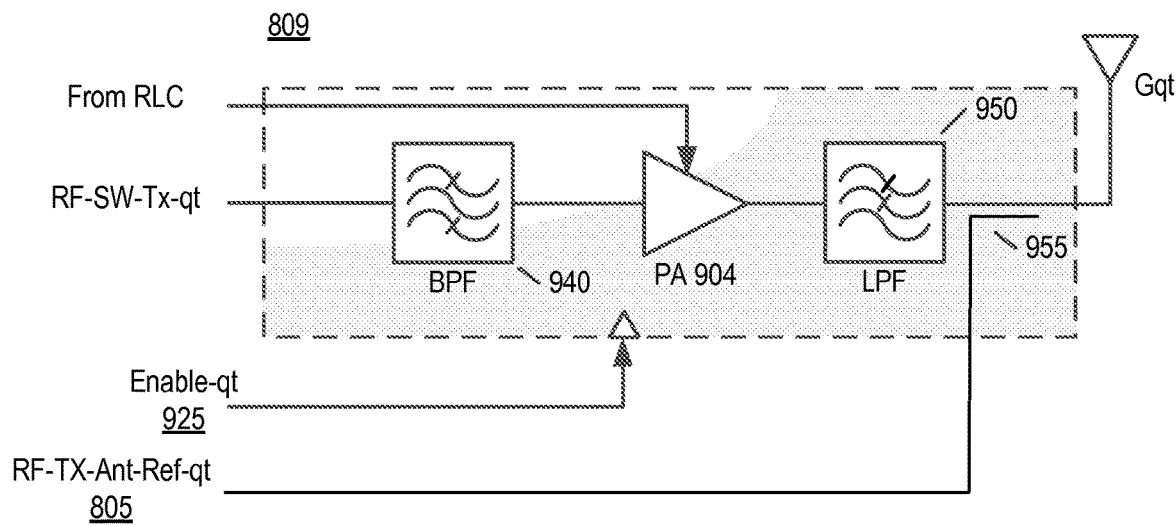
FIG. 9A is a block diagram of a Front-end Transmission Unit according to one embodiment of the invention.
Figure 9B:
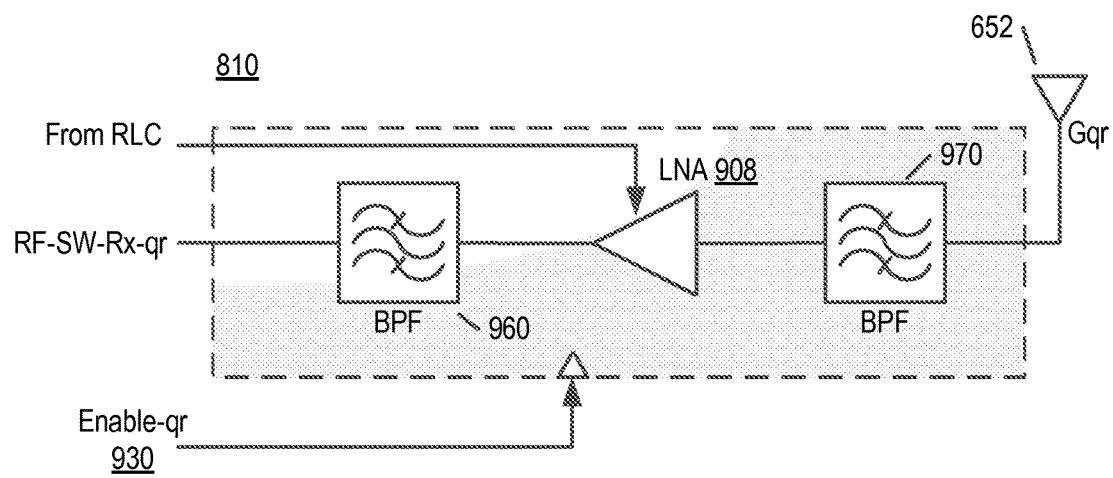
FIG. 9B is a block diagram of a Front-end Reception Unit according to one embodiment of the invention.

As shown in FIGS. 9A and 9B, each Front-end 809 or 810 also includes an "Enable" input 925, 930 that causes substantially all active circuitry to power-down. Power-down techniques are well known. Power-down is advantageous for IBRs in which not all of the antennas are utilized at all times. It will be appreciated that alternative embodiments of the IBR Antenna Array may not utilize the "Enable" input 925, 930 or power-down feature. With respect to FIG. 9A, Bandpass filter 940 receives transmission signal RF-SW-Tx-qt, provides filtering and couples the signal to power amplifier 904, then to low pass filter 950. The output of the lowpass filter is then coupled to a dedicated transmission antenna, which is comprised of directive antenna element 652 with gain Gqt. FIG. 9A also depicts the RF Transmit Reference Signal (805) which in this exemplary embodiment may be obtained by a line coupler (955) to the interconnection between low pass filter 950 and directive antenna element 652 wherein the utilization of such RF Transmit Reference Signal (805) within the ZDD Canceller 670 is described in greater detail herein. With respect to FIG. 9B, directive antenna element 652 with gain Gqr is a dedicated receive only antenna and coupled to receive filter 970, which is in turn coupled to LNA 908. The resulting amplified receive signal is coupled to band bass filter 960, which provides output RF-SW-Rx-qr.

Figure 10:
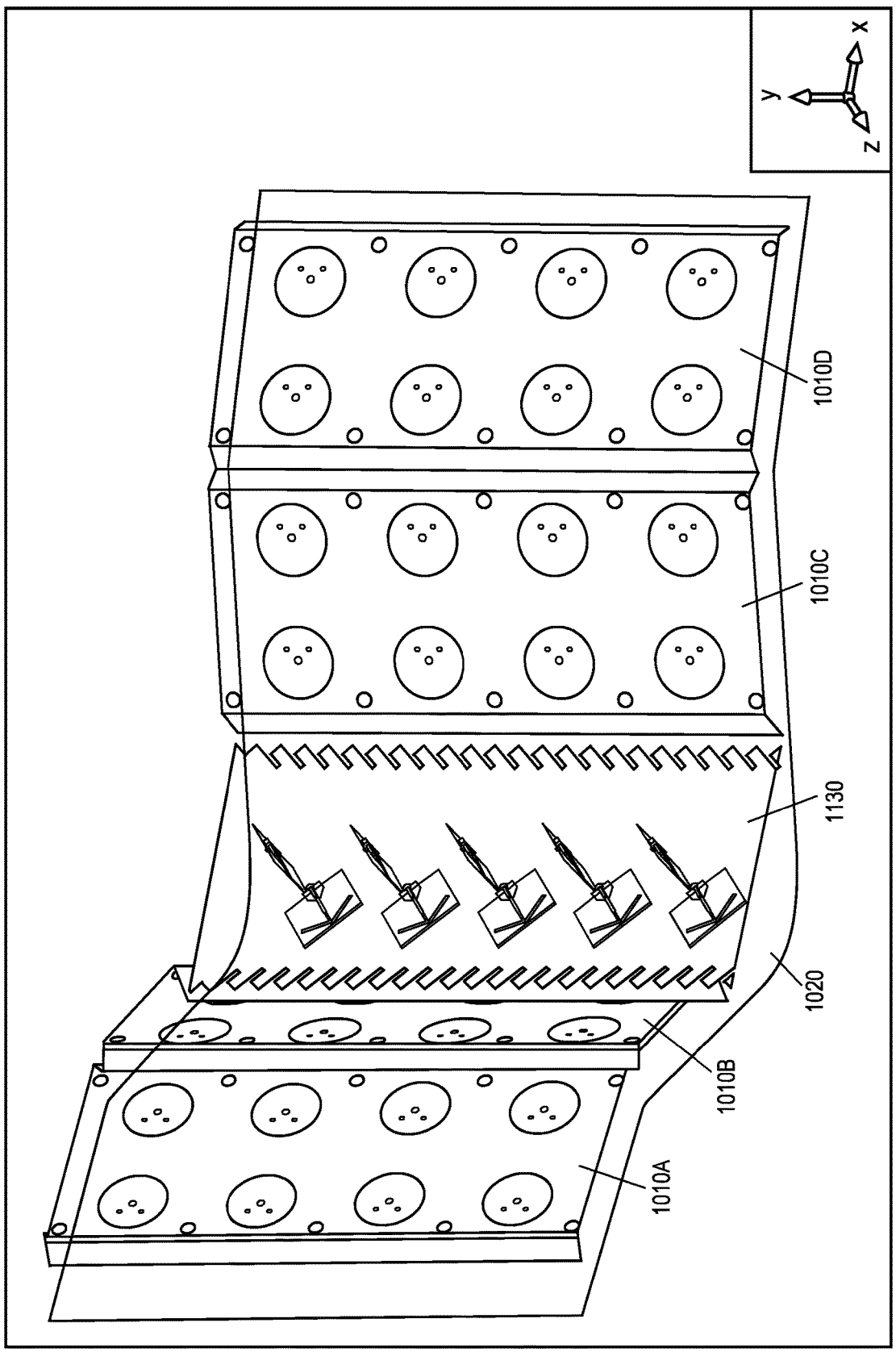
FIG. 10 is a diagram of an exemplary horizontally arranged intelligent backhaul radio antenna array.
Figure 11:
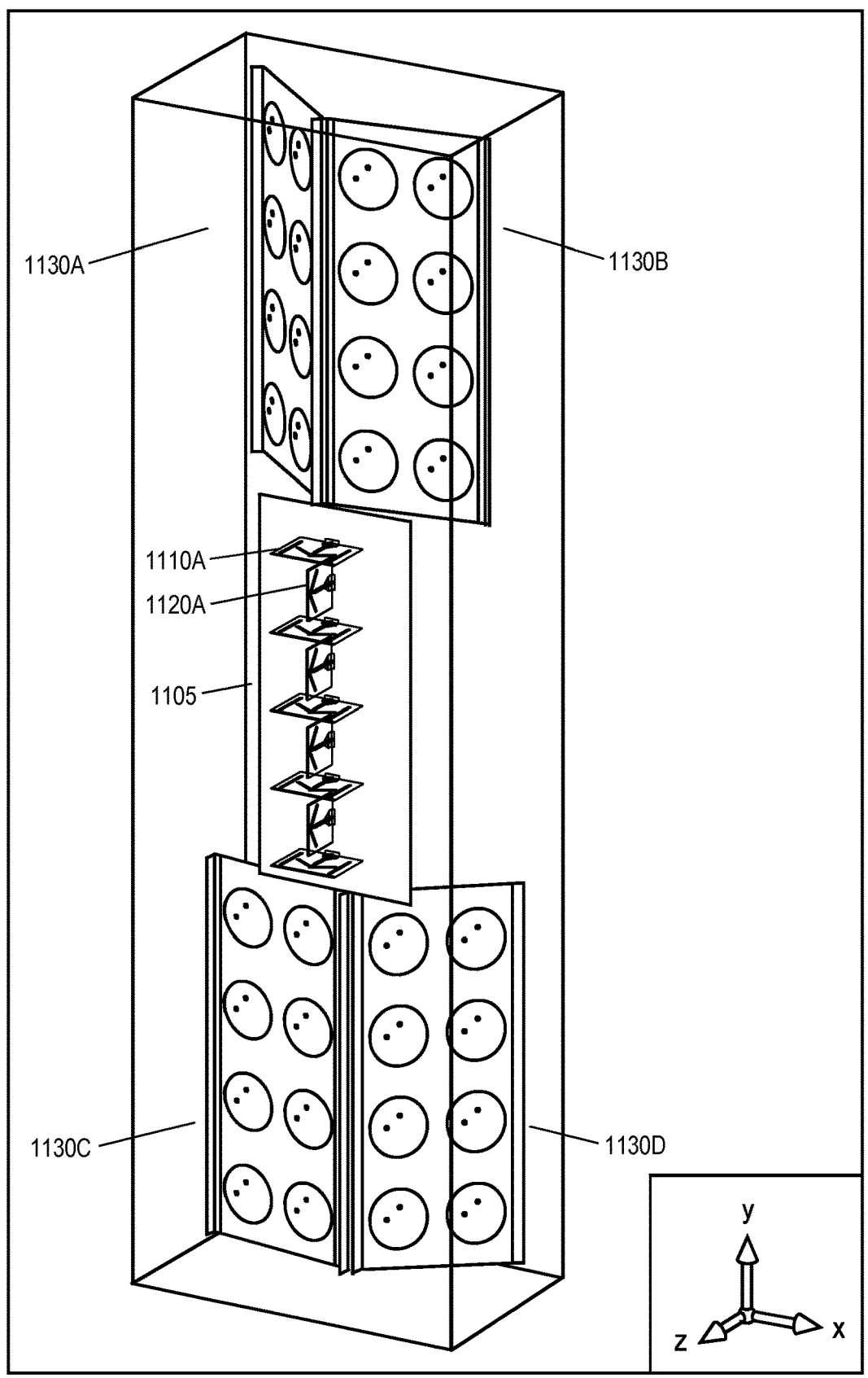
FIG. 11 is a diagram of an exemplary vertically arranged intelligent backhaul radio antenna array.

FIG. 10 is a diagram of an exemplary horizontally arranged intelligent backhaul radio antenna array intended for operation in the 5 to 6 GHz band and FIG. 11 is a diagram of an exemplary vertically arranged intelligent backhaul radio antenna array also intended for operation in the 5 to 6 GHz band. Analogous versions of the arrangement shown in FIGS. 10 and 11 are possible for any bands within the range of at least 500 MHz to 100 GHz as will be appreciated by those of skill in the art of antenna design. In both FIGS. 10 and 11 the number of transmit directive antenna elements 652 and associated Front-end Transmission Units 809 is $Q_T$=2. Larger values of $Q_T$ are straightforward to implement by increasing the width of the antenna array depicted in FIG. 10 or possibly without increasing any outside dimensions of the antenna array depicted in FIG. 11 at least for $Q_T$=4 as will be appreciated by those of skill in the art of antenna design. In both FIGS. 10 and 11 the number of receive directive antenna elements 652 and associated Front-end Reception Units 810 is $Q_R$=8. Larger values of $Q_R$ are straightforward to implement by increasing the width of the antenna array depicted in FIG. 10 or by increasing the width and/or height of the antenna array depicted in FIG. 11 as will be appreciated by those of skill in the art of antenna design.

The transmit directive antenna elements depicted in FIGS. 10 and 11 comprise multiple dipole radiators arranged for either dual slant 45 degree polarization (FIG. 10) or dual vertical and horizontal polarization (FIG. 11) with elevation array gain as described in greater detail in U.S. patent application Ser. No. 13/536,927 and incorporated herein. In one exemplary embodiment, each transmit directive antenna element has an azimuthal beam width of approximately 100-120 degrees and an elevation beam width of approximately 15 degrees for a gain Gqt of approximately 12 dB.

The receive directive antenna elements depicted in FIGS. 10 and 11 comprise multiple patch radiators arranged for either dual slant 45 degree polarization (FIG. 10) or dual vertical and horizontal polarization (FIG. 11) with elevation array gain and azimuthal array gain as described in greater detail in U.S. patent application Ser. No. 13/536,927 and incorporated herein. In one exemplary embodiment, each receive directive antenna element has an azimuthal beam width of approximately 40 degrees and an elevation beam width of approximately 15 degrees for a gain Gqr of approximately 16 dB.

Other directive antenna element types are also known to those of skill in the art of antenna design including certain types described in greater detail in U.S. patent application Ser. No. 13/536,927 and incorporated herein.

Preliminary measurements of exemplary antenna arrays similar to those depicted in FIG. 10 show isolation of approximately 40 to 50 dB between individual transmit directive antenna elements and individual receive directive antenna elements of same polarization with an exemplary circuit board and metallic case behind the radiating elements and a plastic radome in front of the radiating elements. Analogous preliminary measurements of exemplary antenna arrays similar to those depicted in FIG. 11 show possible isolation improvements of up to 10 to 20 dB for similar directive gain elements relative to FIG. 10. Thus, for certain IBR embodiments in ZDD operation, the vertical antenna array arrangement depicted in FIG. 11 may be preferable to the horizontal antenna array arrangement depicted in FIG. 10, providing for additional initial RF isolation.

Figure 12:
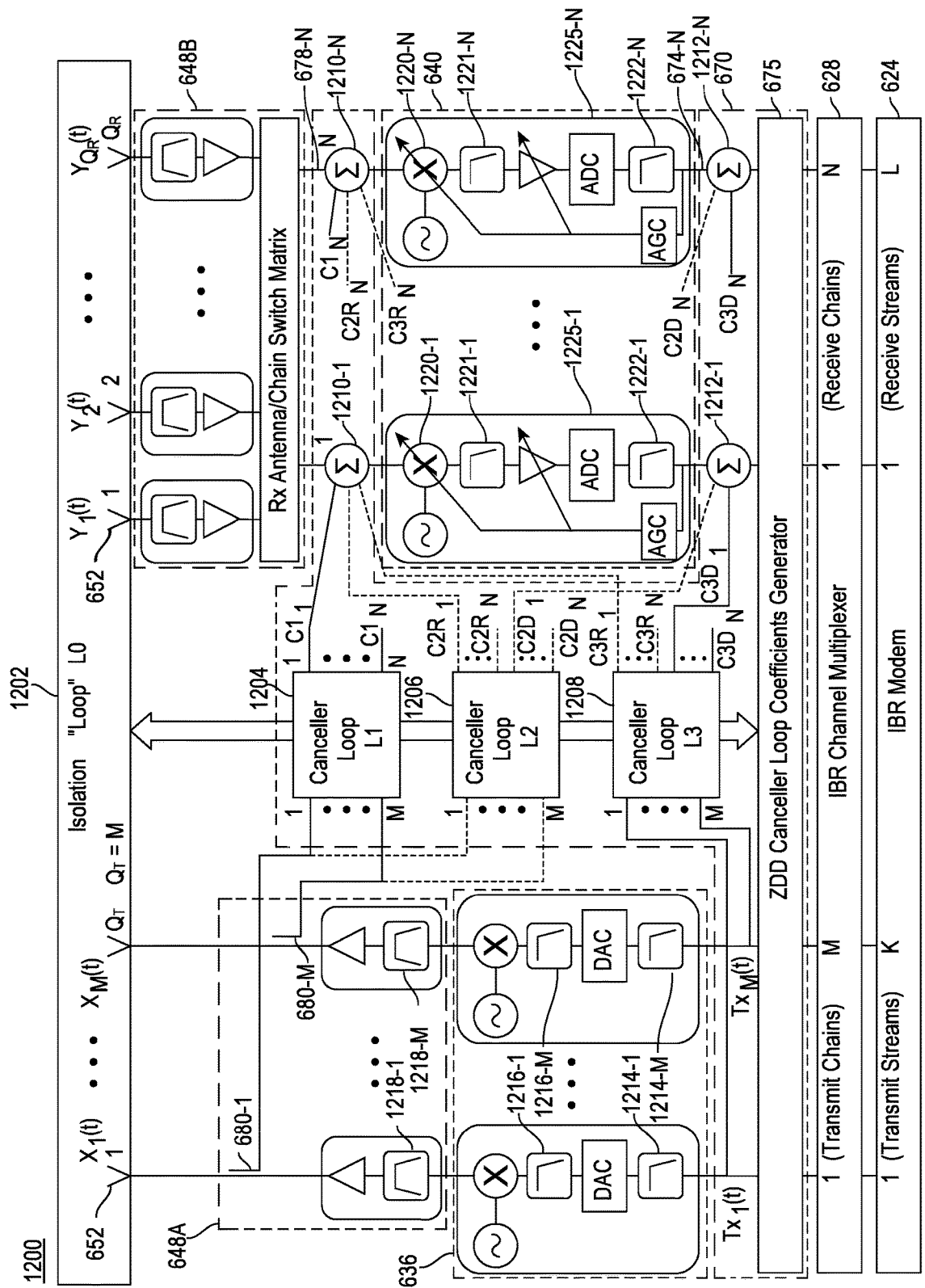
FIG. 12 is a block diagram of a portion of a ZDD enabled IBR according to one embodiment of the invention.

FIG. 12 is a block diagram of a portion of an IBR according to one embodiment of the invention that illustrates one exemplary embodiment of the ZDD Canceller 670 in greater detail internally and with relationship to other parts of an exemplary IBR. The implementation philosophy shown in the current embodiment is based on cancelling the transmit chain signals from the IBR Transmit Antenna Array (648A) that undesirably leak in to the receive chains (comprised of signal flow from IBR Receive Antenna Array (648B) to the receive portion of the IBR Channel Multiplexer (628)). ZDD cancellation may be performed using multiple approaches and at various stages within the IBR receive chains. Within alternative embodiments, it is also possible to cancel the transmit streams (1 . . . K, from IBR Modem 624) within the receive streams (1 . . . L, output from the IBR Channel Multiplexer 628). Further alternative embodiments employ cancellation of the transmit chain signals within the receive streams (1 . . . L, output from the IBR Channel Multiplexer 628).

Note that within the current embodiment, associated with performing cancellation at various stages of the receiver chains, cancellation may be performed at analog baseband, intermediate frequency (IF), RF and/or digital baseband.

In order to achieve the required performance of the IBR 1200, the signal to noise ratio of the Receive Streams (1 . . . L) must be sufficient so as to allow for acceptable demodulation error rate at IBR Modem (624). As discussed above, conventional radios utilize frequency duplexing or time duplexing to allow for sufficient isolation of the transmitter signals from the signal being received and demodulated. Associated with the exemplary embodiments of the ZDD enabled IBR 1200, isolation of the desired receive signals from transmitted signals is accomplished utilizing a combination of active cancellation and inherent isolation between the IBR Transmit Antenna Array (648A), and the IBR Receive Antenna Array (648B). The various isolating features and functions are referred to in the following discussion as Isolation Loops or Cancellation Loops. Embodiments of the Cancellation Loops generally include adaptation based on active measurements of signals, channel estimates, cancellation metrics, or other metrics. In the current embodiment depicted in FIG. 12, four loops are shown: Loop L0 (1202), L1 (1204), L2 (1206), and L3 (1208). Note each individual loop may be comprised of multiple successive or nested loops of similar or equivalent function, collectively operating as a single loop.

The Isolation "Loop" L0 (1202) is mainly just indicative of the finite isolation between any two antennas (Tx to Rx, or Tx to Tx) which is a critical parameter for FDD and even more critical in ZDD. Some embodiments of L0 (1202) will not include adaptive adjustment or utilize active control, but may still be referred to as a Loop for the constancy of the terminology herein. Other embodiments of L0, are truly a "loop" to the extent that some feedback mechanism either moves a servo to an isolating structure or a tuning element that affects a different isolation transfer function between any two antennas or sets of antennas of interest for a particular operational mode. Such tuning of control may further include the optional antenna selection function of Rx Antenna/Channel Switch Matrix within 648B. The operation of the optional Rx Antenna/Channel Switch Matrix within 648B is equivalent to that of the receive portions of IBR RF Switch Fabric 812 of FIG. 8, wherein the selection is performed of N RF Receive Signals (RF-Rx-1 to RF-Rx-N) of the $Q_R$ available RF Receive Antenna Signals (labeled consecutively $Y_1(t)$ to $Y_{QR}(t)$) shown in FIG. 12. Such RF Receive Signals (678) are provided to canceller 670, and more specifically to canceller RF summing nodes (alternatively referred to as RF cancellation combiners) 1210-1 to 1210-N respectively.

Design of the antenna array for minimal magnitude response by and/or capability of L0 tuning by feedback is a key enabler for simplifying the demands of L1, L2 and/or L3. Relative to L0 (1202), it is generally expected, and experimentally confirmed in specific embodiments allowing for testing, IBR antenna elements and orientations in a "vertical" array stack as shown in FIG. 11 will have better isolation due to the higher elevation gain than azimuthal gain amongst the elements, relative to the horizontal configurations depicted in FIG. 10.

The Canceller Loop L1 (1204) samples the "actual" transmitted RF signal in each Tx chain (RF Transmit Reference Signals 1 to $M_s$ (680) labeled 680-1 to 680-M), and then generates for each Rx chain a modified "cancellation signal $C1_n$" (also referred to in some embodiments as a RF transmit leakage cancellation signal) that when summed (via RF summers 1210-1 to 1210-N) with the Rx chain signals (678) before input to the downconverters (640) substantially cancels the Tx signals 1 through M ($X_1(t)$ to $X_M(t)$) that have leaked into the Rx antennas contributing to each Rx chain "n". Exemplary embodiments of L1 (1204) are realized by an analog equivalent to a complex FIR "filter" implemented at RF and described in relation to FIG. 13. In alternative implementations L1 (1204) may be implemented by down converting RF Transmit Reference Signals 680 to an intermediate frequency (IF) for FIR processing and then either upconverted back to RF or applied at a cancellation-summing node at IF.

For some embodiments of ZDD-IBRs, L1 may be targeted at only the largest Tx to Rx coupling paths, and those that are fixed for a specific IBR RF switch fabric (812) selection.

Such coupling paths are expected to involve timescales with variations typically of order 1 ns or less for example in some embodiments. In specific embodiments it is possible to determine the appropriate loop coefficients once (at a factory calibration in some embodiments) and then refine only very occasionally. Such an approach may be utilized in other embodiments where longer time delays with mode variation are addressed as well, as a combination of a fixed or slowly adapting L1, and a parallel of sequential L1 cancellers which address the longer delay, lower magnitude, and more highly varying coupling paths. Such embodiments may include a "primary" loop to address the most significant magnitude response components and once cancelled by the primary loop (typically including L1 but possibly using part of L2 or L3 instead or in addition to L1), this should allow a secondary loop (probably within L2 or L3) to track shorter variations of much smaller magnitude. Details of exemplary L1 embodiments are described in further detail in connection with FIG. 13.

The Canceller Loop L2 (1206) also samples the transmitted RF signals (RF Transmit Reference signals 680). In some embodiments, it may be preferable not to sample directly as indicated but instead sample by taking a set of interim output signals from within L1 (there are M×N such interim cancellation signals) and then applying the additional fine resolution processing of L2 (1206). L2 is distinctly different from L1 (1204) in that L2 processes Tx signals in the digital baseband domain using FIR digital "filter" techniques which enables L2 to practically cancel far lower power signals with substantially longer delays than with L1 (1204). Optionally the L2 cancellation signal can be upconverted back to RF ("C2R$_n$" as shown) or used as a cancellation signal at digital baseband ("C2D$_n$" as shown and referred to as a baseband transmit leakage cancellation signal in some embodiments). In embodiments utilizing digital baseband cancellation via L2 or L2 and L3 together, summer nodes (alternatively referred to as cancellation combiners) 1212-$n$ will be respectively utilized to sum the C2D$_n$ signal with receive chain output signals (674) from respective receive chains to provide respective baseband cancelled receive signals. A major issue with L2 is the noise and distortion added by the act first of downconverting and digitizing the sampled Tx RF signals, and then further upconverting and leveling if the optional "C2R$_n$" signals are to be generated. Aspects of L2 embodiments addressing such impairments will be discussed. Note that exemplary embodiments of such processing are depicted and described in further detail in connection with FIG. 14.

The Canceller Loop L3 (1208) is very different from L1 (1204) or L2 (1206) in that it takes as an input a digital baseband representation of each Tx chain signal Tx$_1$(t) to Tx$_M$(t). In L3 (1208) all processing of the Tx chain signal can be done using digital FIR "filter" techniques similar to L2. Ideally the input to L3 would be after the digital low pass channel filter 1214-$m$. In embodiments where the filter outputs are not accessible the digital filters (1214) can also be replicated in L3 to generate a better estimate of the actual Tx signal. Such replication provides for matched channel impacts thus reducing the overall need for the L3 channel estimation to include compensation for filters 1214-1 to 1214-M. Eliminating the requirement to estimate this filter will allow for a faster or less complex estimation of L3 cancellation coefficients in some embodiments. Similarly, the effective response of the low pass analog filter (1216-$m$) following the DAC, and the BPF (1218-$m$) following the upconverter can also be included in L3 to improve the cancellation accuracy, efficiency, or convergence speed.

Additionally, it is contemplated that other filters may be included in L3 as well, for instance those in the receiver such as a bandpass filter (not show) following summers 1210-$n$, and lowpass filters 1221-$n$, and 1222-$n$. Further, certain intermod products in the Tx chain or as created in the Rx front-ends (or in the analog portions of L1 or L2) can also be modeled within L3 (or possibly within L2) for cancellation by the L3 output. Such processing will be further described in connection with embodiments depicted in FIG. 15.

However, L3 (1208) cannot cancel Tx chain noise as L1 can generally or L2 can subject to certain limitations. Typically the L3 cancellation signals "C3D$_n$" would be used at digital baseband (referred to as baseband transmit leakage cancellation signals in some embodiments) as shown but optionally these signals can be upconverted as "C3R$_n$" and applied at RF (at summer 1210-$n$ for instance and wherein C3R$_n$ comprises an up-converted baseband transmit leakage cancellation signal which acts as a digitally generated RF transmit leakage cancellation signal in some embodiments). It is also possible to generate both "C3D$_n$" and "C3R$_n$" simultaneously and in some embodiments with different emphases on the various undesired signal components to be cancelled.

The ZDD Canceller Loop Coefficients Generator (ZCLCG) (675) is notional as shown in FIG. 12. This illustrates a bus for coefficients to be transferred to the various loops (and in some embodiments, operation information to be fed back from the various loops to the ZCLCG). It is shown with the primary inputs being the pass through digital baseband receive chain signals from which the ZCLCG can measure the effects of different loop coefficients on the undesired signal levels present, as well as perform calibration and channel estimation functions associated with the transmitter, receiver, and loop signal paths. However, other inputs such as RSSI from each downconverter chain, or FFT data (or derived FFT data) for each Rx chain from the IBR channel multiplexer (not specifically illustrated above) may also be used by the ZCLCG to determine various loop coefficients in specific embodiments. Furthermore, the ZCLCG itself as a "processor" may be within the same resources as the IBR channel multiplexer and/or IBR modem or a standalone processor or a custom chip with one or more of the loops, or some hybrid of some or all of the above in various embodiments. Embodiments of the ZCLCG will also include state machine functionality so as to perform the aforementioned procedures as part of a process, or in reaction to events, or time durations and periods. For instance, in one embodiment, L0 may be modified based upon a change in the selected receive antennas to be utilized within the Receive Antenna Array (648B) and the IBR RF Switch Fabric (812). In response to this change, the loop coefficients may be required to be modified by the ZCLCG (675). In one embodiment, the timing of such an antenna selection change may be in coordination with one or more of the RRC (660), IBR MAC (612), RLC (656), and other functional blocks of FIGS. 6 and 7 including IBMS Agent (700), so as to cause the antenna selection change to be just prior to a known signal transmission period designed and utilized for the training of the ZCLCG. Such an approach has the benefit of potentially minimizing the loss of transmitted information to an intended receiving IBR, and may further include pre-determined waveform properties beneficial to the training and loop coefficient determination. Other embodiments may perform such a training process on a periodic basis, and/or in response to a measured cancellation performance threshold, a temperature change, or changes in other IBR operating parameters. Embodiments may also utilize a training process wherein various loops are trained sequentially and utilizing various procedures and algorithms. For example in one embodiment, upon a change to L0 (1202), L1 (1204) may be trained with L2 (1206) and L3 (1208) effectively turned off, and utilizing a closed loop adaptive algorithm with the goal of minimizing a parameter associated with a transmitted training signal (such as RSSI, or correlated signal power). Following the completion of the L1 coefficients being set, the coefficients of successive loops may be progressively determined and set. In some embodiments, the determination of the coefficients may be performed adaptively using a steepest decent class of algorithm, while in other embodiments a close form calculation may be utilized wherein a measurement of the impulse response or frequency response (referred to herein generically as the channel response) is made including an actively cancelling L1. The channel response measurement would be made from each transmit chain to each receive chain in some embodiments, and result in M×N channel measurements (where M is the number of transmit chains, and N is the number of receive chains). Such a channel measurement may then be utilized to calculate the required loop coefficients for L2, if present, and L3. Such calculations may be performed with the same or separate channel measurements for L2 and L3. In embodiments where separate channel measurements are utilized for L2 and L3 coefficient calculation, some embodiments may perform the L3 channel measurements with L1 and L2 cancellation active such that the cancellation performance is include in the resulting L3 channel measurements.

Referring to the IBR RF (632) and specifically the receive portions (640), the receive gain control, in some specific embodiments, must take into account the remaining transmit signal following the L1 cancellation process at the summers 1210-$n$. Some embodiments may control the AGC from the ZDD Canceller Loop Coefficients Generator (675) or from the IBR Modem or IBR Channel Mux instead of from within the Rx chain as shown in FIG. 12. Within the transmitter chains, transmit power control is expected but not shown, and in some embodiments would be under the control (at least partially) of the coefficient generator (675) so the cancellation performance may aid in the determination of a maximum or desirable transmit power level based upon limitations of the cancellation multiplexer (670).

IBR embodiments utilizing ZDD may be utilized in at least two variants. The first variant is "co-channel" ZDD ("CC-ZDD") wherein the Tx chain channels at least partially overlap (if not completely coincide with) the Rx chain channels. Embodiments utilizing CC-ZDD are theoretically possible of achieving twice the spectral efficiency for a single link at the physical layer, relative to systems not utilizing ZDD approaches. When coupled with available MAC efficiencies due to the reduction of delay and increased automatic retransmission (ARQ) efficiency utilizing an ACK/NAK protocol or the equivalent, additional efficiencies are possible. In particular, the delay reduction relative the TDD based systems is significant. This CC-ZDD mode is ideal for licensed band operation where interference is well controlled and spectral efficiency most highly valued.

The second ZDD variant can be called "single band" or "co-band" ZDD (CB-ZDD) wherein both the Tx chain channels and the Rx chain channels are within a single band (using a single band pass filter) utilized during both transmission and reception, but the channels do not overlap. Such an arrangement results in minimal spectral efficiency improvement (though FDD is typically better than TDD) but is still highly desirable at least as a fallback mode for unlicensed band operation. One advantage of CB-ZDD in unlicensed bands results from the interference seen at the receiver of one IBR, being dramatically different (and frequency dependent) compared to its peer device such that operating in a similar frequency range allows for a more optimized channel frequency choice under significant interference conditions. Other advantages include the flexibility for a CB-ZDD device to operate in bands which operation would otherwise not be possible without expensive and fixed band pass filters. In some ways, "co-band" ZDD ("CB-ZDD") is simpler because the analog and/or digital baseband low pass filters (as well as the FFTs in the IBR channel multiplexer) can perform much of the Tx signal cancellation. But in other ways since the requirement to cancel the Tx chain noise within the Rx chain channel remains the same as CC-ZDD, then CB-ZDD has the additional complication that the "easily" detectable Tx signal that drives the ZCLCG process is not at the right channel frequency to ensure noise cancellation in the Rx chain under normal operating conditions. However other metrics for Tx noise cancellation may be utilized mitigating much of this disadvantage, such as adapting the loops based upon receiver performance metrics such as signal to noise ratio (SNR), bit error rate (BER), frame error rate (FER) or metrics associated with the forward error correction (FEC). Such approaches would be most applicable to L1 or L2 with $C2D_n$ adaptation (or "L2D") for noise cancellation.

The aforementioned CC-ZDD (and potentially CB-ZDD) has specific applicability in use in an ZDD Aggregation End IBR (AE-IBR) when operating in a point to multi-point (PMP) mode in communication with multiple non-ZDD Remote End IBRs (RE-IBRs) operating each in a TDD mode. Such a configuration allows for the ZDD enabled AE-IBR to be transmitting to one or more RE-IBRs, whilst receiving from one or more other RE-IBRs. In these embodiments, no ZDD cancellation is required at the RE-IBRs, but a doubling of the overall network efficiency is realized relative to AE-IBRs not utilizing ZDD. To enable such an embodiment, a time multiplexing of one or more of the AE-RE links and RE-AE links must be arranged and scheduled such that the RE-IBRs are time multiplexed with their transmission and reception periods, and offset relative to other RE-IBRs, at least to the extent that TDD operation is achievable at each RE-IBR individually, not considering other multipoint multiplexing approaches such as frequency multiplexing (such as Orthogonal Frequency Division Multiple Access (OFDMA), Single Carrier Frequency Division Multiplexing (SC-FDM), and the like). Such techniques may be using in combination with the aforementioned ZDD multiplexing approaches.

Other embodiments of the aforementioned ZDD techniques may be utilized for repeaters to be used interposed between IBRs, or in conjunction as a feature of a particular ZDD enabled IBR. Such repeater embodiments may utilize ZDD approaches to allow for reception and transmission of signal simultaneously allowing for higher efficiency relative to TDD based repeating approaches, or more spectral efficiency relative to FDD based repeating approaches. ZDD repeater embodiments may perform the repeating function in a number of approaches including: at an RF and un-demodulated level, a modulation symbol by symbol level, a stream level, an FEC Block Level, a MAC Frame Level, or potentially higher levels. When performed at a stream level, beam forming techniques may be utilized to allow for a spatially rich propagation environment allowing for an increased performance network.

Figure 13:
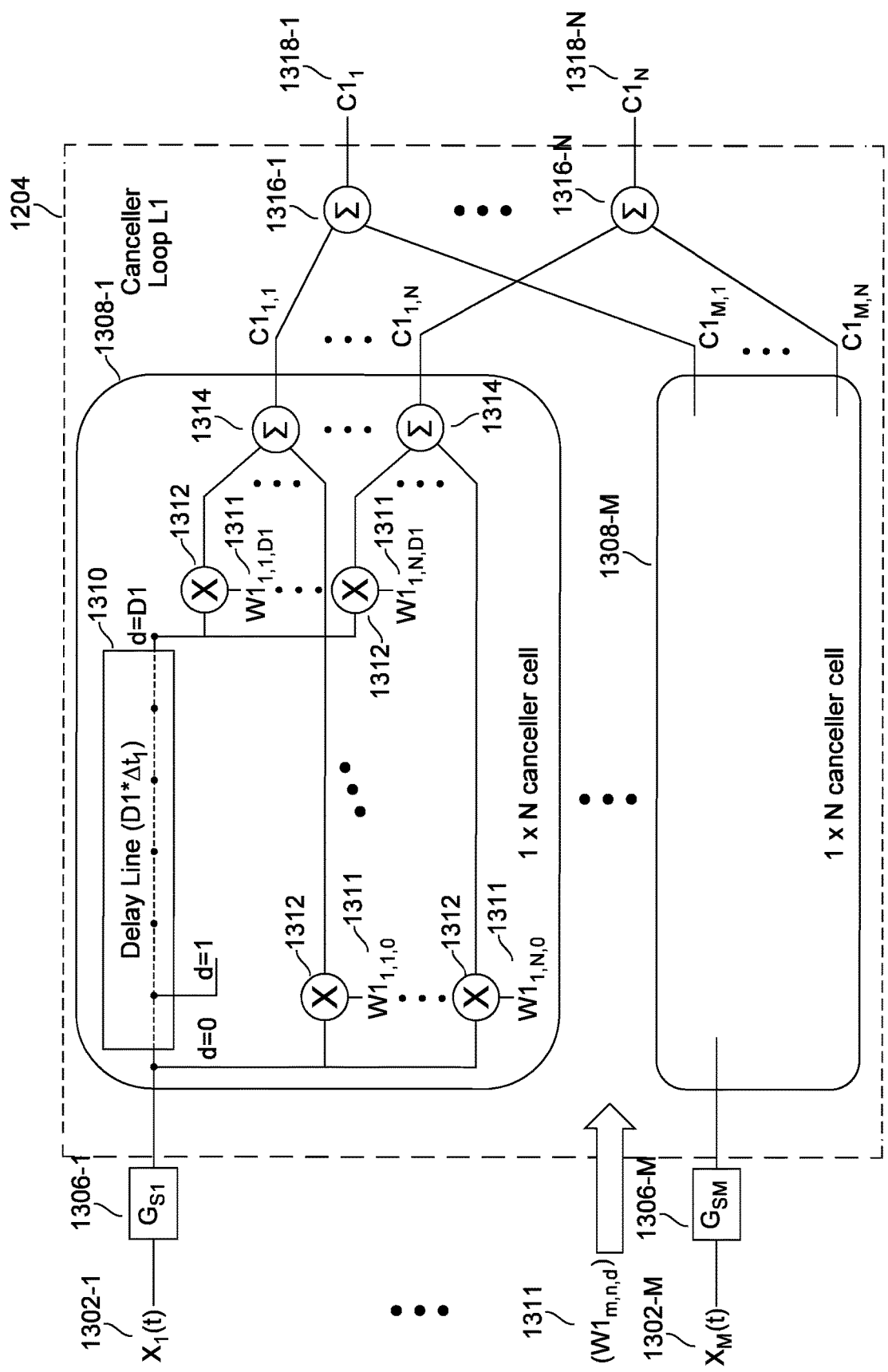
FIG. 13 is a block diagram of a Loop 1 ZDD canceller according to one embodiment of the invention.

Embodiments of a Loop 1 (L1) (1204) canceller of cancellation multiplexer (670) are depicted in FIG. 13. An exemplary Loop L1 embodiment samples the "actual" transmitted RF signal in each Tx chain (1302-$m$), and then generates for each Rx chain a modified "cancellation signal C1$_n$" (1318-$n$) that when applied to summing node (1210-$n$) with the Rx chain signal (678-$n$) before input to the downconverter (1220-$n$) substantially cancels the Tx signals 1 through M that have leaked into the Rx antennas contributing to Rx chain "$n$". Some embodiments of L1 are realized by an analog equivalent to a complex FIR "filter" implemented at RF. Alternative embodiments of L1 provide for signal to be down converted to an IF for FIR processing and then either up converted back to RF or applied at IF.

The transfer function G$_{Sm}$ (1306-$m$) is intended to indicate a "zero-th" order match between the magnitude and delay from X$_m$(t) to an average Rx chain at the first summer and a known frequency response. The delay might be realized in a cable of preset length that approximates the delays in the Tx-Rx path. The transfer function might be strongly influenced by one or more band pass filters in each Rx chain, or other filters in either the transmit or receive paths which are "in the loop", and so it may be advantageous to place an identical band pass filter (or other such "in the loop" filters) within each G$_{Sm}$ (1306-$m$). This has the additional benefit of keeping out of band Tx spurs from being injected into the Rx chains. The transfer function also includes the effect of the coupling to X$_m$(t), by a line coupler near the Tx antenna feed point in some embodiments. It is desirable to sample a signal highly correlated to the actual X$_m$(t) transmission and to have sufficient signal such that the sampled noise floor is far above the equivalent input noise of L1.

In some embodiments of the "FIR" structure depicted in FIG. 13, a delay line (1310) is of length D1*$\Delta t_1$ and for each delay tap, weights W1$_{m,n,d}$ (1311) are complex with separate I and Q components, while in other embodiments such weights may be in amplitude only. In an exemplary embodiment as depicted by FIG. 13, the weights (1311) are typically sent from the ZCLCG (675) as finite bit words (i.e. 8, 10 or 12 bits per I or Q component). In an alternative embodiment, the weights (1311) come from an analog feedback loop. In an exemplary embodiment as depicted by FIG. 13, each weight W1$_{m,n,d}$ (1311) is complex multiplied (1312) in the RF signal domain on the d-th delayed version of the m-th sampled Tx chain signal and then the results are summed across each d=0 to D1 for each m at summing nodes 1314, and then across all m=1 to M for each of n=1 to N at summing nodes 1316-$n$.

The exemplary embodiment depicted in FIG. 13 indicates a delay line (1310) of uniform steps $\Delta t_1$ from d=0 to d=D1 (similar to a FIR filter structure). However, it may be neither practical nor desirable to have uniform steps. If L1 is "matched" to reflections including transmit to receive propagation time delays up to a maximum time delay (such a maximum time delay sufficient to address all reflections above a specific magnitude threshold) then there may be non-uniform time steps that result in a better cancellation by design. Also, it may be neither practical nor desirable to have uniform amplitudes from each tap of the delay line for analogous reasons. In some embodiments the typical delay within G$_{Sm}$ will be of order 1 ns, and the delay line length will be of similar order or possibly less. In a discrete implementation even 3 "taps" may be impractical for a 2×4 system, but when implemented in a custom RFIC it may be practical to have on the order of 5-10 delay steps, while other embodiments may have yet more taps.

In practice, the RF delay line (1310) depicted in FIG. 13 can be realized from a distributed transmission line with multiple taps, or from a lumped circuit equivalent with passive inductors and capacitors. In embodiments utilizing complex multipliers (1312) or equivalent circuits thereof, each complex multiplier (1312) can be constructed, for example only, from a pair of four-quadrant multipliers wherein one multiplier is driven by an "I" set of weights and the other by a "Q" set of weights (collectively a complex weight 1310 in the current embodiment), and further wherein either the RF input signal to the second multiplier is shifted 90 degrees relative to the first or the outputs of the respective multipliers are summed (at summer 1314 in some embodiments) in quadrature instead of linearly. There are numerous conventional techniques to realize the RF summations (1314, 1316-$n$) in FIG. 13 and to combine one or more of summing nodes 1314, 1316-$n$ and/or 1210-$n$ into a single summing node (wherein each summer may be referred to as a combiner elsewhere). It is also possible to implement the canceller L1 without using quadrature signal paths and weights relying on "real" sampling theory, by ensuring the taps are spaced to satisfy the Nyquist band pass sampling theorem. One embodiment of a delay line utilizing complex samples and weights may be implemented with a single delay line and linear summation, wherein each I and Q sample in the delay line are sampled from different taps spaced at 1/(fo*4) in time, where fo is the center frequency of operation of the band, and if the delay between each "pair" of taps is equated to 1/BW, then BW is the frequency bandwidth of the cancellation bandwidth. In such an embodiment, each pair of taps, comprise in phase and quadrature phase (or real and imaginary) samples at a specific "tap".

Figure 14:
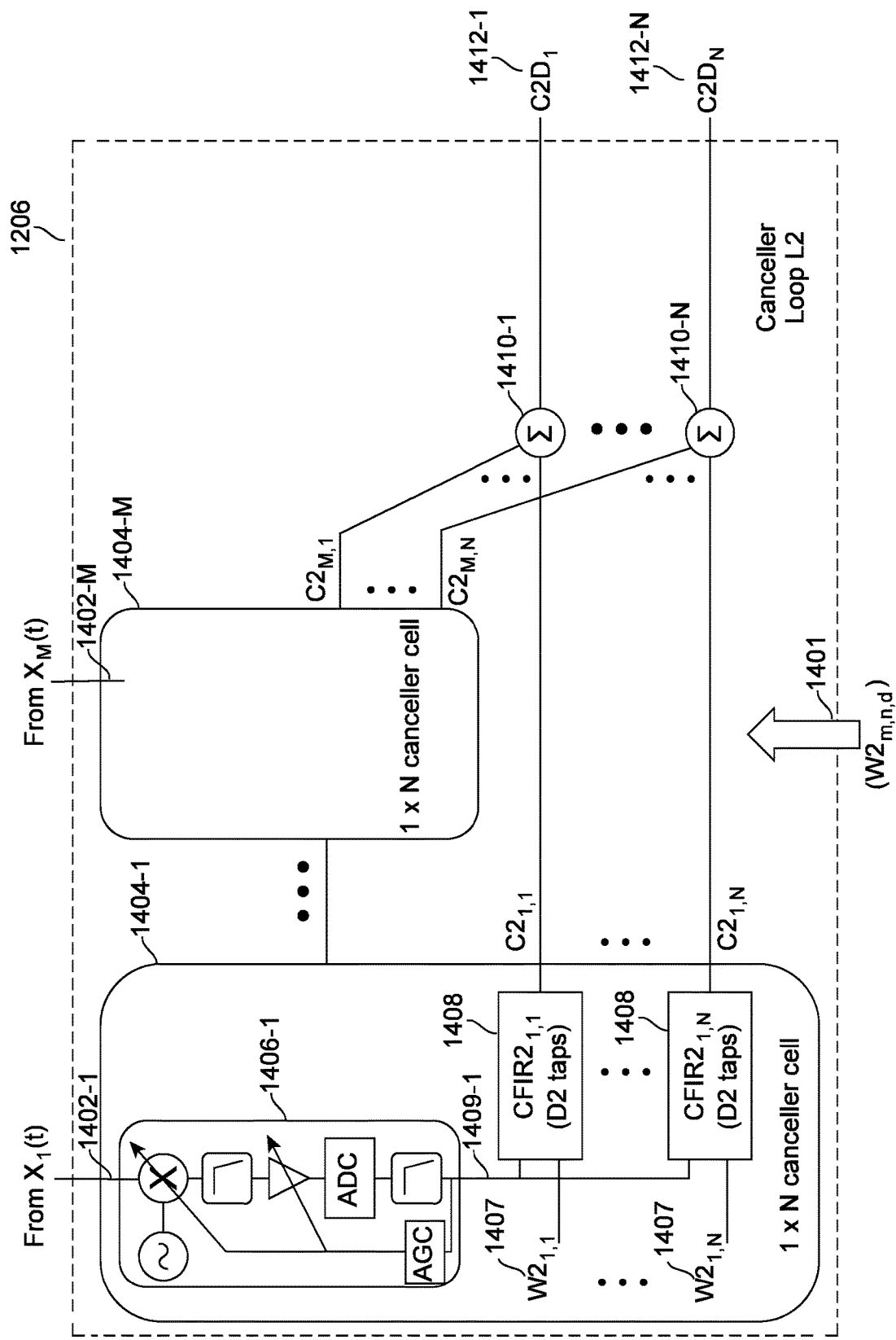
FIG. 14 is a block diagram of a Loop 2 ZDD canceller according to one embodiment of the invention.

Referring now to FIG. 14, a block diagram of a Loop 2 ZDD canceller according to one embodiment of the invention is depicted. As previously discussed, the Canceller Loop L2 (1206) also samples the transmitted RF signals though in some implementations it may be preferable not to sample directly as indicated but instead by taking a set of interim output signals from within L1 (1204) as there are M×N such interim cancellation signals in some embodiments and then applying the additional fine resolution processing of L2. In other embodiments, the "FIR" filter structures of L1 may be incorporated into L2 (1206). Such an arrangement may be utilized in embodiments not having a L1 (1204), but utilizing advantages of combining transversal filtering at RF of each of the transmitters individually (utilizing L1 weights) into all of the sampling receivers of L2. Such an arrangement allows for advantages in capturing and utilizing transmitter and receiver noise (especially phase noise) in specific combinations. In such an embodiment it is possible to capture all (M times N) combinations of the transmitter and receiver multiplicative phase noises. In one embodiment of such an arrangement, passive components and micro-strip lines utilize a printed circuit board or other substrate. Such arrangements allow for a "spatial multiplexing" by the RF filter structures of all transmitter signals onto each of the sampling receivers. Further embodiments allow for use of such FIR structures, or delay line structures to spatial multiplex RF Transmit Reference Signals (680-$m$) with receive chain signals (678-$n$) by utilizing either the signal receive chains (1225-$n$) and/or the sampling receive chains (1406-$m$). In the case where both L2 sampling receive chains (1406-$m$) and signal receive chains (1225-$n$) are utilized, receive chain signals 678-$n$ and RF Transmit Reference Signals (680-$m$) would be coupled to more than one of the utilized signal receiver chains (1225-$n$) and sampling receive chains (1406-*m*) to multiplex signals. Further additional processing to de-multiplex the signals will be performed to de-multiplex the receive chain and sampling receive chain signals prior to applications to the L2 FIR filters (1408). Other embodiments may utilize arrangements of signal receive chains (1225-*n*) alone or sampling receive chains (alternatively referred to as transmit RF reference receive chains in some embodiments) (1406-*m*) alone. Baseband processing equivalent to MIMO receiver processing may be utilized to separate the individual combinations of transmitter to sampling receiver signals. When specific arrangements of shared VCOs are utilized among receivers and sampling receivers and between transmitters and in some cases C3R up converter chains, the VCO phase noise impact may be greatly mitigated or even eliminated.

In one greatly simplified and exemplary embodiment addressing the impacts of phase noise (and other sources of noise), a single shared VCO is utilized for all up converters and down converters for the transmitters, receivers, sampling receivers, and any C3R up converters. Such an arrangement does not require the RF "spatial multiplexing" discussed above in order to address phase noise concerns as the transmitter phase noise when received using a C2D sampling receiver (1406, alternatively referred to as transmit RF reference receive chains in some embodiments) will have a common noise as the transmitter signal when received on the signal receivers (1225-1 through 1225-N). Other arrangements may share VCOs between all up converters (that generate $C3R_n$) and transmit chains (636), and between all down converters within C2D sampling receivers (1406-*m* of 1404-1 through 1404-M, and alternatively referred to as transmit RF reference receive chains in some embodiments) and signal receivers (1225-1 through 1225-N). Further embodiments may utilize common VCOs between pairs of down converters in a respective sampling receiver and signal receiver, or similarly utilize common VCOs for pairs of up converters for a respective signal transmitters and C3R up converter chain.

Returning now to the exemplary embodiments of FIG. 14, embodiments of L2 are distinctly different from L1 in that L2 processes Tx signals in the digital baseband domain using FIR "filter" (1408) techniques that enable L2 to cancel far lower magnitude signals with substantially longer delays than with L1. In some embodiments the L2 cancellation signal can be upconverted back to RF ("$C2R_n$" not shown in FIG. 14) or used as a cancellation signal at digital baseband ("C2Dn" as shown). One major issue with L2 is the noise and distortion added by the act first of downconverting and digitizing the sampled Tx RF signals (1406).

In some embodiments, the inputs from $X_m(t)$ can be a line coupled input as described for L1, or can be from the same $G_{Sm}$ (1306-*m*) (or a parallel $G_{Sm}$ for L2 only) as described for L1. In alternative embodiments, the inputs for each $X_m(t)$ might be derived from the set of $C1_{m,n}$ (where n=1 to N). This could be the average of the N cancellation signals, the maximum of them or some weighted blend where the weights are determined dynamically by the ZCLCG.

Note that with respect to embodiments of FIG. 14, the number of transmitters M may be different from the number of receivers N. However in specific embodiments discussed above addressing the "spatial multiplexing" of transmit reference signals (680-1 through 680-M) onto the sampling receivers (1406-*m* of 1404-1 through 1404-M)) and potentially the receive chains, the number of transmitters and receivers are equal (M=N).

In one embodiment in which Cm (1318-*n*) signals are utilized respectively as inputs (1402-1 to 1402-M, where M=N) to each sampling receiver 1406-1 to 1406-M, sets of weights (1311) may be chosen so as to allow for a "spatial" multiplexing between the transmitter signals and the separation of each of the transmitter signal components from one another including associated transmitter noise and specific sampling receiver (1406-*m*) noise as discussed above. As noted previously the phase noise of both the Tx chains and the Rx chains are particularly problematic for the operation of L2D processing. However in specific implementations, utilizing transmitters and receivers each with two or more shared voltage controlled oscillators and frequency references, such noise impact may be compensated for in such embodiments. In such a configuration, all M transmitters will be received by all N sampling receivers (1406-1 to 1406-M, when M=N). As noted, by appropriately choosing the L1 weights (1311) associated with each RF transmitter reference signal 1302-*m*, each combination (M by N) of transmitter and receiver noises will be sampled and recoverable via the mentioned spatial multiplexing approach. To the extent that pairs (or more) of receivers have common frequency local oscillators (VCOs and frequency references) individual transmitter and receiver noise components may be recovered and or be compensated for so as to allow for base band digital cancellation of the noise included in the Tx to Rx leakage signals from each receive chain. This is enabled by pairing each signal receiver (1225-*n*) with an L2D sampling receiver (1406-*m*) with a common LO frequency as discussed. The demultiplexing may be performed utilizing specific weights and processing within the FIR filters of FIG. 14 (1408 for example). In one example the so called filter weights for each FIR filter 1408 may be comprised of the convolution of weights for coefficients to separate specific transmitter and receiver components, and to compensate for Tx to Rx frequency responses to allow for cancellation. Alternatively such processing may be performed in the frequency domain rather that in the time domain or in additional processing not depicted in FIG. 14.

In the embodiments associated with FIG. 14, all sets of weights $W2_{m,n}$ (1407) are complex sets of d=1 to D2 individual tap weights each typically with separate I and Q components. They are typically sent from the ZCLCG (675) as finite bit words (i.e. 12, 16, or more bits per I or Q component). Each individual tap weight $W2_{m,n,d}$ (1407) is complex multiplied digitally on the d-th delayed version of the m-th sampled Tx chain signal and then the results are summed across each d=0 to D2 for each m (within each $FIR2_{m,n}$ 1408), and then across all m=1 to M (at each summer 1410-*n*) for each of n=1 to N.

The preceding embodiment indicates a conventional complex FIR filter structure for CFIR2 (1408). It may be desirable when L2 is being used to cancel significant variations in overall delay of the Tx to Rx chain coupling paths to, in some embodiments, have a complex CFIR2 with a smaller time delay for certain of the taps and longer for the remainder, or to have parallel complex FIR structures with different time delay steps and then sum them together.

In some embodiments each sampling receiver chain (1406-*m*) may be realized in practice using conventional components or incorporated in an RFIC. Each $CFIR2_{m,n}$ (1408) and digital domain summation (1410-*n*) can be constructed using conventional digital circuits in either an ASIC or FPGA, or realized in software on a DSP.

Figure 15:
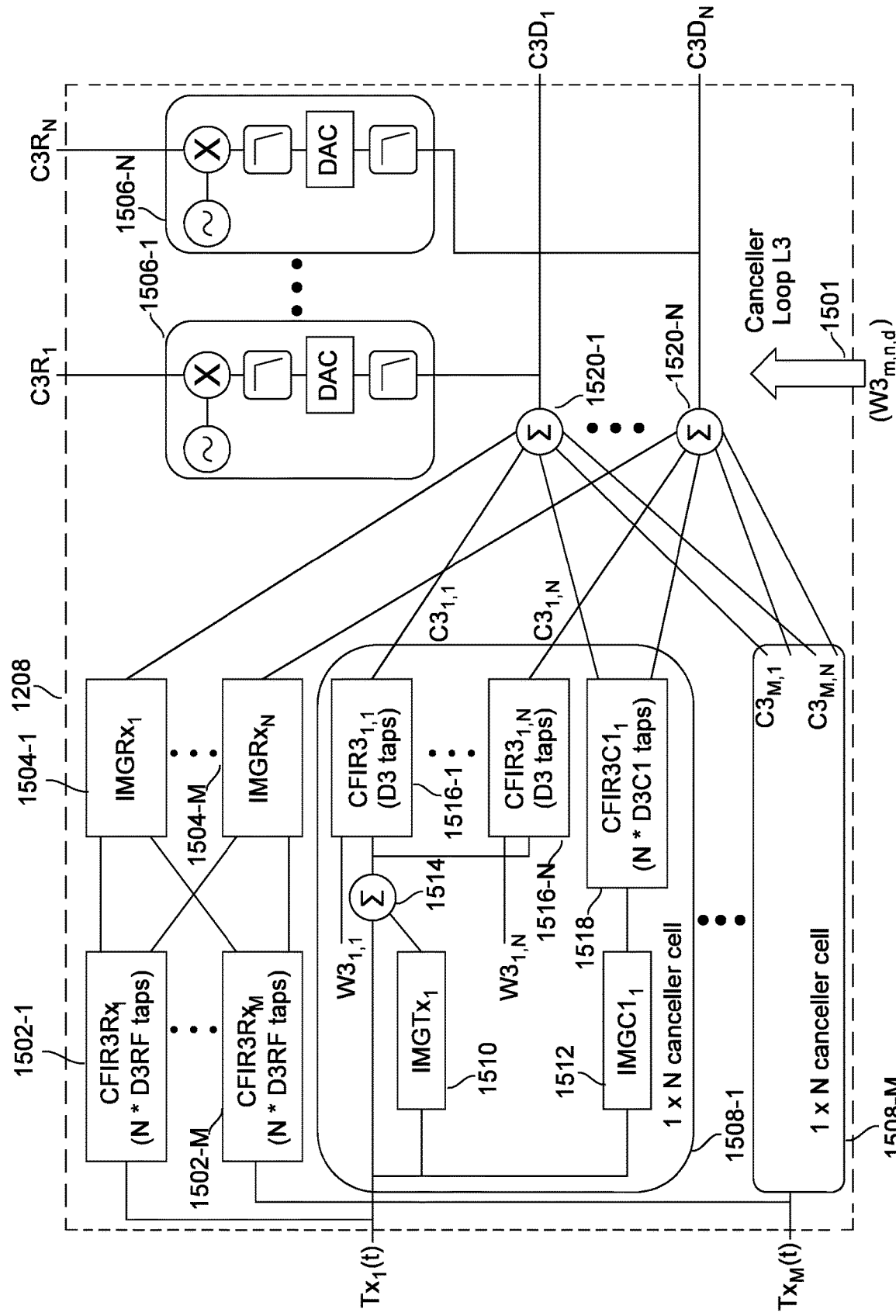
FIG. 15 is a block diagram of a Loop 3 ZDD canceller according to one embodiment of the invention.

Referring to FIG. 15, a block diagram of embodiments of a Loop 3 ZDD canceller is depicted. The Canceller Loop L3 (1208) is very different from L1 (1204) or L2 (1206) in that it takes as an input a digital baseband representation of each Tx chain signal $Tx_1(t)$ to $Tx_M(t)$. In L3 (1208) all processing of the Tx chain signal can be done using digital FIR "filter" techniques similar to L2. Ideally the input to L3 would be after the digital low pass channel filter 1214-$m$. In embodiments where the filter outputs are not accessible the digital filters (1214) can also be replicated in L3 to generate a better estimate of the actual Tx signal. Such replication provides for matched channel impacts thus reducing the overall need for the L3 channel estimation to include compensation for filters 1214-1 to 1214-M. Eliminating the requirement to estimate this filter will allow of a faster or less complex estimation of L3 cancellation coefficients in some embodiments. Similarly, the effective response of the low pass analog filter (1216-$m$) following the DAC, and the BPF (1218-$m$) following the upconverter can also be included in L3 to improve the cancellation accuracy, efficiency, or convergence speed. Additionally, it is contemplated that other filters may be included in L3 as well, for instance those in the receiver such as a bandpass filter (not show) following summers (alternatively referred to as cancellation combiners) 1210-$n$, and lowpass filters 1221-$n$, and 1222-$n$. Further, certain intermod products in the Tx chain or as created in the Rx front-ends (or in the analog portions of L1 or L2) can also be modeled within L3 (or possibly within L2) for cancellation by the L3 output.

However, L3 (1208) cannot cancel Tx chain noise as L1 can generally or L2 can subject to certain limitations. Techniques to mitigate such noise impacts may be addressed associated with L1 or L2 as discussed. One such approach combining $C2D_n$ and $C3R_n$ will be discussed associated with FIG. 18. In particular, an approach for capturing correlated $C3R_n$ noise components by a $C2D_n$ receiver for later cancellation has been discussed and is disclosed in greater detail.

Returning to the exemplary embodiment of FIG. 15, the L3 cancellation signals "$C3D_n$", where n is from 1 to N, would be used at digital baseband as shown but optionally these signals can be upconverted as "$C3R_n$" and applied at RF. It is also possible to generate both "$C3D_n$" and "$C3R_n$" simultaneously and possibly with different emphases on the various undesired signal components to be cancelled, however this would require additional FIR circuitry (not shown) to account for the different magnitude, phase and delay between $C3R_n$ and $C3D_n$ even for the "same" cancellation signal effect.

In the exemplary embodiment of FIG. 15, all weights $W3_{m,n}$ are complex sets of $d=1$ to D3 individual tap weights each typically with separate I and Q components and utilized within $CFIR3_{m,n}$ (1516-$n$ within 1508-$m$). In specific embodiments weights are typically sent from the ZCLCG (675) as finite bit words (i.e. 12, 16, or more bits per I or Q component). Each individual tap weight $W3_{m,n,d}$ is complex multiplied digitally on the d-th delayed version of the m-th sampled Tx chain signal and then the results are summed across $d=0$ to D3 for each m within each CFIR3 (1516-$n$ within 1508-$m$), and then across all $m=1$ to M (at summer 1520-$n$) for each of $n=1$ to N.

The above discussion indicates the use of a conventional FIR filter structure for CFIR3 (1516-$n$ for example). It may be desirable when L3 is being used to cancel signal components with significant time delay variations to either have a complex CFIR3 with a smaller time delay for certain of the taps and longer for the remainder, or to have parallel complex FIR structures with different time delay steps and then sum them together.

The exemplary embodiment of FIG. 15 additionally illustrates an intermod generator $IMGTx_m$ (1510), where m may be from 1 to M, which may be used to estimate IM signal components caused by the Tx PA in chain m. It is expected that the weights used for any CFIR3 following the $IMGTx_m$ would be the same as for the other CFIR3 under the reasonable theory that the IM components out of the $Tx_m$ would experience the same propagation paths to each $Rx_n$ as the rest of $X_m(t)$. Each $IMGTx_m$ (1510) may also take from the ZCLCG (675) certain weights (not shown) that optimize parameters within the intermod model based on observed or calculated results.

In addition to $IMGTx_m$, other intermods of potential interest include those created in the RF LNA of each receive chain n and those created within the other cancellers (such as L1 per the indication above). Each RF LNA may generate intermods of all M Tx signals each of which may be uniquely transferred to each $Rx_n$. Thus, cancellation of such intermods requires at least a bank of M $CFIR3Rx_m$ (1502-$m$) for each $Tx_m$, each comprising N CFIRs of length D3RF taps and weights (not shown). The intermods are then modeled based on M inputs at each respective $IMGRx_n$ (1504-$n$) wherein certain weights (not shown) may be passed to optimize the model in view of observed results. Similarly, for intermods created within each canceller branch of L1 (or of L2, not shown), these can be estimated for each $X_m(t)$ by applying $Tx_m(t)$ to $IMGC1_m$ (1512) as shown above and then applying the result to a bank of N CFIR2C1-m each of D3C1 taps in length with weights (not shown) supplied by the ZCLCG (675).

In specific embodiments, the various operational and design parameters are chosen such that none of the intermod cancellers depicted above are necessary. However, this will not always be the case particularly for high transmit powers associated with longer range operation.

Note the preceding discussion shows both $C3R_n$ and $C3D_n$ but in practice only one of these would normally be present from a single CFIR3 bank as depicted. If it were desired to have both, then there would need to be additional CFIR circuitry present (not shown) to account for the difference in magnitude, phase and delay between the two types of outputs in order to effect cancellations, or alternatively the CFIR3 bank would be replicated separately (i.e. CFIR3R & CFIR3D) with separate weights (not shown) for each to effect a "L3R" and a "L3D" in parallel.

All of the CFIR, IMG and summation circuits (1514, 1520, etc.) depicted in FIG. 15 can be realized by conventional digital circuit techniques in an ASIC or FPGA, or alternatively by software in a DSP. The optional C3R upconverter chains (1506-1 to 1506-N) depicted can be implemented in an RFIC or in commercially available RF transmitter components.

Figure 16:
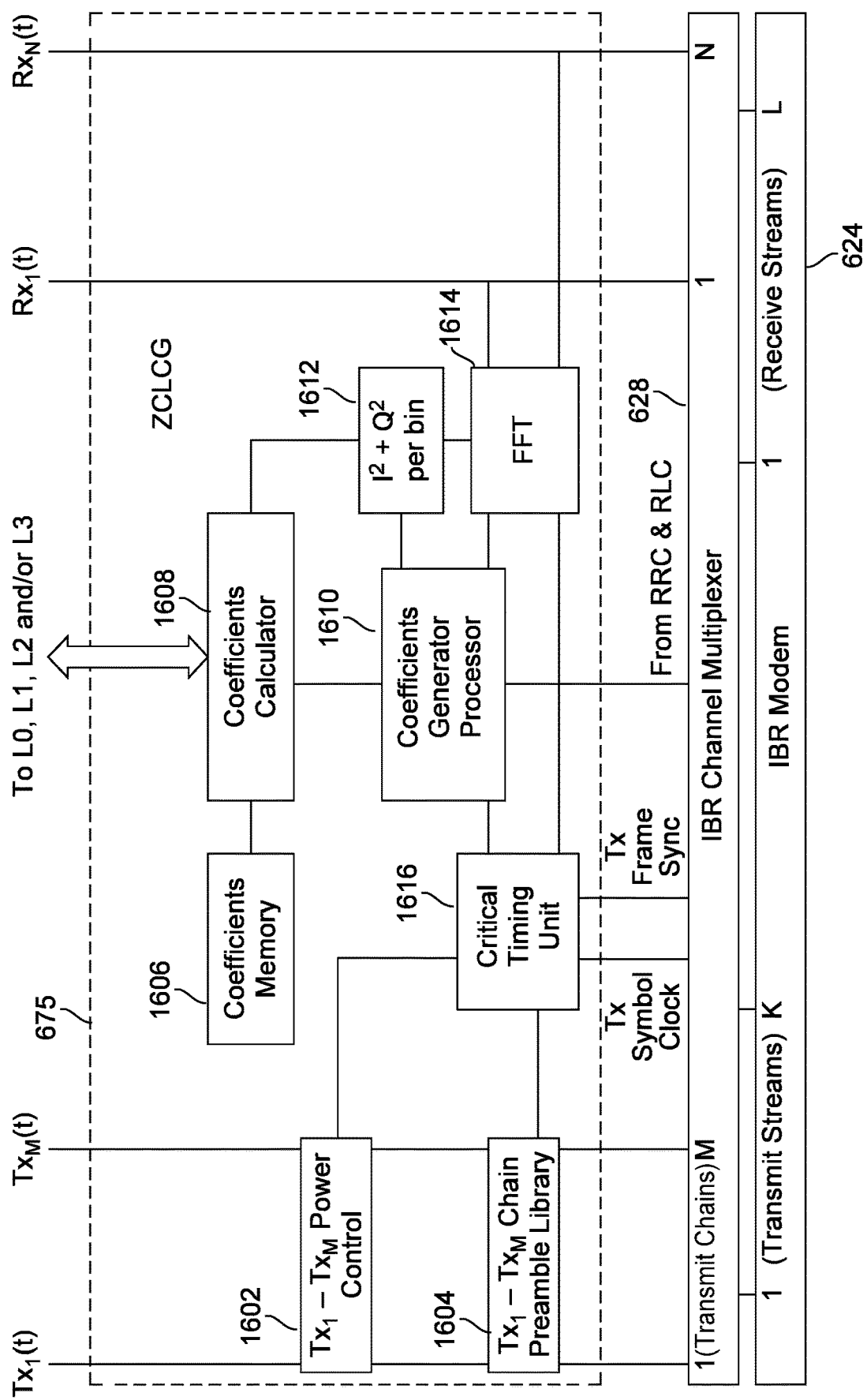
FIG. 16 is a block diagram of a portion of a ZDD enabled IBR including a ZDD Canceller Loop coefficients generator according to one embodiment of the invention.

FIG. 16 is a block diagram of a portion of a ZDD enabled IBR including a ZDD Canceller Loop Coefficients Generator (ZCLCG) according to one embodiment of the invention. Note that the architecture depicted in FIG. 16 may be implemented in many different ways as hardware, software on a processor, or a combination of both. In specific embodiments, the ZCLCG can be realized within commercial of the shelf processors, or in ASIC or FPGA (in whole or in part).

In one embodiment, a basic process of subsequent cancellations based on an RRC setting (first order) and RLC setting (second order) is employed. In one exemplary embodiment of a ZDD enabled IBR, a start-up technique is for both ends of an IBR link in a given channel to start-up initially in a TDD service mode that allows the IBRs to exchange key RRC data and establish common frame sync.

Then, in one embodiment based on RRC, L0 "coefficients" (possibly embodied as just selectable settings) are chosen first, typically from a non-volatile memory set by design or factory calibration (and possibly, or alternatively, within the Coefficients Memory (1606)). To the extent that such L0 coefficients or settings have multiple valid values for given RRC parameters, such values can be tested by inserting Tx-m chain preambles (serially or in parallel as described below for L1), and then applying FFT (or even just an RSSI, not shown, but available from the sampling receiver chain (1225-n) in one embodiment, or elsewhere in further embodiments) to each (or all) $Rx_n$ to measure the effects on undesired $Tx_m$ signal leakage into each $Rx_n$. This can be iterated until a minimum leakage value is determined. Alternatively, the L0 settings may be balanced with an identified desirable IBR receive signal. In one embodiment, such a balance comprises determining settings achieving a target threshold receive signal strength, or SNR, or other metric for a desired receive signal, and a target L0 isolation level. In such an embodiment, compromises between receive desired SNR (or other metric), and L0 isolation requires balance and may be achieved by optimizing the value (maximum or minimum) of a formula defining a metric such as the following:

$$Vo = \max(f_{DS}(W_0(i)) * f_{ISO}(W_0(i))), \text{ for all } i,$$

In the equation above, $f_{DS}(W_0(i))$ is a function of the desired receive signal, where $W_0(i)$ are $L_0$ coefficients sets as a function of i, and in one embodiment include the RRC antenna selection settings of the IBR antenna array (648). Note that i is an index which ranges in value from 1 to the total number of possible $W_0(i)$ setting combinations.

In the equation above, $f_{ISO}(W_0(i))$ is a function of the isolation between each transmit chain and each receive chain, where $W_0(i)$ are $L_0$ coefficients sets as a function of i, and in one embodiment include the RRC antenna selection settings of the IBR antenna array (648).

The functions $f_{DS}$, and $f_{ISO}$ in some embodiment are linear functions, while in other embodiment are nonlinear functions, or a combination. In one embodiment, the functions are a comparison to one or more thresholds, or fuzzy logic processing. In other embodiments the functions take the form of a global optimization function determining the maximum link throughput between two or more IBRs. Embodiments of such a function balance the target IBR received throughput and reliability and the current IBR's receive throughput and reliability as function of $W_0(i)$ settings. Examples of some of such embodied optimization algorithms associated with the L0 setting process, or associated with the other loop settings may be found in *Systems Engineering in Wireless Communications*, by Koivo and Elmusrati (ISBN 0470021780).

Second, in one embodiment holding the L0 coefficients constant, based also on RRC primarily, an initial guess for the L1 coefficients would be read from a non-volatile memory set by design or factory calibration (and possibly within the Coefficients Memory (1606)). An iterative process would commence wherein $Tx_m$ preambles (either serially or in parallel initially) are inserted into each $Tx_m$ and the effect on each IQ magnitude bin for each $Rx_n$ is considered to modify the coefficients to minimize observed $Tx_m$ in each $Rx_n$. There are numerous techniques that the Coefficients Generator Processor (1610) and/or Coefficients Calculator (1608) can use, such as iteration by steepest descents (or alternatives such as those disclosed within Koivo and Elmusrati), to determine the coefficients in view of the previous values of $W1_{m,n,d}$ and previous IQ magnitude bins given a new observed set of IQ magnitude bins for a new tested set of $W1_{m,n,d}$. Such processing may be performed as time domain based algorithm, or utilizing frequency domain based processing, or as a combination of both domains. In some embodiments, the $Tx_m$ preambles may be inserted in parallel to optimize the $W1_{m,n,d}$ in view of $Tx_{m1}$ to $Tx_{m2}$ leakage that passes through L1 and creates an additional leakage path independent of L0 into each $Rx_n$ from each $Tx_m$. In an exemplary embodiment, the Critical Timing Unit (1616) schedules the preamble insertions and FFT sampling in view of the Tx Symbol Clock (for precise preamble symbol insertion) and the Tx Frame Sync (so that, for example, $Tx_m$ preambles are sent when other IBRs in receive antenna view of the instant IBR in the same Rx channel have their Tx signals substantially inhibited in power). Such timing may also be coordinated via the IBMS Agent (700) in cooperation with other IBRs or an IBMS Server as described in co-pending U.S. application Ser. No. 13/271,057 by a common inventor and assignee.

In an embodiment where L1 is not present but L2 is, the above process would be performed in a similar manner for L2 in some embodiments. To the extent that the delay range of such an L2 includes long delay cancellations, the optimization of such $W2_{m,n,d}$ would in some embodiments, be performed similar to the process described below for L3 in some embodiments. Alternatively or in addition, the L2 coefficients may be calculated by closed form approaches rather than using iterative algorithms. Such algorithms may include so called MMSE and LMS based approaches in some embodiments, which will be described in more detail.

Figure 17:
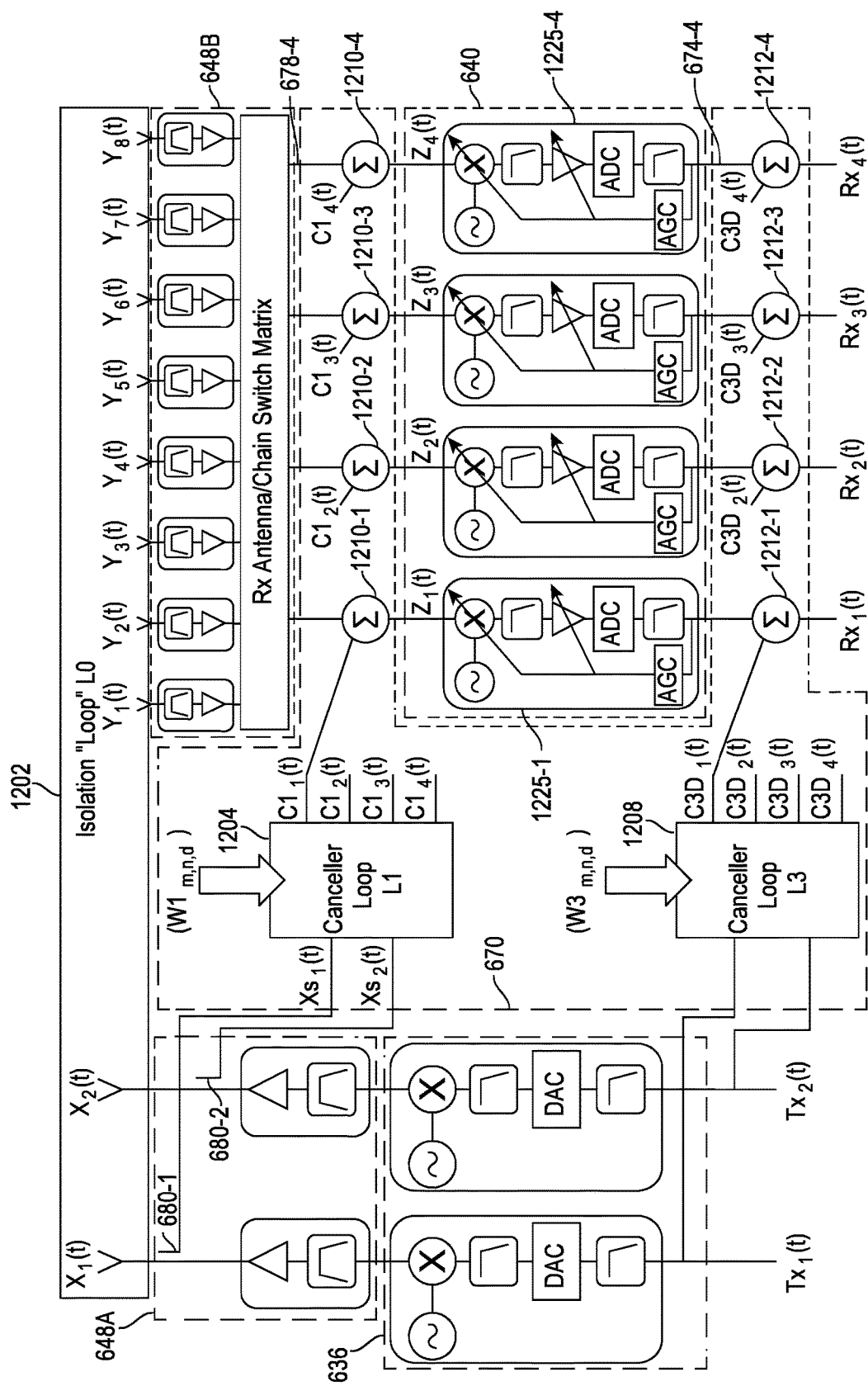
FIG. 17 is a block diagram of a portion of a ZDD enabled IBR including a Loop 1 (C1) and Loop 3 (C3D) cancellers according to one embodiment of the invention.

After the L1 coefficients have converged, reflection cancellations are made using either L2 or L3 (for example, using L3, as in L3D only in certain embodiments as depicted associated with FIG. 17, or parallel L3R and L3D loops in other embodiments). In some embodiments the calculation of L3 coefficients would also be an iterative process to determine $W3_{m,n,d}$ coefficients but it is unlikely that a meaningful initial guess would exist from design or factory calibration relative to an actual deployment location. Thus, the number of preamble/FFT cycles to converge may be substantial. Also, the number of calculations required for each preamble/FFT cycle in view of the many potential CFIR taps in L2 or L3 may be substantial. In the case where desired Tx power and certain component parameters causes substantial IM signals that are insufficiently cancelled by L1 and/or L2, then a final process to compute CFIR3 tap weights and IM model parameters is required. In one embodiment, this could be done by having the Critical Timing Unit (1616) also control a Tx Power Control circuit (1602) (for example, shifting away 1 or 2 bits in each Tx chain for symbol timing level 6 or 12 dB power control steps) that should allow FFT sampling to pick up the effects of IM processes due to the non-linear effect of such leakage signals within each Rx-n as a function of Tx power level.

The above process assumes CC-ZDD wherein some or all of the Tx-m channel overlaps with the Rx-n channel. For CB-ZDD wherein the Tx and Rx channels are adjacent, it may be preferable to use the above approach with the Rx channel BW in the downconverter chains temporarily set to cover some or all of the Tx and Rx together to more efficiently determine various cancellation coefficients. For CB-ZDD with disparate Tx and Rx channels, it may be preferable to temporarily force the RRC to tune the signal receiver chains (1225-n) to the Tx channel so that various cancellation coefficients can be efficiently determined from the Tx leakage signals. However in CB-ZDD, even if neither of the above options is exercised, it should still be possible to determine cancellation coefficients simply from Tx noise (and out of channel IM signals if present) using substantially the same procedure described above for CC-ZDD.

After both ends of a particular link have converged to an initially acceptable set of canceller coefficients, it is also necessary to update and maintain these coefficients in view of changing environmental parameters such as temperature or voltage internal to each IBR or channel obstructions external to each IBR. It is expected that L0 parameters would not be part of this update process. One exemplary procedure for this update process would be to periodically, such as once every $L3_U$ frames (where $L3_U$ may be 1 to 10 depending on the environment), have the Critical Timing Unit send one or more $Tx_m$ chain preambles, while the other IBRs in view of the Rx antennas at the Rx channel frequency substantially inhibit their Tx power, and effectively repeat the $W3_{m,n,d}$ coefficient calculation process if the IQ magnitude bins have increased beyond some threshold from the previous test stored in memory. Similarly, every $L1_U$ frames (where $L1_U$ may be 100-1000 depending on the environment), the $W1_{m,n,d}$ coefficients may be re-tested with C2 and/or C3 inhibited to recalculate W1 if a change beyond a threshold has occurred. If so, recalculation of W2 and/or W3 (and/or IM parameters) would need to follow. Alternatively, rather than every $L1_U$ frames, this W1 test may be scheduled only if the L3 (and/or L2) update process fails to keep the residual Tx signals in one or more $Rx_n$ below a particular threshold value. In some ZDD IBR installations, the channel dynamics may be far slower or faster changing than in others. Thus, it may also make sense to have $L1_U$, $L2_U$, and/or $L3_U$ into parameters that are adaptive to the estimated channel dynamics. For example only, if current values of $L1_U$, $L2_U$, and/or $L3_U$ consistently produce insubstantial changes to their respective W1, W2, and/or W3 coefficients, then increase the given values of $L1_U$, $L2_U$, and/or $L3_U$ until some predetermined maximum is reached. Conversely, if substantial changes to coefficients do result, then reduce the given values of $L1_U$, $L2_U$, and/or $L3_U$ until some predetermined minimum is reached.

As will be discussed, in other embodiments a closed form LMS or MMSE calculation may be made to determine L2 or L3 weights (or other weights for that matter).

In one embodiment associated with calculating L2 weights, a least squares closed form based approach may be utilized in a C2D (or analogously for calculating L3 weights in a C3D) cancellation wherein the sampled RF Transmit Reference Signals ($X_{S1}$ to $X_{SM}$) corresponding to signals associated with 680-1 through 680-M, using sampling receivers (1406-m), are compared with the receive chain output signals (674) prior to summer (or alternatively referred to as combiners) 1212-n (or at 1212-n with C2D and/or C3D temporarily inhibited) to calculate the coefficients $W2_{m,n,d}$, utilizing a closed form calculation. Some embodiments will utilize a least squares calculation, or MMSE calculation which when performed in the time domain requires a large matrix inversion. Alternatively such calculations may be performed in the frequency domain to achieve a closed form solution. For example in one embodiment, the following process is followed for each receiver chain n, where n varies from 1 through N:

1) A vector of sampled receive data ($Z_{Sn}$) is assembled from $S_R$ complex valued time domain samples of $Z_{Sn}(t)$ at the output of receiver chain 1225-n, taken from the input (674-n) of cancellation combiner (alternatively referred to as cancellation summers) 1212-n. Note that $Z_{Sn}$ is arranged to have the dimensions $S_R$ by 1, and that $S_R \geq D2$, where D2 is the number of taps in each CFIR2 (1408). Next, the Fourier transform of $Z_{Sn}$ is taken to provide $FZ_{Sn}$ (also having dimensions $S_R$ by 1). Such a Fourier transform may be realized in any one of known conventional approaches, including utilizing FFT processing block 1614, with additional coupling to signals at reference points 674 to obtain time domain samples of $Z_{Sn}$ (not shown in FIG. 16) or from $Rx_n$ directly with C2D and/or C3D temporarily inhibited.

2) M vectors are respectively assembled for each block 1404-m coupled to RF Transmit Reference Signals 680-m, where m=1 through M. Each vector ($X_{Sm}$) of sampled RF Transmit Reference Signals data is assembled from $S_R$ complex valued time domain samples of $X_m(t)$ at the output (1409-m) of the sampling receiver chain (1406-m) of block 1404-m, for each reference signal. Note that each vector $X_{Sm}$ is arranged to have the dimensions $S_R$ by 1, and that $S_R \geq D2$, where D2 is the number of taps in each CFIR2 (1408). Next, the Fourier transform of $X_{Sm}$ is taken to provide $FX_{Sm}$ (also having dimensions SR by 1). Such a Fourier transform may be realized in any one of known conventional approaches, including utilizing FFT processing block 1614, with additional coupling the signals at reference points 1409-m of each sampling receivers 1406-1 through 1406-M to obtain time domain samples of $X_{Sm}$ (not shown in FIG. 16). The M vectors of $FX_{Sm}$, where m=1 through M, may further be arranged to form a matrix FXs of dimension $S_R$ by M, where each column contains a single vector $FX_{Sm}$.

3) Next, in the frequency domain, and on a bin-by-bin basis, a Least Squares estimation is performed. For a reference on the least squares estimator see eq. 3.33, *Smart Antennas For Wireless Communications*, Rappaport; ISBN 0-13-71987-8 and derivation 3L, *Linear Algebra and its Applications*, Strang; ISBN 0-15-551005-3. Also see "*Least Squares Problems with several Variables*" as one example utilizing complex mathematics for the current embodiment, though alternative solutions are contemplated. Adapting the MMSE and Least Squares approach to the current application yields Eq. 14-1.

$$FW2_n^{EST}(b) = [FXs(b)^H FXs(b)]^{-1} FXs(b)^H FZs_n(b) \qquad \text{(Eq. 14-1)}$$

where b indexes frequency bins 1 through $S_R$, and where the "H" superscript refers to the Hermitian (conjugate) transpose of a matrix, and the superscript "−1" refers to a matrix inversion and, where, $FZs_n(b)$ is a complex scalar and $FXs(b)$ is comprised of a 1 by M vector, and $FW2_n^{EST}(b)$ is an M by 1 vector, where each element comprises the $b^{th}$ complex frequency domain bin value of the frequency domain estimation of the filter taps associated with $CFIR2_{m,n}$.

4) Following computation for all frequency bins from b=1 through $S_R$, the newly determined (M by $S_R$) matrix $FW2_n^{EST}$ may be combined utilizing a weighted averaging, or other filtering approaches, on an bin by bin basis with previously utilized or estimated versions of matrix $FW2_n^{EST}$ resulting in matrix $FW2_n^{Filt}$. Alternatively, the frequency domain based filtering may be performed in a later time domain step, and vector $FW2_n^{EST}$ may be substituted for the subsequent step referencing the matrix $FW2_n^{Filt}$.

5) Next an inverse FFT of $FW2_n^{Filt}$ is performed on a row wise basis (over $S_R$ samples, for each row m) resulting in $W2_n^{EST}$ which comprises estimates of the time domain FIR filter weights as a vector of dimension M by $S_R$, where $S_R$ is $\geq D2$ (the number of filter taps per FIR2 (1408)).

6) Finally $W2_n$ is calculated by performing a truncation of $W2_n^{EST}$ from M by $S_R$ to a M by D2, where for each receive chain the most significant magnitude coefficients will be contained in the first D2 values of the M rows of $W2_n^{EST}$. Additionally, a time domain sample-by-sample averaging, weighted averaging (FIR), recursive (IIR) filtering may be performed with previous calculated versions of $W2_n^{EST}$ or $W2_n$. Note that each row $W2_n$ corresponds to the weights, W2$_{m,n,1}$ to W2$_{m,n,D2}$ for the corresponding CFIR$_{m,n}$ (1408). Note that this processing equally applies to the calculation of the L3 coefficients as well, with the exception that such calculation be processed on the output of the cancellation of C2 (if present), and only while the W1, W2, and W3R weights (if present) are held static. Additionally the transmit reference signals would be based upon the pure digital reference signals Tx1 . . . M (672) input to the transmit chains, rather the RF Transmit Reference Signals (680).

Referring now to FIG. 17, a block diagram of a portion of a ZDD enabled IBR including Loop 1 (C1) (1204) and Loop 3 (C3D) (1208) cancellers is depicted according to one embodiment of the invention. Note that all labeled signals in FIG. 17 are complex, represented by either I and Q or magnitude and phase. In one embodiment, the isolation in L0 (1202) and the cancellation capability of L1 are sufficient that only L3 with digital baseband outputs is required for CC-ZDD operation. Furthermore with careful design, the L3 (1208) in a preferred embodiment does not need IM cancellation circuits.

Note that L0 (1202) includes the effects of each transmit antenna signal X$_m$(t) on every receive antenna signal Y$_q$(t), as well as on every other X$_m$(t). Note also that every antenna, X$_m$(t) and Y$_q$(t), may be subject to receiving unwanted interference I(t) as well as the desired signal from another IBR and various undesired leakage signals from the instant IBR.

The goal of L0, L1 and L3 is that each Rx$_n$(t) does not have a level of any X$_m$(t) (or other undesired signal introduced by the instant IBR and not the outside world radiating into each receive antenna) that causes appreciable (typically more than 1 dB) desensitization at the demodulator relative to an equivalent receiver where each X$_m$(t) at the instant IBR has zero power.

Figure 18:
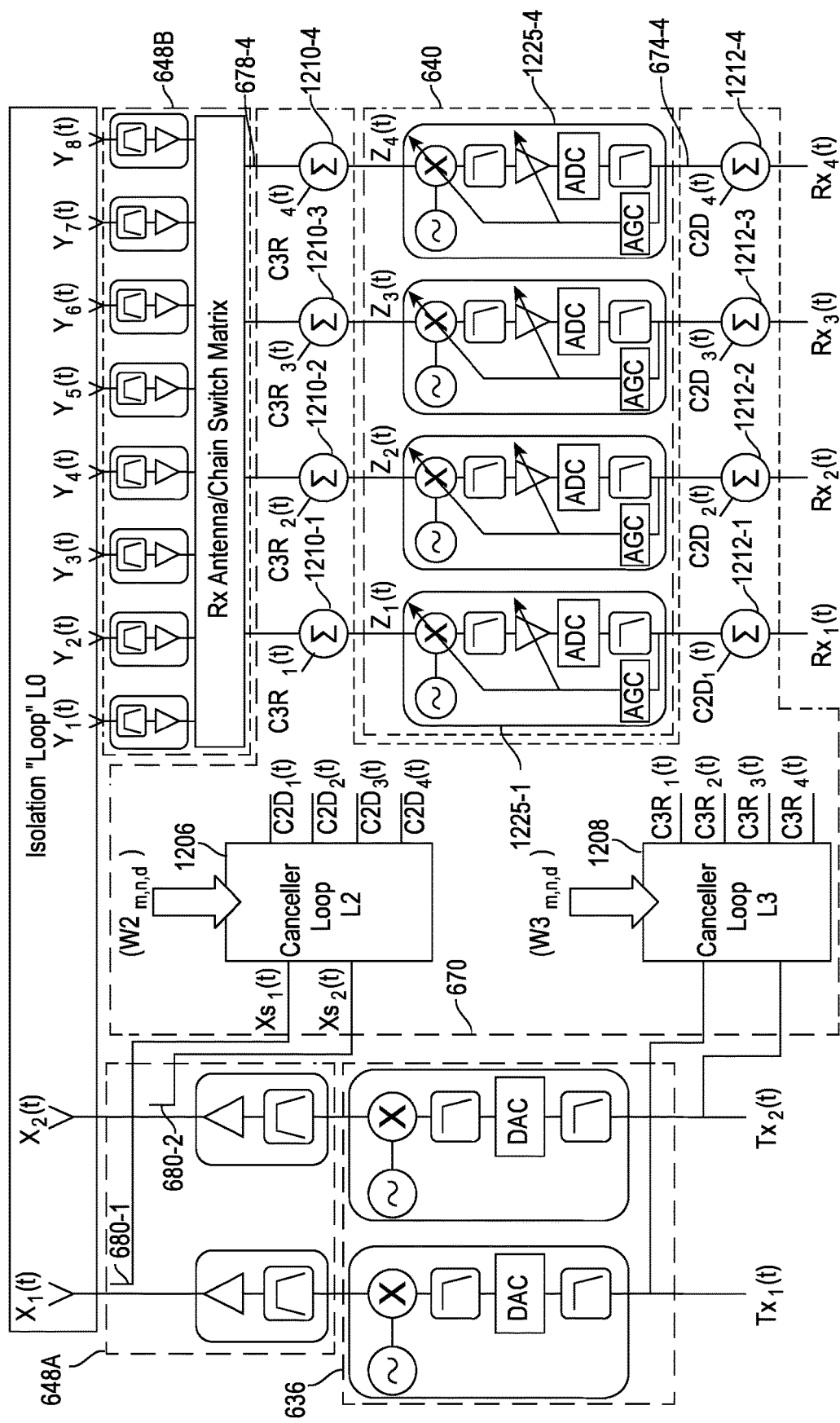
FIG. 18 is a block diagram of a portion of a ZDD enabled IBR including a Loop 2 (C2D) and Loop 3 (C3R) cancellers according to one embodiment of the invention.

Referring now to FIG. 18, a block diagram depicting of a portion of a ZDD enabled IBR including a Loop 2 (C2D) and Loop 3 (C3R) cancellers according to one embodiment of the invention. In embodiments associated with FIG. 18, wherein C2D of FIG. 14, and C3R of FIG. 15 are utilized, the noise from the cancellation transmitters 1506-1 to 1506-N may be compensated for by sharing LO frequency sources (VCOs) between the signal transmitters and the C3R transmitters such that the phase noise is common to all up converted signals allowing for the cancellation of the transmitted phase noise at summers (alternatively referred to as cancellation combiners) 1210-n. Additionally, utilizing a shared VCO between the C2D sampling receivers (1406-m) and signal receive chains (1225-n) allows for a common phase noise component between all receivers allowing for the cancellation of phase noise at baseband in C2D or related digital cancellation. Performing additional cancellation of the digital base band transmit signals (Tx$_1$(t) and Tx$_2$(t)), the individual phase noise components may be recovered for use in further cancellation processing using noise components individually (the shared transmit phase noise, and the shared receive phase noise). As a result, transmitter leakage signals from IBR transmit array (648A) may be canceled at 1210-n utilizing C3R processing allowing for a cancellation of the leakage signals such that the ADCs within the signal receive chains (1225-n) are not saturated. Such embodiments sharing a common VCO among all up converters and a common VCO among all down converters down converters allows for the cancellation of the transmitter leakage signal and the transmitter phase noise at 1210-n. In other embodiments, transmitter noise may not be cancelled when the transmitter leakage signal is cancelled (when the C3R up converter VCOs are not shared with the transmit chain VCOs) and remain in the signal receive chains (1225-n), and the remaining phase noise may be cancelled in C2D processing and associated processing utilizing references for the up converter or down converter phase noises.

However, in some embodiments utilizing commercially available chip set implementations, VCOs are shared only among pairs of transmitters and pairs of receivers. As discussed previously, the phase noise combinations may be recovered and compensated for in further cancellation processing at base band during C2D or C3R processing.

Referring now to FIG. 19 through FIG. 24 a detailed mathematical description of one the embodiments of FIG. 17 utilizing L1, and L3 are presented. Note that within the references figures all multiplies "x" shown are complex, though realizations of such complex multiplies may be performed by analog structures such as mixers or by digital structures such as combinatorial logic gates (i.e. "XOR") or adders.

FIG. 19 is a diagram of the mathematical representation of depicted signals at a ZDD enabled IBR transmitter according to one embodiment of the invention. Referring to (19-1) and (19-2) note that X$_m$(t) is linearly related to Tx$_m$(t) except for the additive IM and noise terms. The IM terms may be modeled from Tx$_m$(t) depending on the mechanism that causes them. The noise is uncorrelated from Tx$_m$(t) and thus L3 cannot cancel the Tx noise in the receiver in embodiments of FIG. 17. Unless L1 (or theoretically L2, but subject to practical limitations described earlier) cancels this noise to a level acceptably below each receive chain's internal noise level (plus received uncorrelated noise/interference), then this Tx noise will desense the demodulator and limit the overall link margin in this embodiment.

The sampled Tx$_m$(t) signals utilized by L1 are predominantly G$_{Sm}$×X$_m$(t). However, they may also include unwanted leakage of other transmit signals on a theoretically infinite number of propagation paths as shown in Eqs. 19-3 and 19-4 of FIG. 19. There may also be uncoordinated interference present at each Tx antenna but generally if this were significant it would probably already cause significant interference at one or more receive antennas in specific embodiments. There is also at least thermal noise present at the input to L1. Although this noise N$_{Sm}$(t) may be far below the transmitter noise [G$_{Sm}$×N$_{Txm}$(t)] in magnitude, the effect of N$_{Sm}$(t) combined with the transfer function within L1 and its noise figure will be injected at Z$_n$(t) into each receiver chain, while the transmitter noise is theoretically cancelled out (and there is no practical way to cancel N$_{Sm}$(t)).

FIG. 20 is a diagram of the mathematical representation of depicted signals at a ZDD enabled IBR receiver according to one embodiment of the invention. At the receiver each Y$_q$(t), of Eq. 20-1 receives a desired signal from its peer IBR (Y$_{Rxq}$(t)) as well as both exemplary transmit signals X$_m$(t), each of which reaches Y$_q$(t) by a theoretically infinite number of delay paths and complex transfer functions, plus the input noise and interference at each antenna.

At the inputs to each downconverter chain, Z$_n$(t) (Eq. 20-2), the signal is composed of all 8 Y$_q$(t) signals multiplied by respective complex transfer functions and subject to a small delay plus the equivalent input noise for the downconverter chain and the L1 cancellation signal, as well as any intermod products generated in the circuits from antenna q to downconverter n (especially in view of Tx leakage from X$_m$ that may be much larger than Y$_{Rxq}$). Note that within 648B the effect of the switch matrix and the LNA power down when a particular receive antenna is not selected typically results in the selected $q_n$ mapping having a magnitude of $G_{Rxq,n}$ that greatly exceeds that of all unselected mappings.

The L1 cancellation signal can be described as a summation across the two sampled transmit signals $X_{Sm}$ (which each comprise $X_1$ and $X_2$ due to finite Tx to Tx antenna isolation) weighted by complex transfer functions $W1_{m,n,d}$ at delays of approximately "$d*\Delta t_1$" (but not necessarily uniform delay steps in some embodiments) and $G1_{m,d}$ (in some embodiments these might all be unity but in practice with RF delay lines these will vary somewhat in other embodiments), plus undesired intermodulation products created within L1 as indicated.

FIG. 21 is a diagram of the mathematical representation of depicted signals at a ZDD enabled IBR receive chain input according to one embodiment of the invention.

This representation of $Z_n(t)$ (Eq. 21-00) illustrates five constituent components for each Rx downconverter input chain signal:

(21-01) This is the "desired Rx chain signal" component that will be eventually channel multiplexed, equalized, and demodulated in the baseband Rx PHY. This is dominated by the switch matrix selection from q to n.

(21-02) This is the "Rx chain input noise floor" (which includes interference at the Rx antennas) component that leads to finite SINR for the receive chain. This should also be dominated by the switch matrix selection from q to n in consideration of the thermal noise floor and RF front-end noise figure. Ideally the dominant $G_{Rxq,n} \times N_{Rxq}$ is much greater than $N_{DCn}$ as well in good RF design practice.

(21-03) This is the "undesired Tx leakage" component that reflects the cumulative effects of finite isolation in L0 from any Tx antenna m to any receive antenna q in view of the switch matrix selections.

(21-04) This is the L1 cancellation component (or "L1 output signal") which in an ideal world would be exactly equal to, but opposite in sign to, the undesired Tx leakage component. In reality, this is not possible, but if L1 sufficiently cancels certain key sub-components of the Tx leakage, then L2 or L3 may be able to sufficiently cancel the rest for CC-ZDD. In the case of CB-ZDD, then L1 needs to cancel only the Tx leakage noise (and IM signals if present) in the Rx channel to be acceptably low relative to the noise plus interference component.

(21-05) This is the "undesired Rx intermods" (of the Tx leakage signals) produced in the RF front-end (typically the LNA) of each path from Rx antenna q to downconverter input n. Ideally, the L0 isolation and the linearity of the LNA and/or switch matrix would cause such intermods to be acceptably low relative to the noise plus interference component by design such that this component is negligible. It is generally not possible to cancel this particular intermod component by L1. However, in some cases it may be feasible to model the generation of this intermod component relative to the $Tx_m$ digital baseband signals and thus cancel it in L3.

FIG. 22 is a diagram of a further mathematical representation of depicted signals at a ZDD enabled IBR receive chain input according to one embodiment of the invention. Substituting previous representations of $X_m(t)$ (Eq. 19-1 and 19-2) and $C1_n(t)$ (Eq. 20-3) creates a more detailed description of $Z_n(t)$ (Eq. 22-00).

This representation of $Z_n(t)$ now illustrates nine constituent components for each Rx downconverter input chain signal:

Equation components (22-01) and (22-02) are equivalent equation segments (21-01) and (21-02) of FIG. 21, respectively.

Equation Segment (22-03) is the first of three subcomponents of the "undesired Tx leakage" component from the previous slide. This particular subcomponent is representable in terms linearly related to the original Tx chain baseband digital signal $Tx_m(t)$.

Equation Segment (22-04) is the second of three subcomponents of the "undesired Tx leakage" component from the previous slide. This particular subcomponent comprises the Tx chain output noise.

Equation Segment (22-05) is the third of three subcomponents of the "undesired Tx leakage" component from the previous slide. This particular subcomponent comprises the Tx chain output intermods.

Equation Segment (22-06) is the first of three subcomponents of the "L1 output signal" component from the previous slide. This particular subcomponent is the actual L1 cancellation signal that is complicated by the finite Tx-Tx antenna isolation as represented in $L0tx_{m1,m2,i}$. This "L1 cancellation signal" would ideally cancel all three of the undesired Tx subcomponents.

Equation Segment (22-07) is the second of three subcomponents of the "L1 output signal" component from the previous slide. This particular subcomponent comprises the interference at the Tx antennas and the noise generated by L1. It is not possible to cancel the noise term in this sub-component. Therefore, L1 and the Rx front-end must be designed such that the noise term in this sub-component is acceptable relative to the "Rx chain input noise floor" component. In practice, this involves minimizing the noise output from L1 and raising the gain in the Rx front-end without causing other problems (such as downconverter saturation or Rx front-end undesired intermods). It is also not possible to cancel the interference term in this subcomponent at least from within the ZDD subsystem of the IBR. However, this interference $I_{Txm}$ is likely correlated to $I_{Rxq}$ in practice and thus an IBR with redundant Rx chains may be able to cancel such interference in the Rx channel multiplexer. Note that in practice, $W1 \times G1 \times G_{Sm}$ is likely substantially lower in magnitude that $G_{Rxq,n}$ for the selected q of a given n.

Equation Segment (22-08) is the third of three subcomponents of the "L1 output signal" component from the previous slide. This particular subcomponent arises from intermods of $X_m(t)$ (or effectively $Tx_m(t)$ if the EVM is small) generated within L1. Preferably, these intermods are acceptably low relative to the "Rx chain input noise floor" component by design and hence effectively negligible. In some cases, it may be feasible to model the generation of this intermod component relative to the $Tx_m$ digital baseband signals and thus cancel it in L3.

Equation Segment (22-09) is equivalent to Equation Segment (21-05) of FIG. 21.

FIG. 23 is a diagram of a further detailed mathematical representation of depicted signals at a ZDD enabled IBR receive chain input according to one embodiment of the invention. Further substituting previous representations of $X_m(t)$ into the L1 cancellation signal creates an even more detailed description of $Z_n(t)$ (Eq. 23-00 of FIG. 23).

This representation of $Z_n(t)$ now illustrates eight constituent components for each Rx downconverter input chain signal:

Equation components (23-01) and (23-02) are equivalent equation segments (21-01) and (21-02) of FIG. 21, respectively.

Equation component (23-03) is the first of three subcomponents of the "residual Tx leakage" component which is expressed in view of the three sub-components of the "undesired Tx leakage" in combination with analogous sub-components of the L1 cancellation signal of the previous slide. This particular subcomponent is representable in terms linearly related to the original Tx chain baseband digital signal $Tx_m(t)$ (across all Tx chains). To the extent that the magnitude of $[G_{Txm} \times Tx_m]$ times $L0_{m,q,i}$ exceeds the equivalent input noise (plus interference) for any $[t_{m,q,i} + t_{Rxq,n}] > [t_{sm} + t_{D1}]$, then at least some L3 cancellation will be required or the receive chain will be desensed.

Equation component (23-04) is the second of three subcomponents of the "residual Tx leakage" component. This particular subcomponent comprises the residual Tx chain output noise (with contributions from all Tx chains). It is imperative (in some embodiments) that $t_{D1}$ be chosen such that $[t_{sm} + t_{D1}] > [t_{m,q,i} + t_{Rxq,n}]$ for any "i" wherein the magnitude of $[N_{Txm} \times L0_{m,q,i}]$ exceeds the equivalent input noise (plus interference) of each receive chain and further that D1 be large enough in number of taps such that any frequency dependence of the effective transfer function of L0 can be sufficiently approximated. This is necessary because L3 in this exemplary embodiment cannot cancel any residual Tx noise in a receive chain.

Equation component (23-05) is the third of three subcomponents of the "residual Tx leakage" component. This particular subcomponent comprises the Tx chain output intermods (with contributions from all Tx chains). Ideally in the current embodiment, $t_{D1}$ would be chosen such that $[t_{sm} + t_{D1}] > [t_{m,q,i} + t_{Rxq,n}]$ for any "i" wherein the magnitude of $[X_{IMTxm} \times L0_{m,q,i}]$ exceeds the equivalent input noise (plus interference) of each receive chain and D1 would be large enough in number of taps such that any frequency dependence of the effective transfer function of L0 can be sufficiently approximated so that further cancellation of Tx IM products in L3 of this exemplary embodiment is not required.

Equation components (23-06, 07, and 08) are equivalent to (22-07, 8, and 9) of FIG. 22.

Note that the relationship of $W1_{m,n,d}$ to $G_{Rxq,n}$, $G1_{m,d}$, $G_{Sm}$, $L0tx_{m1,m2,i}$, $L0_{m,q,i}$, and the delays is theoretically identical for $Tx_m(t)$, $N_{Txm}(t)$ and $X_{IMTxm}(t)$. Thus in CC-ZDD solving for $W1_{m,n,d}$ such that the residual Tx signal is minimized should also minimize the residual Tx noise and intermods at a given Rx chain input n. For CB-ZDD, this is still true for residuals in the Tx channel, but not necessarily true for residuals in the Rx channel if $W1_{m,n,d}$ was determined by minimizing residual Tx signal in the Tx channel. In particular, for non-overlapping CB-ZDD, the frequency dependence of L0 may make the $W1_{m,n,d}$ that minimizes the residual Tx noise in the Rx channel somewhat different than that which minimizes residual Tx noise (or residual Tx signal) in the Tx channel. However, determining $W1_{m,n,d}$ may be far simpler in the Tx channel by minimizing residual Tx signal so this may be a good interim step despite the likely requirement of temporarily operating the Rx chain at the Tx channel (and note that to the extent iteration is used, the first guess may still preferably come from a table set by factory calibration and/or design as discussed previously). Final optimization of $W1_{m,n,d}$ in CB-ZDD may require processing gain by averaging or multiple iterations across many residual signal tests due to the statistical variations of the noise.

FIG. 24 is a diagram of the mathematical representation of depicted signals at a ZDD enabled IBR receive chain digital output signals according to one embodiment of the invention. Consider now the Rx chain output in the digital domain (24-01) which is linearly related to input plus the L3 cancellation signal. For the specific case where all RF front-end and L1 intermods and noise are sufficiently small relative to the receive chain noise floor by design, and the residual Tx noise and Tx intermods are sufficiently cancelled by L1 relative to the receive chain noise floor, then the receive chain digital output signals can be written approximately as composed of three components described as follows:

The first component is the desired Rx chain signal (24-11). The second component (24-12) is the Rx chain noise floor plus interference from sources other than the instant ZDD IBR. Because L1 connects the Tx antennas in a path to each receive chain independent of the Rx antennas, the interference at the Tx antennas is also in each receive chain per this component. However, if $I_{Txm}$ is correlated with $I_{Rxq}$, then in certain receive architectures such interference may be cancellable by the Rx FDE or other mechanism within the Rx channel multiplexer assuming redundant Rx chains.

The third component (24-13) is the residual Tx signal (with contributions from all Tx chains due to Tx-Tx antenna coupling). The L3 cancellation signal must be optimized by finding $W3_{m,n,d3}$ coefficients such that this residual Tx signal is sufficiently small relative to the Rx chain noise floor in CC-ZDD. Because the residual Tx signal is linear with respect to $Tx_m(t)$, then for sufficiently large D3 and $t_{D3} > t_{m,q,i}$ for any $L0_{m,q,i}$ of interest, it should always be possible to find $W3_{m,n,d3}$ such that this residual Tx signal is sufficiently minimized. For non-overlapping CB-ZDD, this component may not be important as the frequency dependence of $G_{DCn}$ may greatly attenuate this component relative to the desired Rx signal and the Rx noise floor, and the residual may be effectively discarded by the FFT in the Rx channel multiplexer.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A radio comprising:
    a plurality of transmit radio frequency (RF) chains, wherein each transmit RF chain is configured to convert from a respective one of a plurality of transmit chain input signals to a respective one of a plurality of transmit RF signals;
    a plurality of adaptable RF transversal filter sets configured to convert one or more RF cancellation input signals derived from one or more of the plurality of transmit RF signals to a plurality of RF transmit cancellation signals, wherein each one of the plurality of adaptable RF transversal filter sets comprises:
        one or more adaptable RF transversal filters, wherein each adaptable RF transversal filter is configured to filter a respective one of the one or more RF cancellation input signals to provide a respective one of one or more adaptable RF transversal filtered signals; and
        an RF filtered signal combiner configured to combine the one or more adaptable RF transversal filtered signals within each one of the plurality of adaptable RF transversal filter sets to produce one of the plurality of RF transmit cancellation signals;
    a plurality of antenna elements, wherein each of a plurality of receive RF signals is derived from signals received from at least one of the plurality of antenna elements, wherein each of the plurality of receive RF signals comprises at least one or more transmitter related signals, and wherein each of the one or more transmitter related signals is derived from at least one of the plurality of transmit RF signals;
    a plurality of RF cancellation combiners, wherein each RF cancellation combiner is configured to combine a respective one of at least one of the plurality of RF transmit cancellation signals with at least one of the plurality of RF receive signals to provide a respective one of a plurality of receive chain input signals; and
    a plurality of receive radio frequency (RF) chains, wherein each receive RF chain is configured to convert from a respective one of the plurality of receive chain input signals to a respective one of a plurality of receive chain output signals;
    wherein the radio is configured to perform adaptable radio frequency (RF) cancellation for reduction of one or more transmit signals at a receiver within the radio.

2. The radio of claim 1, further comprising:
    one or more demodulator cores, wherein each demodulator core demodulates one or more receive symbol streams to produce a respective receive data interface stream; and
    a frequency selective receive path channel multiplexer to produce at least two receive symbol streams from at least two of the plurality of receive chain output signals.

3. The radio of claim 1, further comprising:
    one or more modulator cores, wherein each modulator core modulates a respective transmit data interface stream to produce one or more of a plurality of transmit symbol streams; and
    a transmit path channel multiplexer to produce the plurality of transmit chain input signals provided to the plurality of transmit RF chains from the plurality of transmit symbol streams.

4. The radio of claim 3, wherein the transmit path channel multiplexer is a frequency selective transmit path channel multiplexer.

5. The radio of claim 3, wherein the transmit path channel multiplexer utilizes transmit beam forming.

6. The radio of claim 1, wherein the radio is configured to insert transmit preambles that can be utilized at least to obtain an estimate of the level of the interfering signal component.

7. The radio of claim 1, wherein the radio is configured to estimate of the level of the interfering signal component by using at least a Fast Fourier Transform (FFT).

8. The radio of claim 1, wherein the radio is configured to determine the metric from at least one of a least squares or an MMSE calculation.

9. The radio of claim 1, wherein the metric comprises one or more of an RF transmit leakage metric, a transmit leakage metric, an RSSI metric, a metric involving a correlation with a reference signal, a metric involving a correlation with a transmit chain input signal, a metric derived from a receive RF chain, a metric associated with a desired receive signal, a metric associated with isolation between certain receive antenna array elements and certain transmit antenna array elements associated with the intelligent radio, a metric based upon measurements of signals, channel estimates, or cancellation performance, a receiver performance metric such as signal to noise ratio (SNR), bit error rate (BER), or frame error rate (FER), or a metric associated with the forward error correction (FEC) decoder.

10. The radio of claim 1, further comprising:
    one or more selectable RF connections, wherein each selectable RF connection is configured to selectively couple to at least one of certain of the plurality of antenna elements to derive at least one of certain of the plurality of receive RF signals.

11. The radio of claim 10, wherein at least one of the one or more selectable RF connections comprises circuitry to combine signals received from at least two of the certain of the plurality of antenna elements.

12. The radio of claim 11, wherein the circuitry to combine signals comprises at least an RF switch.

13. The radio of claim 1, wherein no channel bandwidth associated with any of the plurality of transmit RF signals at a time of transmission overlaps with any channel bandwidth associated with any of the plurality of receive RF signals at a time of reception, wherein the time of transmission and the time of reception can be coincident.

14. The radio of claim 1, wherein at least one channel bandwidth associated with any of the plurality of transmit RF signals at a time of transmission overlaps at least partially with at least one channel bandwidth associated with any of the plurality of receive RF signals at a time of reception, wherein the time of transmission and the time of reception can be coincident.

15. A radio comprising:

a plurality of antenna elements;

a plurality of transmit radio frequency (RF) chains coupled to at least one of the plurality of antenna elements;

a plurality of receive RF chains coupled to at least one of the plurality of antenna elements;

a plurality of RF cancellation combiners coupled to the plurality of receive RF chains;

a plurality of adaptable RF transversal filter sets coupled to the plurality of RF cancellation combiners and coupled to the plurality of transmit RF chains;

one or more modulator cores; and a transmit path channel multiplexer coupled to the plurality of transmit RF chains and the one or more modulator cores wherein the radio is configured to perform adaptable RF cancellation for reduction of one or more transmit signals at a receiver within the radio.

16. The radio of claim 15, further comprising:

one or more selectable RF connections, wherein each selectable RF connection is configured to selectively couple to at least one of certain of the plurality of antenna elements.

17. The radio of claim 15, wherein each of the plurality of adaptable RF transversal filter sets comprise:

one or more adaptable RF transversal filters; and an RF filtered signal combiner.

18. The radio of claim 15, wherein the radio is configured to perform adaptable RF cancellation for reduction of one or more transmit signals at a receiver within the radio by adapting at least one of the one or more adaptable RF transversal filters to reduce a level of an interfering signal component within a receive chain output signal, wherein the interfering signal component is derived from a transmitter related signal.

19. The radio of claim 18, wherein the radio utilizes a metric that accounts for at least the interfering signal component, wherein the metric comprises one or more of an RF transmit leakage metric, a transmit leakage metric, an RSSI metric, a metric involving a correlation with a reference signal, a metric involving a correlation with a transmit chain input signal, a metric derived from a receive RF chain, a metric associated with a desired receive signal, a metric associated with isolation between certain receive antenna array elements and certain transmit antenna array elements associated with the intelligent radio, a metric based upon measurements of signals, channel estimates, or cancellation performance, a receiver performance metric such as signal to noise ratio (SNR), bit error rate (BER), or frame error rate (FER), or a metric associated with the forward error correction (FEC) decoder.

* * * * *